US012304219B2

(12) United States Patent
Yoshimoto et al.

(10) Patent No.: US 12,304,219 B2
(45) Date of Patent: May 20, 2025

(54) LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

(71) Applicant: BROTHER KOGYO KABUSHIKI KAISHA, Nagoya (JP)

(72) Inventors: Hisaaki Yoshimoto, Nukata (JP); Akihiro Kawakita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 195 days.

(21) Appl. No.: 18/080,263

(22) Filed: Dec. 13, 2022

(65) Prior Publication Data

US 2023/0182480 A1 Jun. 15, 2023

(30) Foreign Application Priority Data

Dec. 13, 2021 (JP) ................................. 2021-201744

(51) Int. Cl.
*B41J 2/18* (2006.01)
*B41J 2/01* (2006.01)
*B41J 2/175* (2006.01)

(52) U.S. Cl.
CPC . *B41J 2/18* (2013.01); *B41J 2/01* (2013.01); *B41J 2/175* (2013.01); *B41J 2/17566* (2013.01); *B41J 2/17596* (2013.01)

(58) Field of Classification Search
CPC ....... B41J 2/18; B41J 2/01; B41J 2/211; B41J 2/1433; B41J 2/17; B41J 2/17593;
(Continued)

(56) References Cited

U.S. PATENT DOCUMENTS

| | | | |
|---|---|---|---|
| 2013/0286114 | A1 | 10/2013 | Ito et al. |
| 2014/0132653 | A1 | 5/2014 | Kamiyama |
| 2020/0307231 | A1 | 10/2020 | Mori et al. |

FOREIGN PATENT DOCUMENTS

| | | | |
|---|---|---|---|
| EP | 2572885 | A1 | 3/2013 |
| JP | 2007083548 | A | 4/2007 |

(Continued)

OTHER PUBLICATIONS

Extended European Search Report issued in related European Patent Application No. 22212556.9, dated Apr. 24, 2023. (9 pages.).

*Primary Examiner* — Manish S Shah
(74) *Attorney, Agent, or Firm* — K&L Gates LLP

(57) ABSTRACT

A liquid supply system includes one or a plurality tubes, a liquid delivery mechanism and a processor. The one or plurality tubes is connected to a tank. The tank is provided further upstream than a printer. Liquid flows through the one or plurality tubes between the tank and the printer. The liquid delivery mechanism is provided in the one or plurality of tubes, and switches between a liquid delivery state and a stopped state. The processor performs supply processing of supplying the liquid from the tank toward the printer via the one or plurality of tubes, by controlling the liquid delivery mechanism to be in the liquid delivery state, and return processing of returning the liquid from the printer toward the tank via the one or plurality of tubes, by controlling the liquid delivery mechanism to be in the liquid delivery state.

14 Claims, 18 Drawing Sheets

(58) Field of Classification Search

CPC ...... B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

FOREIGN PATENT DOCUMENTS

| | | | | | |
|---|---|---|---|---|---|
| JP | 6450942 | B2 | 1/2019 | | |
| KR | 100503116 | B1 | 7/2005 | | |
| KR | 102126776 | B1 | 6/2020 | | |
| WO | WO-2015190200 | A1 | * 12/2015 | ................ | B41J 2/18 |

* cited by examiner

LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

REFERENCE TO RELATED APPLICATIONS

This application claims priority from Japanese Patent Application No. 2021-201744 filed on Dec. 13, 2021. The entire content of the priority application is incorporated herein by reference.

BACKGROUND ART

The present disclosure relates to a liquid supply system, a control method, a non-transitory computer-readable medium storing computer-readable instructions, and a liquid supply device.

A liquid supply system is provided with a tank. Liquid is stored in the tank. The liquid supply system supplies the liquid to a printer from the tank via the tube.

DESCRIPTION

In the above-described liquid supply system, as a result of the liquid stagnating in the tank or in the tube, there is a possibility that a state of a temperature distribution, a concentration distribution, or the like of the liquid in the tank or in the tube may become non-uniform. When the state of the liquid in the tank or in the tube becomes non-uniform, there is a possibility that generates an abnormality in the supply of the liquid to the printer from the tank via the tube, in the use of the liquid in the printer, or the like.

Embodiments of the broad principles derived herein provide a liquid supply system, a control method, a non-transitory computer-readable medium storing computer-readable instructions, and a liquid supply device capable of suppressing a state of a liquid in a tank or in a tube from becoming non-uniform.

A first aspect of the present disclosure relates to a liquid supply system supplying a liquid to a printer. The liquid supply system includes one or a plurality tubes, a liquid delivery mechanism, a processor and a memory. The one or plurality of tubes configures a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid delivery mechanism is a mechanism provided in the one or plurality of tubes, and configured to switch between a liquid delivery state of the liquid flowing between the tank and the printer via the one or plurality of tubes, and a stopped state of stopping the liquid from flowing between the tank and the printer via the one or plurality of tubes. The memory stores computer-readable instructions that, when executed by the processor, cause the processor to perform a process. The process includes circulation processing including supply processing of supplying the liquid from the tank toward the printer via the one or plurality of tubes, by controlling the liquid delivery mechanism to be in the liquid delivery state, and return processing of returning the liquid from the printer toward the tank via the one or plurality of tubes, by controlling the liquid delivery mechanism to be in the liquid delivery state.

According to the first aspect, the liquid supply system circulates the liquid between the tank and the printer via the one or plurality of tubes, by the circulation processing. Thus, the liquid supply system can suppress a state of the liquid inside the tank or inside the tube from becoming non-uniform.

A second aspect of the present disclosure relates to a control method by a liquid supply system supplying a liquid to a printer. The liquid supply system includes one or a plurality of tubes and a liquid delivery mechanism. The one or plurality of tubes configures a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid delivery mechanism is a mechanism provided in the one or plurality of tubes, and configured to switch between a liquid delivery state of the liquid flowing between the tank and the printer via the one or plurality of tubes, and a stopped state of stopping the liquid from flowing between the tank and the printer via the one or plurality of tubes. The control method includes circulation processing including supply processing of supplying the liquid from the tank toward the printer via the one or plurality of tubes, by controlling the liquid delivery mechanism to be in the liquid delivery state, and return processing of returning the liquid from the printer toward the tank via the one or plurality of tubes, by controlling the liquid delivery mechanism to be in the liquid delivery state.

The second aspect can achieve the same effects as those of the first aspect.

A third aspect of the present disclosure relates to a non-transitory computer-readable medium storing computer-readable instructions executed by a computer of a liquid supply system supplying a liquid to a printer. The liquid supply system includes one or a plurality of tubes and a liquid delivery mechanism. The one or plurality of tubes configures a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid delivery mechanism is a mechanism provided in the one or plurality of tubes, and configured to switch between a liquid delivery state of the liquid flowing between the tank and the printer via the one or plurality of tubes, and a stopped state of stopping the liquid from flowing between the tank and the printer via the one or plurality of tubes. The instructions, when executed by the computer, cause the computer to perform a process including circulation processing including supply processing of supplying the liquid from the tank toward the printer via the one or plurality of tubes, by controlling the liquid delivery mechanism to be in the liquid delivery state, and return processing of returning the liquid from the printer toward the tank via the one or plurality of tubes, by controlling the liquid delivery mechanism to be in the liquid delivery state.

The third aspect can achieve the same effects as those of the first aspect.

A fourth aspect of the present disclosure relates to a liquid supply device supplying a liquid to a printer. The liquid supply device includes one or a plurality tubes, a liquid delivery mechanism, a processor and a memory. The one or plurality of tubes configures a supply flow path of the liquid to the printer. The one or plurality of tubes is connected to a tank configured to store the liquid. The tank is provided further upstream than the printer in the supply flow path. The liquid flows through the one or plurality of tubes between the tank and the printer. The liquid delivery mechanism is a mechanism provided in the one or plurality of tubes, and configured to switch between a liquid delivery state of the liquid flowing between the tank and the printer via the one or plurality of tubes, and a stopped state of stopping the liquid from flowing between the tank and the printer via the one or plurality of tubes. The memory stores computer-readable instructions that, when executed by the processor, cause the processor to perform a process. The process includes circulation processing including supply processing of supplying the liquid from the tank toward the printer via the one or plurality of tubes, by controlling the liquid delivery mechanism to be in the liquid delivery state, and return processing of returning the liquid from the printer toward the tank via the one or plurality of tubes, by controlling the liquid delivery mechanism to be in the liquid delivery state.

The fourth aspect can achieve the same effects as those of the first aspect.

OVERALL CONFIGURATION OF LIQUID SUPPLY SYSTEM 100

Figure 1:
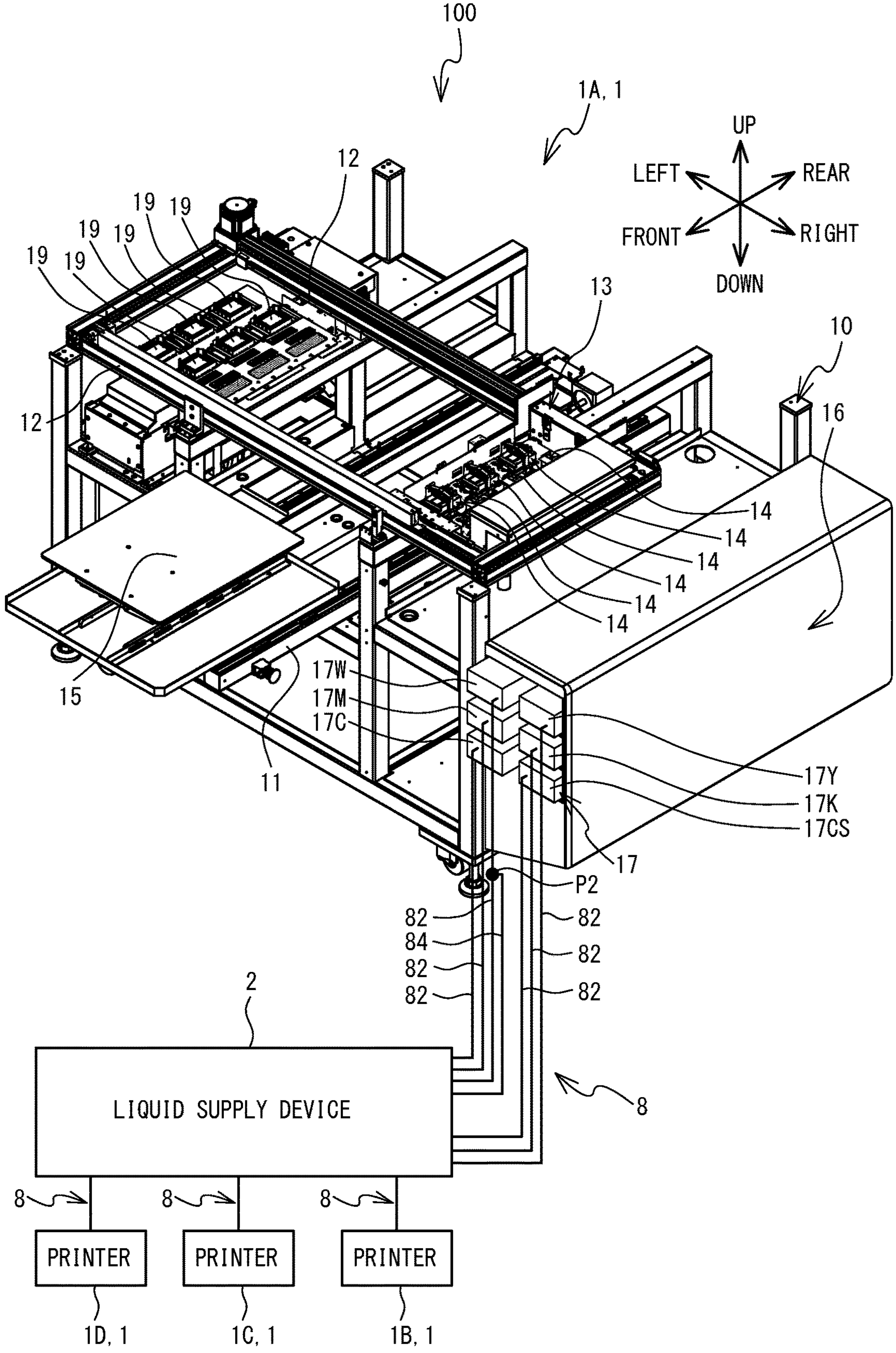
FIG. 1 is an overall view of a liquid supply system.

A liquid supply system 100 according to an embodiment of the present disclosure will be described with reference to the appended drawings. In the present embodiment, mechanical elements in the drawings show an actual scale in each of the drawings. As shown in FIG. 1, the liquid supply system 100 includes a plurality of printers 1, and a liquid supply device 2. The liquid supply system 100 supplies an ink or a pretreatment agent, for example, as a liquid, to each of the plurality of printers 1, from the liquid supply device 2.

A number of the plurality of printers 1 is not limited to a particular number, and, for example, four printers 1A, 1B, 1C, and 1D are connected to the single liquid supply device 2, using tubes 8. The printer 1 is an inkjet printer, for example, and performs printing by ejecting the ink onto a print medium (not shown in the drawings). The print medium is a cloth, paper, or the like, and is a T-shirt, for example.

The ink is, for example, white (W), black (K), yellow (Y), cyan (C), or magenta (M). Hereinafter, of the five colors of the ink, the white color ink will be referred to as "white ink," and when the four colors of the black, cyan, yellow and magenta inks are collectively referred to, or when one of the inks is not particularly specified, they will be referred to as "color inks."

The white ink is used in printing as a portion representing white in an image, or as a base for the color inks. The color inks are ejected directly onto the print medium, or onto the base created using the white ink, and are used in printing of a color image.

The pretreatment agent is, for example, an aqueous solution containing a cationic polymer and a multivalent metal salt. The pretreatment agent is a base coat agent, for example, and is applied to the print medium before the printing using the color inks or the white ink. The pretreatment agent improves fixing of the ink to the print medium, or improves color development of the inks.

<Mechanical Configuration of Printer 1>

Hereinafter, the upper left direction, the lower right direction, the lower left direction, the upper right direction, the upper direction, and the lower direction in FIG. 1 are, respectively, a left direction, a right direction, a front direction, a rear direction, an upper direction, and a lower direction of the printer 1.

As shown in FIG. 1, the printer 1 is provided with a frame body 10, a conveyor 11, a platen 15, a pair of guide rails 12, a carriage 13, a plurality of heads 14, a plurality of caps 19, and a housing 16. The frame body 10 is configured in a lattice shape by a plurality of shafts, and is fixed inside a cabinet (not shown in the drawings). The conveyor 11 is fixed to a lower portion of the frame body 10, and includes a shaft extending in the front-rear direction, for example.

The platen 15 is positioned above the conveyor 11, and is supported by the conveyor 11. The platen 15 is plate shaped, and extends in the front-rear direction and the left-right direction. The print medium (not shown in the drawings) is placed on the upper surface of the platen 15. The platen 15 is driven by a sub-scanning motor 182 shown in FIG. 11, and is conveyed in the front-rear direction along the conveyor 11. Thus, in the present embodiment, the front-rear direction of the printer 1 is a sub-scanning direction.

The pair of guide rails 12 are respectively fixed to the upper portion of the frame body 10, with an interval between therebetween in the front-rear direction, and each extends in the left-right direction. The carriage 13 is positioned between the pair of guide rails 12 in the front-rear direction, and is supported by the pair of guide rails 12. The carriage 13 is plate shaped, and extends in the front-rear direction and the left-right direction. The plurality of heads 14 are mounted to the carriage 13. A number of the plurality of heads 14 is not limited to a particular number, and there are six of the heads 14, for example.

The head 14 has a cuboid shape. A nozzle surface (not shown in the drawings) is provided on the lower surface of the head 14. The nozzle surface is positioned higher than the platen 15, and is exposed downward from the carriage 13. The head 14 is driven by a head driver 183 shown in FIG. 11, and ejects the ink or the pretreatment agent from the nozzle surface. The head driver 183 is configured by piezoelectric elements or by heater elements, for example. The plurality of heads 14 include the heads 14 for ejecting the white ink, the heads 14 for ejecting the color ink, and the heads 14 for ejecting the pretreatment agent, for example.

Figure 3:
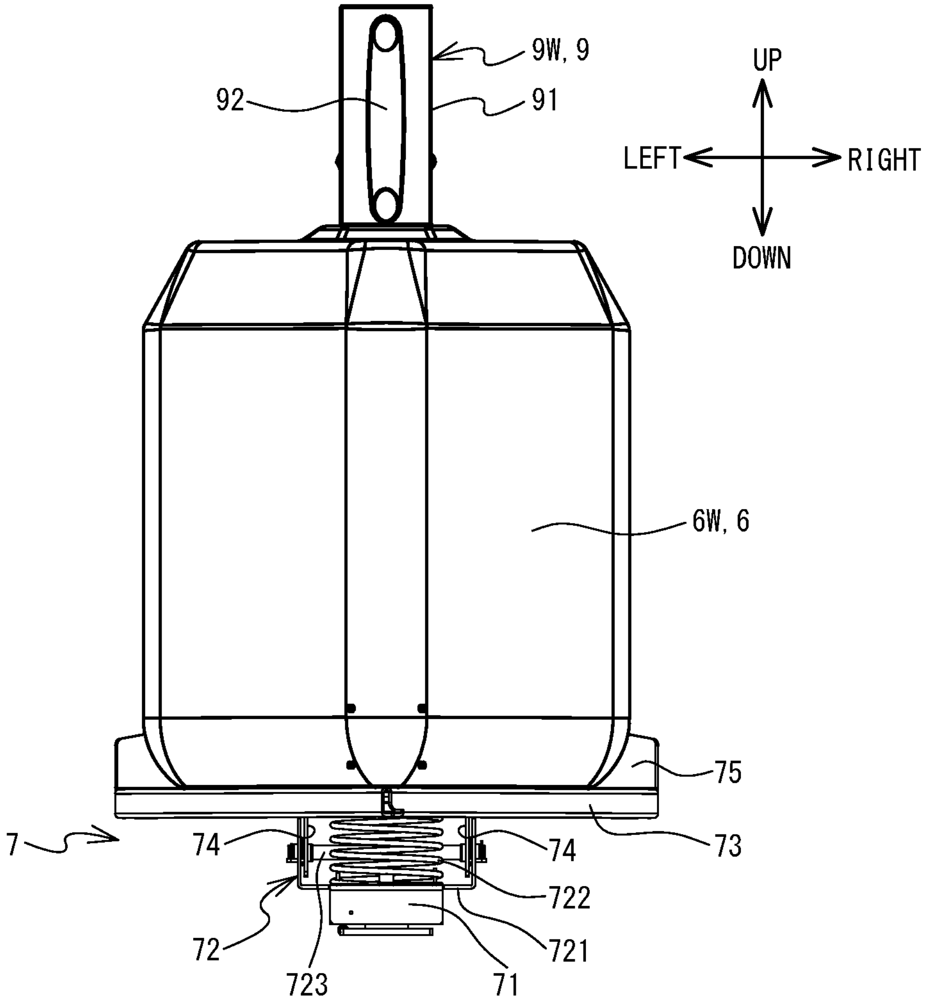
FIG. 3 is a front view of a placement unit 7 and a server tank.

As a result of the carriage 13 being driven by a main scanning motor 181 shown in FIG. 3, the carriage 13 is conveyed in the left-right direction along the pair of guide rails 12. In this way, the heads 14 are also conveyed in the left-right direction. Thus, in the present embodiment, the left-right direction of the printer 1 is a main scanning direction.

The plurality of caps 19 are provided to the left of a movement path of the platen 15 and below a movement path of the plurality of heads 14. A number of the plurality of caps 19 is not limited to a particular number, and is six, for example, which is the same number as the plurality of heads 14. The plurality of caps 19 are disposed at positions corresponding to arrangement positions of the plurality of heads 14.

As a result of the plurality of caps 19 moving upward in a state in which the plurality of heads 14 are positioned above the plurality of caps 19, the caps 19 respectively closely adhere to the nozzle surfaces of the corresponding heads 14. As a result of the plurality of caps 19 moving downward, the caps 19 respectively separate from the nozzle surfaces of the corresponding heads 14.

The housing 16 is fixed to a right portion of the frame body 10. A plurality of main tanks 17 are housed inside the housing 16. A number of the main tanks 17 is not limited to a particular number, and there are six main tanks 17W, 17M, 17C, 17Y, 17K, and 17CS, for example. The main tank 17 may be configured by a cartridge.

The plurality of main tanks 17 respectively receive the supply of the liquid from the liquid supply device 2, and store the supplied liquid. For example, the main tanks 17W, 17M, 17C, 17Y, 17K, and 17CS respectively receive the supply of the white (W) ink, the magenta (M) ink, the cyan (C) ink, the yellow (Y) ink, and the black (K) ink, and the pretreatment agent from the liquid supply device 2.

The plurality of main tanks 17 are respectively connected to one or a plurality of the plurality of heads 14, via sub pouches (not shown in the drawings). As a result of the driving of a supply mechanism 184 shown in FIG. 11, the printer 1 supplies the inks or the pretreatment agent from each of the plurality of main tanks 17 to the plurality of heads 14, via the sub pouches. The supply mechanism 184 is configured by one or both of a pump and a valve, and is provided in each of flow paths between the main tanks 17 and the heads 14.

For example, the printer 1 supplies the white ink from the main tank 17W, via the sub pouch, to the heads 14, of the plurality of heads 14, for ejecting the white ink. The printer 1 supplies the color inks from the main tanks 17M, 17C, 17Y, and 17K, via the sub pouches, to the heads 14, of the plurality of heads 14, for ejecting the color inks. The printer 1 supplies the pretreatment agent from the main tank 17CS, via the sub pouch, to the heads 14, of the plurality of heads 14, for ejecting the pretreatment agent.

In the above-described configuration, the printer 1 performs pretreatment processing before printing processing, for example. For example, in the pretreatment processing, the printer 1 causes the carriage 13 to reciprocate in the left-right direction by the driving of the main scanning motor 181 shown in FIG. 11, while causing the platen 15 to move in the front-rear direction by the driving of the sub-scanning motor 182 shown in FIG. 11. The heads 14 eject the pretreatment agent supplied from the main tank 17CS, while moving in the left-right direction.

After the pretreatment processing, the printer 1 prints a print image on the print medium by the print processing. For example, in the print processing, the printer 1 causes the carriage 13 to reciprocate in the left-right direction by the driving of the main scanning motor 181 shown in FIG. 11, while causing the platen 15 to move in the front-rear direction by the driving of the sub-scanning motor 182 shown in FIG. 11. The heads 14 eject the inks supplied from the main tanks 17W, 17M, 17C, 17Y, and 17K, while moving in the left-right direction. In this way, the print image is printed on the print medium.

<Mechanical Configuration of Liquid Supply Device 2>

Figure 2:
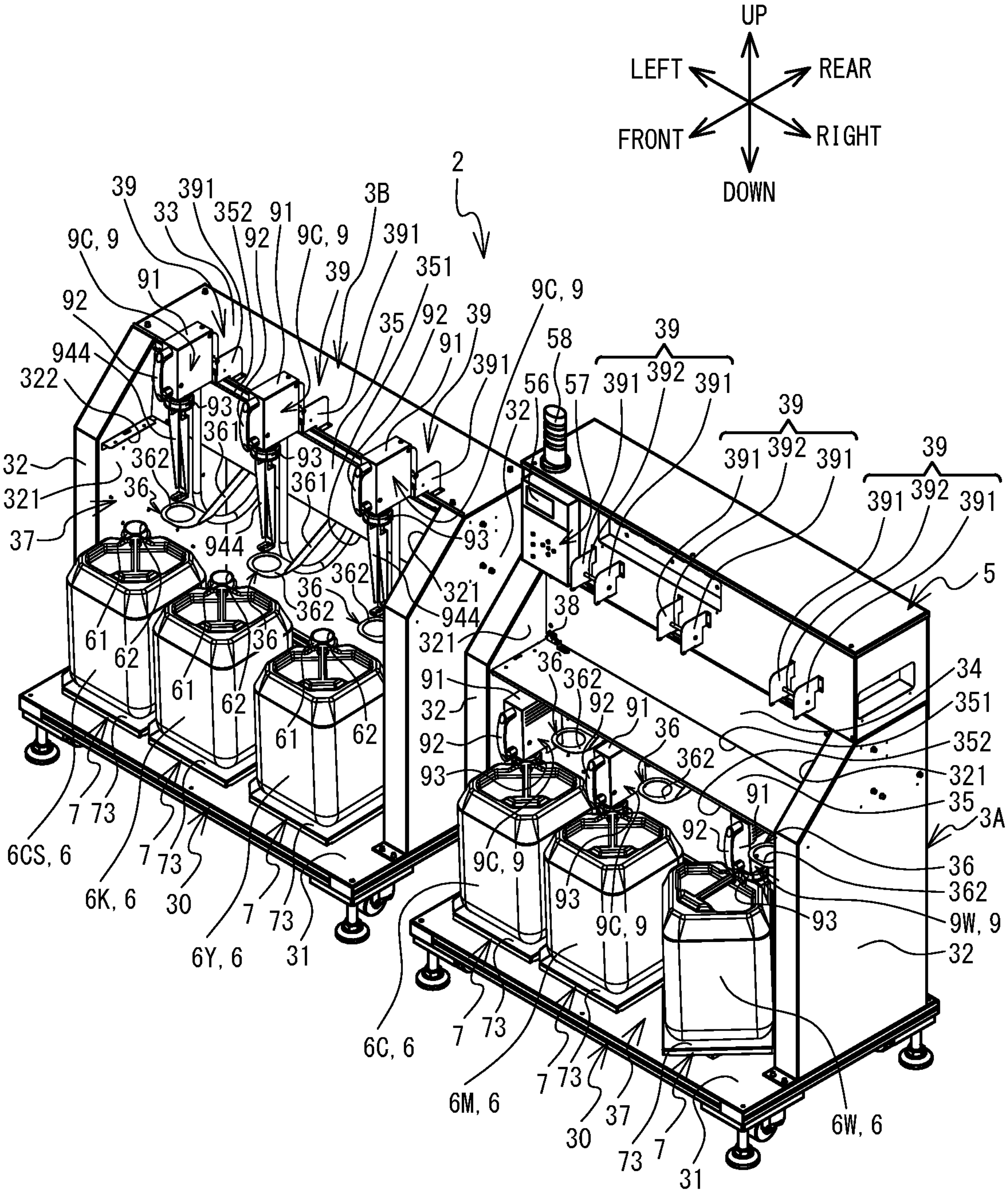
FIG. 2 is a perspective view of a liquid supply device.

Hereinafter, the upper left direction, the lower right direction, the lower left direction, the upper right direction, the upper direction, and the lower direction in FIG. 2 are, respectively, a left direction, a right direction, a front direction, a rear direction, an upper direction, and a lower direction of the liquid supply device 2. The left-right direction and the front-rear direction of the liquid supply device 2 may be respectively aligned with, or may intersect, the left-right direction and the front-rear direction of the printer 1.

The liquid supply device 2 is provided with a main unit 3A and a sub-unit 3B. In the present embodiment, the main unit 3A and the sub-unit 3B differ from each other in the presence or absence of a control box 5 to be described later, a type of the liquid stored in a server tank 6 to be described later, and a configuration of a mount mechanism 9W to be described later. Hereinafter, the structure of the main unit 3A will be described in detail, and where, of the configuration of the sub-unit 3B, the configuration is the same as that of the main unit 3A, the same reference signs will be assigned as for the main unit 3A, and the description thereof will be omitted or simplified.

The main unit 3A includes a placement base 30, the control box 5, a plurality of placement units 7, a plurality of the server tanks 6, and a plurality of the mount mechanisms 9. The placement base 30 includes a bottom plate 31, a pair of pillars 32, a top plate 33 (refer to the sub-unit 3B), a fixed plate 34, and a movable plate 35. The bottom plate 31 is positioned at a lower portion of the placement base 30, and extends in the front-rear direction and the left-right direction. The pair of pillars 32 extend upward from a left end a right end, respectively, of the bottom plate 31.

Hereinafter, a space enclosed by the bottom plate 31 and the pair of pillars 32 will be referred to as a "placement space 37". The top plate 33 (refer to the sub-unit 3B), extends in the left-right direction between the respective upper ends of the pair of pillars 32. The front end of the top plate 33 is positioned at a central portion of the placement space 37, in the front-rear direction.

The fixed plate 34 and the movable plate 35 are respectively provided at an upper portion of the placement space 37. The fixed plate 34 extends in the left-right direction between the pair of pillars 32, and extends downward from the front end of the top plate 33 (refer to the sub-unit 3B). The fixed plate 34 is fixed to the top plate 33.

A first end 351 of the movable plate 35 extends in the left-right direction, and is coupled to the lower end of the fixed plate 34 via a hinge (not shown in the drawings). The movable plate 35 moves between an open position and a closed position as a result of rotating around the first end 351 as an axis. Note that FIG. 2 shows a state in which the movable plate 35 of the sub-unit 3B is positioned at the open position, and shows a state in which the movable plate 35 of the main unit 3A is positioned at the closed position.

When the movable plate 35 is positioned at the open position (refer to the sub-unit 3B), the movable plate 35 extends in the up-down direction and the left-right direction, and a second end 352 of the movable plate 35 is positioned higher than the first end 351 of the movable plate 35. In this case, of the placement space 37, a portion further to the front than the top plate 33 is open upward.

When the movable plate 35 is positioned at the closed position (refer to the main unit 3A), the movable plate 35 extends in the front-rear direction and the left-right direction, and the second end 352 of the movable plate 35 is positioned to the front of the first end 351 of the movable plate 35. In this case, of the placement space 37, the portion further to the front than the top plate 33 is covered, from above, by the movable plate 35.

When the movable plate 35 rotates in the clockwise direction in a right side view from the closed position (refer to the main unit 3A), the movable plate 35 comes into contact with the fixed plate 34, from the front, at the open position (refer to the sub-unit 3B). As a result of the fixed plate 34 coming into contact with the movable plate 35, the movable plate 35 is suppressed from rotating further in the clockwise direction in the right side view from the open position (refer to the sub-unit 3B).

Each of the pair of pillars 32 includes a facing surface 321. The pair of facing surfaces 321 face each other in the left-right direction. Stoppers 322 are provided on each of the pair of facing surfaces 321. FIG. 2 shows one of the pair of stoppers 322, in the sub-unit 3B. The pair of stoppers 322 respectively protrude from the facing surfaces 321 so as to face each other in the left-right direction.

The stoppers 322 are positioned further to the front than the fixed plate 34, and are positioned at a position of the lower end of the fixed plate 34 in the up-down direction. When the movable plate 35 rotates in the counterclockwise direction in the right side view from the open position (refer to the sub-unit 3B), the movable plate 35 comes into contact, from above, with the stoppers 322, at the closed position (refer to the main unit 3A). As a result of the stoppers 322 coming into contact with the movable plate 35, the movable plate 35 is suppressed from rotating further in the counterclockwise direction in the right side view from the closed position (refer to the main unit 3A).

An open/closed sensor 38 is provided at the lower left portion of the fixed plate 34. The open/closed sensor 38 is a proximity switch, and detects whether or not the movable plate 35 is positioned at the open position (refer to the sub-unit 3B). A plurality of receptors 36 are provided at the lower end of the fixed plate 34. A number of the plurality of receptors 36 is not limited to a particular number, and is the same number as a number of the placement units 7 to be described later, for example, which is three. The plurality of receptors 36 are aligned alongside each other in the left-right direction.

The receptor 36 is provided with an extension plate 361 (refer to the sub-unit 3B) and a receptacle 362. The extension plate 361 extends from the lower end of the fixed plate 34 so as to extend to the left and downward the further toward the front. The receptacle 362 is fixed to the lower end of the extension plate 361. The receptacle 362 is positioned further to the front than the fixed plate 34. The receptacle 362 receives the liquid dripping from the mount mechanism 9 to be described later, when replacing the server tank 6.

The control box 5 is provided at the upper surface of the top plate 33 in the main unit 3A. Note that the sub-unit 3B is not provided with the control box 5. A control device 50 (refer to FIG. 12) to be described later is provided inside the control box 5.

A display 56, an operation portion 57, and a warning light 58 are provided at the control box 5. The display 56 is positioned at the upper left portion of the front surface of the control box 5, and displays various information. The operation portion 57 includes a plurality of buttons, for example, and is positioned below the display 56 at the front surface of the control box 5. A user inputs various information to the liquid supply device 2 by operating the operation portion 57.

The warning light 58 is positioned at the left end of the upper surface of the control box 5. The warning light 58 is, for example, a three-color layered light, and emits light in various light emission modes in accordance with a state of the liquid supply system 100. The state of the liquid supply system 100 includes a normal operation state, an error state, and the like. The user can ascertain the state of the liquid supply system 100 by the light emission mode of the warning light 58.

A plurality of support portions 39 are provided at the front surface of the control box 5. A number of the plurality of support portions 39 is not limited to a particular number and is, for example, the same number as the number of the placement units 7 to be described later, which is three. The plurality of support portions 39 are aligned alongside each other in the left-right direction. The plurality of support portions 39 are respectively positioned above placement plates 73 to be described later, and overlap the placement plates 73 to be described later, in the up-down direction. Note that in the present embodiment, "a certain member overlaps another member in a specific direction" means that, when the certain member is seen from the specific direction, at least a part of the certain member can be seen to be overlapping at least a part of the other member.

The support portion 39 includes a pair of plates 391 and an engagement shaft 392. The pair of plates 391 respectively extend to the front from the front surface of the control box 5 and face each other in the left-right direction. The engagement shaft 392 extends in the left-right direction between the pair of plates 391. When replacing the server tank 6, the user removes the mount mechanism 9 to be described later from the server tank 6, and hooks the removed mount mechanism 9 onto the support portion 39. Note that, in the sub-unit 3B, the plurality of support portions 39 are respectively provided at the front end of the top plate 33.

The plurality of placement units 7 are respectively provided on the bottom plate 31, and are aligned alongside each other in the left-right direction. A number of the plurality of placement units 7 is not limited to a particular number and is three, for example. A structure of the placement unit 7 will be described in detail later.

The server tanks 6 are positioned outside the plurality of printers 1 shown in FIG. 1, and are placed on the placement units 7, for example. The server tank 6 is a cuboid shape, and stores the liquid. The server tank 6 includes a protrusion 61. The protrusion 61 protrudes upward from a corner of the upper surface of the server tank 6. An external shape of the protrusion 61 is a circular shape as seen from above. An external screw thread is formed in the outer peripheral surface of the protrusion 61. An opening 62 is formed in the upper end of the protrusion 61. The opening 62 has a circular shape as seen from above. The interior and exterior of the server tank 6 are linked via the opening 62.

A number of the plurality of server tanks 6 is not limited to a particular number, and is three in the main unit 3A, for example. The plurality of server tanks 6 includes server tanks 6W, 6M, and 6C. The server tanks 6W, 6M, and 6C are aligned in order of the server tanks 6W, 6M, and 6C from the right toward the left. The server tanks 6W, 6M, and 6C respectively store the white (W), magenta (M), and cyan (C) inks.

Note that in the sub-unit 3B, a number of the plurality of server tanks 6 is not limited to a particular number, and is three, for example. In the sub-unit 3B, the plurality of server tanks 6 includes server tanks 6Y, 6K, and 6CS. The server tanks 6Y, 6K, and 6CS are aligned in order of the server tanks 6Y, 6K, and 6CS from the right toward the left. The server tanks 6Y, 6K, and 6CS respectively store the yellow (Y) and black (K) inks, and the pretreatment agent.

A maximum capacity of the liquid that the server tank 6 can store is not limited to a particular capacity, and is greater than a maximum capacity of the liquid that can be stored by the main tank 17, for example. For example, the maximum capacity of the liquid that can be stored by the server tank 6W is greater than the maximum capacity of the liquid that can be stored by the single main tank 17W, and is greater than a total maximum capacity that can be stored by the respective main tanks 17W of the printers 1A, 1B, 1C, and 1D.

The mount mechanism 9 is mounted to the server tank 6 and removed from the server tank 6 via the opening 62. Note that FIG. 2 shows a state in which the mount mechanism 9 is mounted to the server tank 6 in the main unit 3A, and shows a state in which the mount mechanism 9 is removed from the server tank 6 in the sub-unit 3B. The structure of the mount mechanism 9 will be described in detail later.

<Detailed Structure of Placement Unit 7>

As shown in FIG. 2, of the plurality of placement units 7, an orientation of the placement unit 7 on which the server tank 6W is placed is different, by 450 in the clockwise direction, with respect to the other placement units 7, as seen from above. Hereinafter, the placement unit 7 will be described while taking the orientation of the placement unit 7 on which the server tank 6W is placed will be taken as a reference. Note that the orientations of each of the plurality of placement units 7 may be the same as each other as seen from above.

Figure 4:
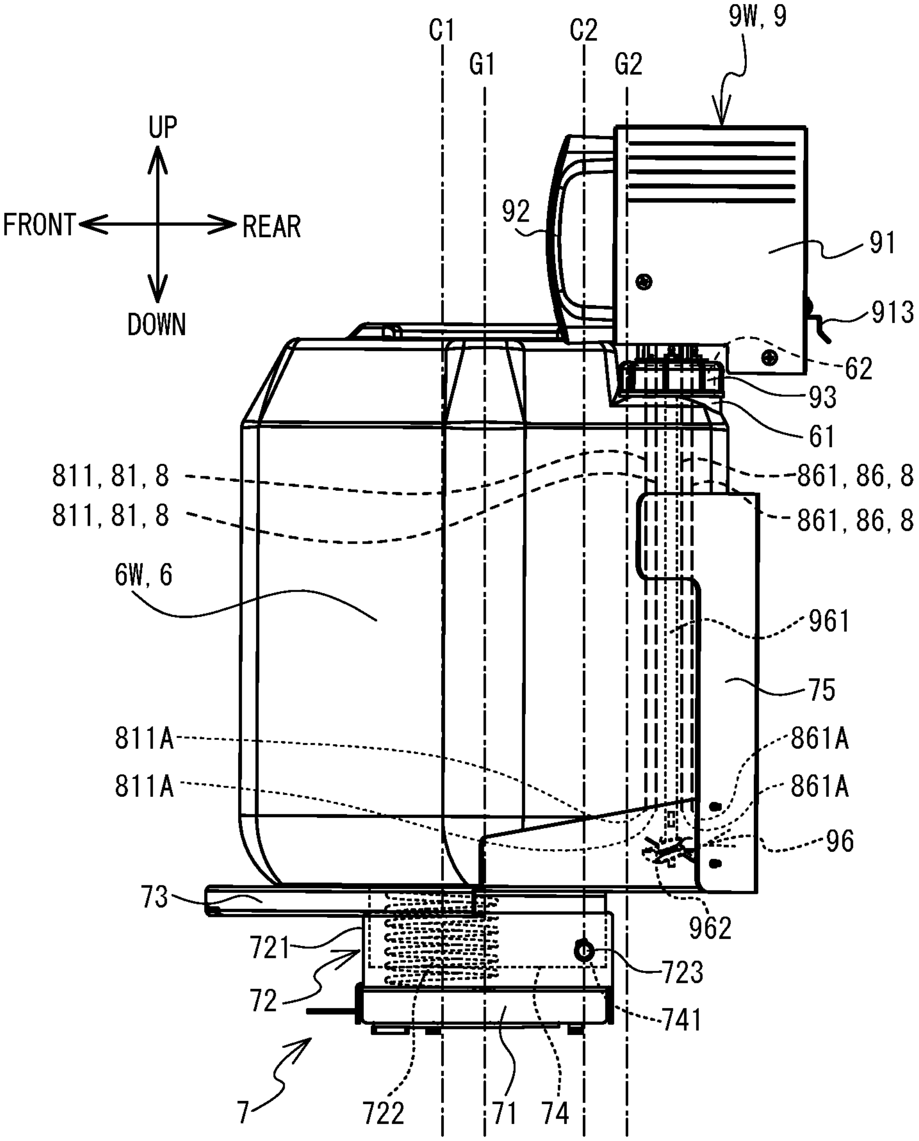
FIG. 4 is a right side view of the placement unit and the server tank in a state in which the server tank 6W is in a horizontal posture.
Figure 5:
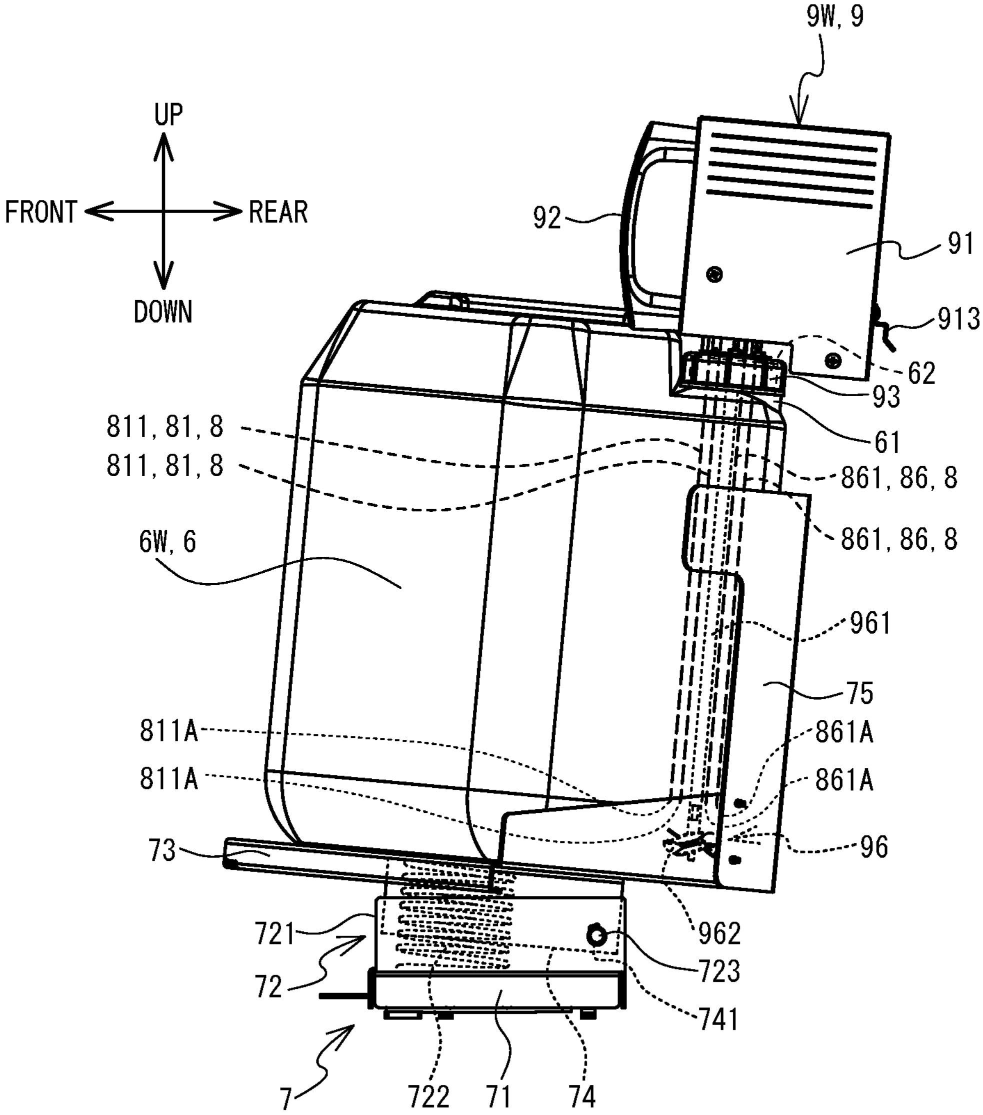
FIG. 5 is a right side view of the placement unit and the server tank in a state in which the server tank is in a tilted posture.

As shown in FIG. 3 to FIG. 5, the placement unit 7 includes a server sensor 71, a tilt mechanism 72, and the placement plate 73. The server sensor 71 is a weight sensor, for example, and is fixed to the upper surface of the bottom plate 31 shown in FIG. 2. The server sensor 71 detects a server remaining amount using the weight. The server remaining amount is a remaining amount of the liquid inside the server tank 6 placed on the placement unit 7.

When the server remaining amount has decreased, the tilt mechanism 72 displaces the server tank 6W from a horizontal posture (refer to FIG. 4) to a tilted posture (refer to FIG. 5) to be described later. The tilt mechanism 72 is provided with a guide plate 721, an elastic body 722, and a shaft 723.

As shown in FIG. 3, the guide plate 721 has a U-shape when seen from the front, and is open upward. A pair of upper ends of the guide plate 721 respectively extend in the front-rear direction and are positioned at the same height as each other. The guide plate 721 is fixed on the top of the server sensor 71.

The elastic body 722 is a compression coil spring, for example, and extends upward from a bottom surface of the guide plate 721. When the elastic body 722 is at an equilibrium length, the upper end of the elastic body 722 is positioned higher than the upper ends of the guide plate 721. The shaft 723 extends in the left-right direction between the pair of side surfaces of the guide plate 721. As shown in FIG. 4, the shaft 723 is positioned further to the rear than the elastic body 722.

As shown in FIG. 3, the placement plate 73 is positioned above the elastic body 722, and is supported by the elastic body 722. When seen from above, the placement plate 73 has a shape corresponding to the outer shape of the server tank 6, and has a rectangular shape, for example. As shown in FIG. 4, the server tank 6 is placed on the upper surface of the placement plate 73 with an orientation such that the opening 62 is disposed at a rear corner of the placement plate 73 when seen from above.

A stopper 75 is provided at the placement plate 73. The stopper 75 is a plate and extends upward from two edges including the rear corner of the placement plate 73. The stopper 75 suppresses the server tank 6 on the placement plate 73 from falling to the rear from the placement plate 73.

As shown in FIG. 3, a pair of guide plates 74 are provided at the placement plate 73. The pair of guide plates 74 extend downward from the bottom surface of the placement plate 73. The pair of guide plates 74 are disposed between a pair of side walls of the guide plate 721.

As shown in FIG. 4, support holes 741 are provided in each of rear portions of the pair of guide plates 74. Note that, of the pair of guide plates 74, FIG. 4 shows a portion of the right guide plate 74 that is hidden by the guide plate 721 using dotted lines. An inner diameter of the support hole 741 is larger than an outer diameter of the shaft 723. The shaft 723 is disposed inside each of the support holes 741 in the pair of guide plates 74.

According to the above-described configuration, as shown in FIG. 3 and FIG. 4, when the server tank 6 is placed on the placement plate 73, the elastic body 722 contracts downward in accordance with the server remaining amount. When the elastic body 722 has contracted by a predetermined length, the placement plate 73 comes into contact with the pair of upper ends of the guide plate 721. In this case, the pair of upper ends of the guide plate 721 respectively extend in the front-rear direction, and thus, the placement plate 73 does not tilt and the placement plate 73 extends in the front-rear direction and the left-right direction. When the placement plate 73 extends in the front-rear direction and the left-right direction, the bottom surface of the server tank 6 also extends in the front-rear direction and the left-right direction.

Hereinafter, the posture of the server tank 6 when the bottom surface of the server tank 6 extends in the front-rear direction and the left-right direction will be referred to as a "horizontal posture." When the server tank 6 is placed on the placement plate 73, a minimum server remaining amount when the placement plate 73 is in surface contact with the pair of upper ends of the guide plate 721 will be referred to as a "deformation remaining amount." The deformation remaining amount is established by the Young's modulus of the elastic body 722.

As the server remaining amount, a "first server remaining amount," a "second server remaining amount," and a "third server remaining amount" are defined. The first server remaining amount is greater than the deformation remaining amount. The second server remaining amount is smaller than the first server remaining amount, and is greater than the deformation remaining amount. The third server remaining amount is smaller than the deformation remaining amount.

Even when the server tank 6 is placed on the placement plate 73 and the server remaining amount decreases from the first server remaining amount to the second server remaining amount, since the server remaining amount is greater than the deformation remaining amount, the server tank 6 maintains the horizontal posture.

On the other hand, as shown in FIG. 5, when the server tank 6 is placed on the placement plate 73 and the server remaining amount decreases from the first server remaining amount to the third server remaining amount, the server remaining amount becomes smaller than the deformation remaining amount, and thus, the elastic body 722 elastically deforms so as to extend upward. In this case, the placement plate 73 rotates in the clockwise direction, as seen from the right, around the shaft 723. In this way, the placement plate 73 tilts from the upper direction in the downward direction the further from the front to the rear.

When the placement plate 73 tilts from the upper direction in the downward direction the further from the front to the rear, the bottom surface of the server tank 6 also tilts from the upper direction toward the downward direction the further from the front to the rear. Hereinafter, the posture of the server tank 6 when the bottom surface of the server tank 6 tilts from the upper direction toward the downward direction the further from the front to the rear will be referred to as a "tilted posture." Note that in the tilted posture, the more the server remaining amount decreases, the larger an angle of the bottom surface of the server tank 6 becomes with respect to the front-rear direction.

As described above, when the server remaining amount decreases from the first server remaining amount to the third server remaining amount, the tilt mechanism 72 displaces the server tank 6W from the horizontal posture to the tilted posture. On the other hand, when the server remaining amount decreases from the first server remaining amount to the second server remaining amount, the tilt mechanism 72 does not displace the server tank 6W from the horizontal posture to the tilted posture. In the present embodiment, with respect to "when the server remaining amount decreases, the tilt mechanism 72 displaces the server tank 6W from the horizontal posture to the tilted posture," it is sufficient that there be a change in the server remaining amount that changes the posture of the server tank 6W as a result of the decrease in the server remaining amount, such as when the server remaining amount decreases from the first server remaining amount to the third server remaining amount, for example. In other words, "when the server remaining amount decreases, the tilt mechanism 72 displaces the server tank 6W from the horizontal posture to the tilted posture" may also include the change in the server remaining amount that does not change the posture of the server tank 6W as a result of the decrease in the server remaining amount, such as when the server remaining amount decreases from the first server remaining amount to the second server remaining amount.

As shown in FIG. 4, in the front-rear direction, a center C1 of the elastic body 722 is positioned further to the front than a center C2 of the shaft 723. In a state in which the mount mechanism 9 is mounted to the server tank 6, a center of gravity G1 of the server tank 6 itself (not including the mount mechanism 9) is positioned further to the front than the opening 62, and is positioned between the center C1 of the elastic body 722 and the center C2 of the shaft 723 in the front-rear direction. A center of gravity G2 of a unit of the server tank 6 and the mount mechanism 9 is positioned further to the rear than the center of gravity G1 of the server tank 6 itself (not including the mount mechanism 9), and is positioned further to the rear than the center C2 of the shaft 723. As a result, in accordance with the server remaining amount decreasing, the server tank 6 is more easily displaced from the horizontal posture shown in FIG. 4 to the tilted posture shown in FIG. 5.

<Detailed Structure of Mount Mechanism 9>

As shown in FIG. 2, hereinafter, the mount mechanism 9 corresponding to the server tank 6W will be referred to as a "mount mechanism 9W." When the mount mechanisms 9 respectively corresponding to the server tanks 6M, 6C, 6Y, 6K, and 6CS are collectively referred to, or when no particular distinction is made therebetween, they will be referred to as a "mount mechanism 9C." The configuration of the mount mechanism 9 is different between the mount mechanism 9W and the mount mechanism 9C.

In the present embodiment, the mount mechanism 9W and the mount mechanism 9C differ from each other in the presence or absence of an agitation mechanism 96 to be described later (refer to FIG. 6), respective numbers of connectors 97 to be described later (refer to FIG. 7 and FIG. 8), and connection configurations of the tubes 8 shown in FIG. 7 and FIG. 8. Hereinafter, the structure of the mount mechanism 9W will be described in detail, and, of the configuration of the mount mechanism 9C, the configuration that is the same as that of the mount mechanism 9W will be assigned the same reference signs, and a description thereof will be omitted or simplified.

Figure 6:
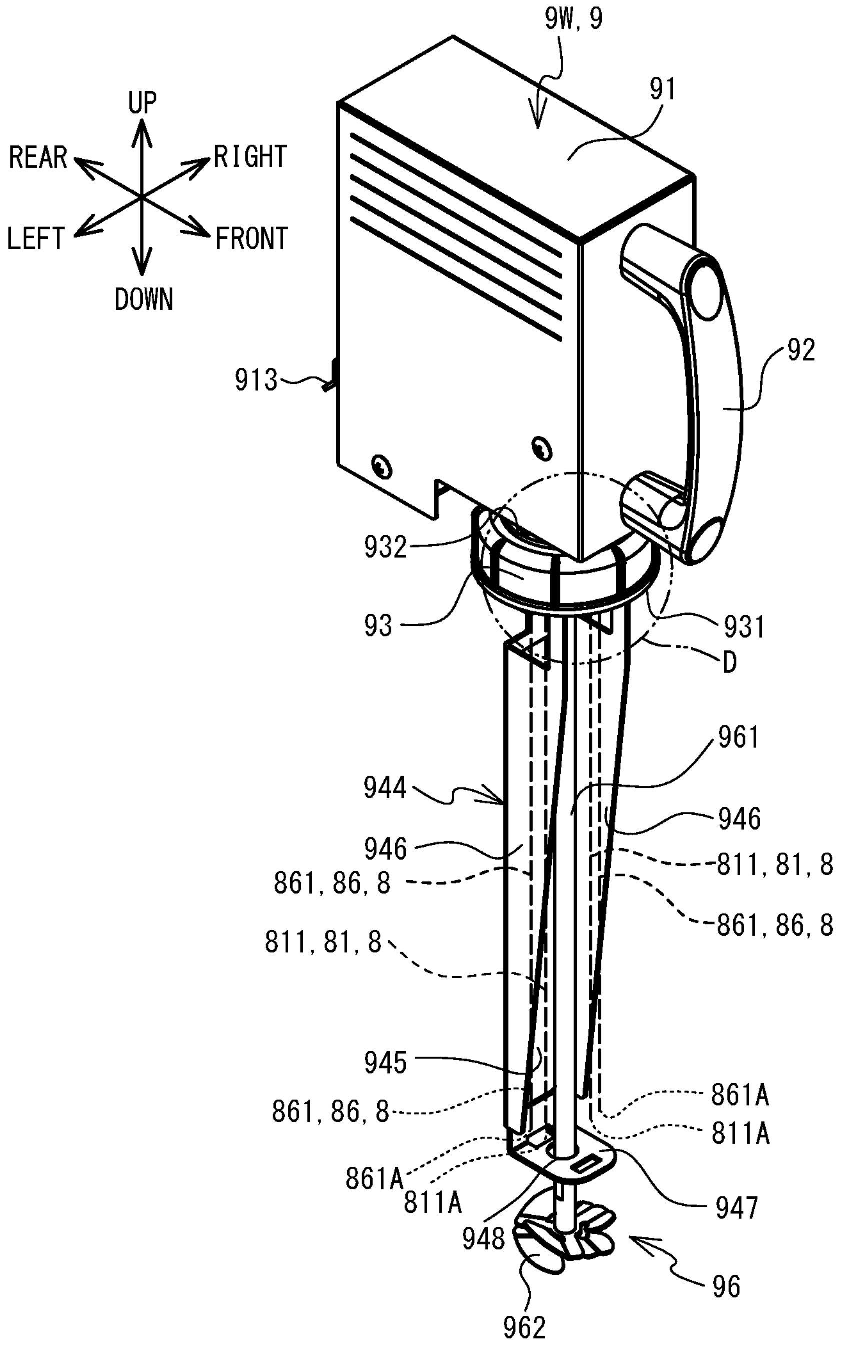
FIG. 6 is a perspective view of a mount mechanism.
Figure 7:
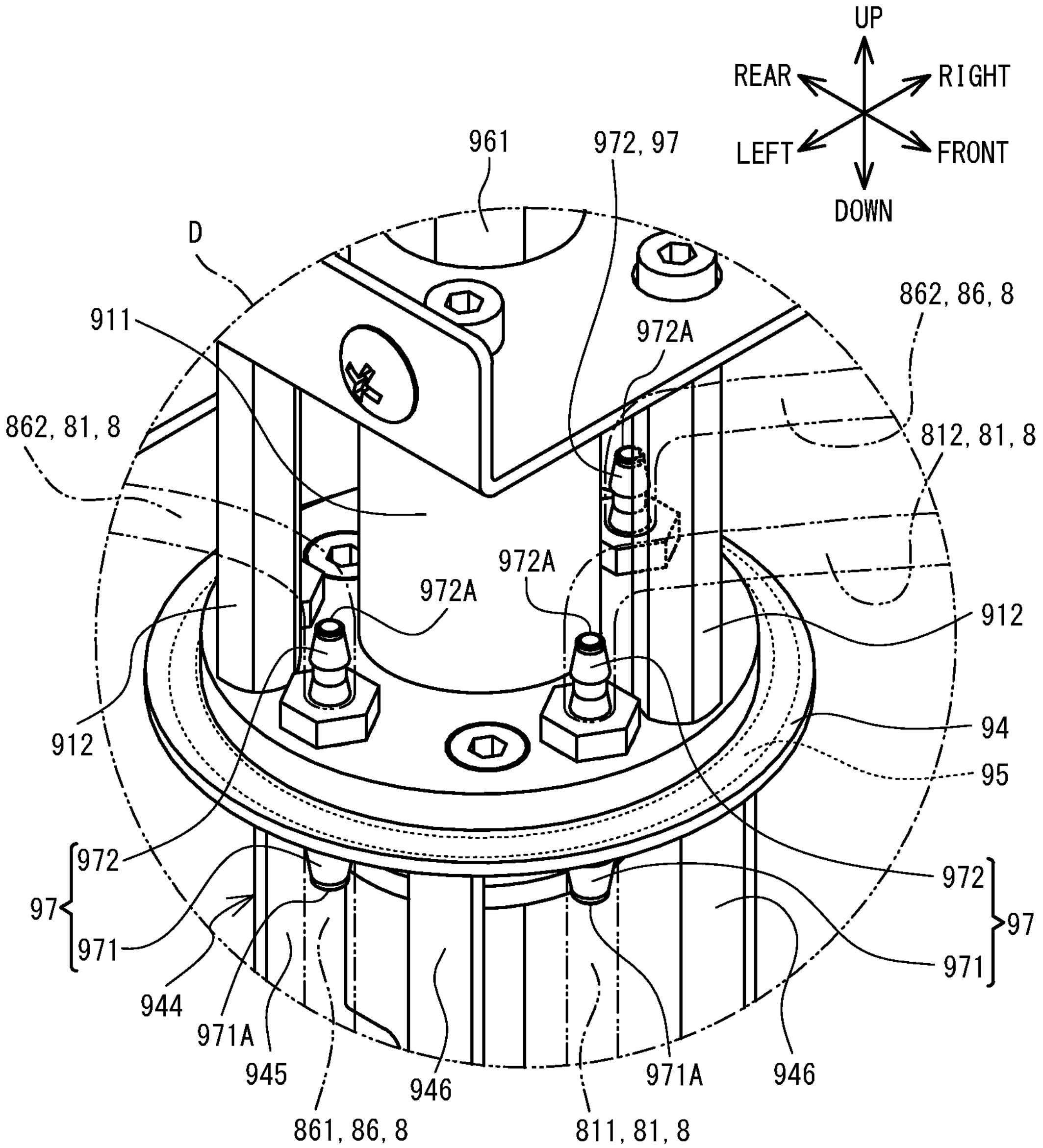
FIG. 7 is a perspective view of a region D shown in FIG. 6.
Figure 8:
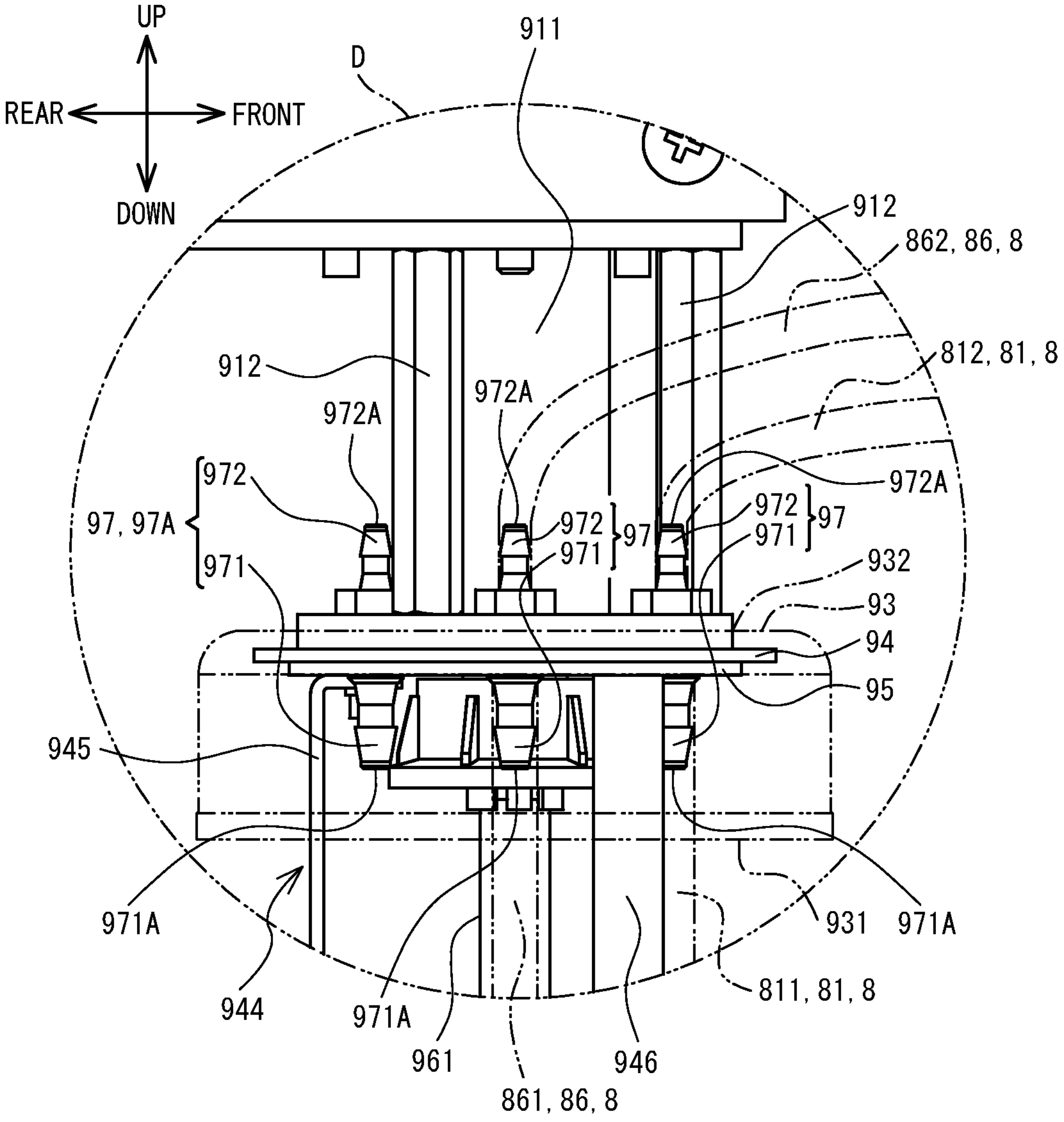
FIG. 8 is a left side view of the region D shown in FIG. 6.

As shown in FIG. 6, the mount mechanism 9W is provided with a cabinet 91, a handle 92, a cap 93, a support plate 94 shown in FIG. 7 and FIG. 8, a washer 95 shown in FIG. 7 and FIG. 8, a guide plate 944, the agitation mechanism 96, and the tubes. Note that the mount mechanism 9C shown in FIG. 2 is not provided with the agitation mechanism 96. FIG. 7 omits illustration of the cap 93. FIG. 8 shows the cap 93 using virtual lines.

The cabinet 91 is a cuboid shape. An engagement hook 913 is provided at the cabinet 91. The engagement hook 913 extends downward after extending to the rear from the rear surface of the cabinet 91. When the support portion 39 shown in FIG. 2 supports the mount mechanism 9, the engagement hook 913 engages with the engagement shaft 392 shown in FIG. 2.

The handle 92 extends downward after extending to the front from the front surface of the cabinet 91. After extending downward, the handle 92 extends to the rear as far as the front surface of the cabinet 91. The handle 92 is positioned on the opposite side of the cabinet 91 to the engagement hook 913. The user handles the mount mechanism 9 while holding the handle 92.

The cap 93 has a circular cylindrical shape. An opening 931 is formed in the lower end of the cap 93. The opening 931 has a circular shape. The inner diameter of the opening 931 is substantially the same as the diameter of the protrusion 61. An opening 932 is formed in the upper surface of the cap 93. The diameter of the opening 932 is smaller than the diameter of the opening 931. An internal screw thread (not shown in the drawings) is formed in the inner peripheral surface of the cap 93. The cap 93 is mounted to the protrusion 61 by screwing together the internal screw thread of the cap 93 with the external screw thread of the protrusion 61.

As shown in FIG. 7 and FIG. 8, a central shaft 911 and a plurality of connection shafts 912 are provided in the cabinet 91. The central shaft 911 has a cylindrical shape and extends downward from the cabinet 91. The plurality of connection shafts 912 are respectively positioned around the central shaft 911 in the radial direction of the central shaft 911, and extend downward from the cabinet 91. The central shaft 911 and the plurality of connection shafts 912 penetrate the inside of the openings 931 and 932.

The support plate 94 has a ring shape. The support plate 94 connects the lower ends of each of the central shaft 911 and the plurality of connection shafts 912. The outer diameter of the support plate 94 is smaller than the diameter of the opening 931, is larger than the diameter of the opening 932, and is larger than the inner diameter of the protrusion 61.

The outer diameter of the support plate 94 is smaller than the diameter of the opening 931, and thus, when the cap 93 moves downward, the support plate 94 is disposed inside the cap 93. The outer diameter of the support plate 94 is larger than the diameter of the opening 932, and thus, when the cap 93 moves downward, the cap 93 is hooked on the support plate 94. Thus, using the cabinet 91 and the support plate 94, the cap 93 is held between the cabinet 91 and the support plate 94 in the up-down direction.

An opening (not shown in the drawings) and a plurality of connectors 97 are provided at the support plate 94. The opening penetrates the center of the support plate 94 in the up-down direction, and is linked to an internal space of the central shaft 911. The plurality of connectors 97 are provided around the central shaft 911 in the radial direction of the central shaft 911. A number of the plurality of connectors 97 is not limited to a particular number, and in the mount mechanism 9W is five, for example. Note that in each of FIG. 7 and FIG. 8, three of the five connectors 97 are illustrated. In the mount mechanism 9C shown in FIG. 2, the number of the plurality of connectors 97 is three, for example.

Each of the plurality of connectors 97 includes a first connector 971 and a second connector 972. Each of the first connector 971 and the second connector 972 is a coupler plug or a hose nipple, for example. The first connector 971 protrudes downward from the bottom surface of the support plate 94. The second connector 972 protrudes upward from the upper surface of the support plate 94. Openings 971A and 972A are respectively provided in the first connector 971 and the second connector 972. The opening 971A of the first connector 971 and the opening 972A of the second connector 972 are connected to each other.

The tubes 8 configure flow paths of the liquid between the server tank 6 and each of the plurality of printers 1. The tubes 8 are connected to some or all of the plurality of connectors 97. In the mount mechanism 9W, as the tubes 8, two tubes 81 and two tubes 86 are respectively connected to the four connectors 97. Note that FIG. 7 illustrates one of the tubes 81 and the two tubes 86. FIG. 8 illustrates one of the tubes 81 and one of the tubes 86.

The two tubes 81 are respectively configured by a tube 811 and a tube 812. The two tubes 86 are respectively configured by a tube 861 and a tube 862. The two tubes 811 and the two tubes 861 are respectively connected to the first connector 971. In a state in which the mount mechanism 9W is mounted to the server tank 6W, the two tubes 811 and the two tubes 861 respectively extend downward from the first connector 971 toward the inside of the server tank 6W. As shown in FIG. 6, first ends 811A of each of the two tubes 811 and first ends 861A of each of the two tubes 861 are positioned above and in the vicinity of a bottom plate 947 to be described later.

As shown in FIG. 7 and FIG. 8, the two tubes 812 and the two tubes 862 are respectively connected to the second connector 972. After extending upward from the second connector 972, the two tubes 812 and the two tubes 862 respectively extend toward the printer 1. Connection destinations of the tubes 8 including the tubes 812 and 862 will be described in detail later. Illustration of the tubes 812 and 862 is omitted in FIG. 4 to FIG. 6.

Note that the tube 8 is not connected to a connector 97A. The connector 97A is one of the five connectors 97. The connector 97A causes a space inside the server tank 6W to be communicated with the atmosphere. In this way, even when an inter supply device-printer supply operation or an inter supply device-printer circulation operation (to be described later) is performed, pressure inside the server tank 6W is suppressed from changing. The connector 97A need not necessarily have a function of connecting the tubes 8 to the server tank 6W, and may simply be a through hole.

In the mount mechanism 9C shown in FIG. 2, as the tubes 8, two of the tubes 81 are respectively connected to two of the connectors 97. The tube 8 is not connected to one of the three connectors 97. The connector 97 to which the tube 8 is not connected causes the space inside the server tank 6 to be communicated with the atmosphere.

The washer 95 is an elastic body and has a ring shape. The washer 95 is fixed to the bottom surface of the support plate 94. FIG. 7 shows the washer 95 hidden below the support plate 94 using dotted lines. The inner edge of the washer 95 is positioned around the plurality of connectors 97 in the radial direction of the support plate 94. The outer diameter of the washer 95 is larger than the inner diameter of the protrusion 61. The inner diameter of the washer 95 is smaller than the outer diameter of the protrusion 61.

As shown in FIG. 6, the guide plate 944 includes an extension plate 945, a pair of side plates 946, and the bottom plate 947. The extension plate 945 extends downward from the bottom surface of the support plate 94. The extension plate 945 is positioned further to the rear than any of the plurality of connectors 97. The left end of the extension plate 945 is positioned further to the left than any of the plurality of connectors 97. The right end of the extension plate 945 is positioned further to the right than any of the plurality of connectors 97. The pair of side plate 946 extend to the front from both the left and the right ends of the extension plate 945, respectively. The bottom plate 947 extends to the front from the lower end of the extension plate 945. An opening 948 is provided in the bottom plate 947.

Figure 12:
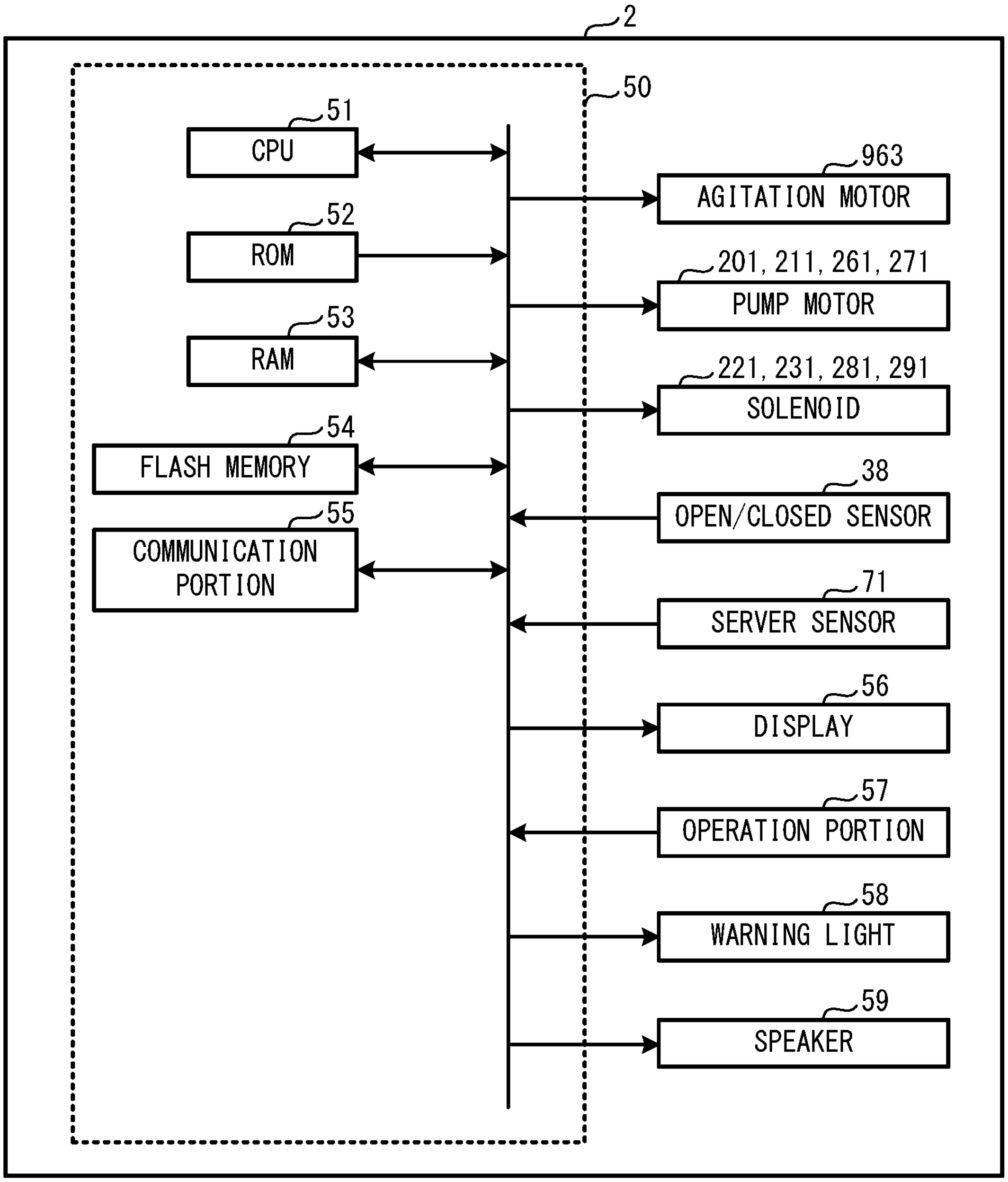
FIG. 12 is a block diagram showing an electrical configuration of the liquid supply device.

The agitation mechanism 96 includes propeller stirrer is provided with a rotation shaft 961, a propeller 962, and an agitation motor 963 shown in FIG. 12. After passing from inside the cabinet 91 through the central shaft 911 shown in FIG. 7, the rotation shaft 961 passes through the opening 948 and extends to a position lower than the bottom plate 947. A bearing (not shown in the drawings) is fixed to the inside of the central shaft 911. The rotation shaft 961 is rotatably supported by the bearing.

The propeller 962 includes a plurality of vanes, and is fixed to the lower end of the rotation shaft 961, and extends to the outside in the radial direction of the rotation shaft 961. The propeller 962 is supported by the support plate 94, via the central shaft 911, the bearing, and the rotation shaft 961. In the state in which the mount mechanism 9W is mounted to the server tank 6W, the propeller 962 is positioned in the vicinity of the bottom surface of the server tank 6W inside the server tank 6W.

The agitation motor 963 shown in FIG. 12 is provided inside the cabinet 91, and is coupled to the rotation shaft 961 via gears (not shown in the drawings), or by direct coupling. The agitation mechanism 96 rotates the rotation shaft 961 by the driving of the agitation motor 963 shown in FIG. 12. As a result of the rotation of the rotation shaft 961, the propeller 962 rotates. As a result of rotating the propeller 962 in the state in which the mount mechanism 9W is mounted to the server tank 6W, the agitation mechanism 96 agitates the white ink inside the server tank 6W.

Hereinafter, an operation of the agitation mechanism 96 driving the agitation motor 963 shown in FIG. 12 and rotating the propeller 962 will be referred to as an "agitation operation." In the present embodiment, the agitation mechanism 96 intermittently performs the agitation operation by repeatedly driving and stopping the agitation motor 963 shown in FIG. 12. Hereinafter, the agitation mechanism 96 intermittently performing the agitation operation will be referred to as "intermittent driving of the agitation operation."

In the present embodiment, the white ink includes components that are more likely to precipitate than components included in the color inks, as solid components such as pigment particles and the like. The components that are more likely to precipitate include titanium oxide, for example. Titanium oxide is a type of inorganic pigment having a relatively high specific gravity. The white ink includes the components that are relatively likely to precipitate, and thus, the solid components in the white ink, such as the pigment particles and the like, easily precipitate. Hereinafter, the precipitation of the solid components in the white ink will be also referred to as "the white ink settles." By performing the agitation operation, the agitation mechanism 96 suppresses the white ink from settling inside the server tank 6W.

According to the above-described configuration, as shown in FIG. 4 and FIG. 5, when the mount mechanism 9W is mounted to the server tank 6W, the first ends 811A of the tubes 811 and the first ends 861A of the tubes 861 are disposed inside the server tank 6W. Thus, when the server tank 6W is in the tilted posture shown in FIG. 5, the white ink inside the server tank 6W collects around the first ends 811A of the tubes 811 and the first ends 861A of the tubes 861.

In this way, a height of a liquid surface inside the server tank 6W is higher, at the positions of the first ends 811A of the tubes 811 and the first ends 861A of the tubes 861, than when the server tank 6W is in the horizontal posture. Thus, even when the server remaining amount decreases, the first ends 811A of the tubes 811 and the first ends 861A of the tubes 861 are suppressed from being removed upward from the liquid surface of the liquid inside the server tank 6W. Note that the height of the liquid surface inside the server tank 6 is defined by a length in the up-down direction (the vertical direction) from the bottom surface of the server tank 6 to the liquid surface.

The cabinet 91, the handle 92, the cap 93, the support plate 94, the washer 95, the tube 8, and the agitation mechanism 96 are integrated with each other to configure the mount mechanism 9W. Thus, in the present embodiment, "the mount mechanism 9W is mounted to the server tank 6W" means that "the cabinet 91, the handle 92, the cap 93, the support plate 94, the washer 95, the tube 8, or the agitation mechanism 96 are mounted to the server tank 6W."

Furthermore, "the support portion 39 supports the mount mechanism 9" means that the "support portion 39 supports the cabinet 91, the handle 92, the cap 93, the support plate 94, the washer 95, the tube 8, or the agitation mechanism 96." Note that "a plurality of member are integrated with each other to configure a member" refers to the fact that a plurality of members are coupled together to an extent to which the single member cannot be dismantled to the plurality of members, insofar as a certain external force is not applied, or the user does not intentionally remove the member.

<Method of Assembling Mount Mechanism 9>

Hereinafter, of the mount mechanism 9W, a method of assembling the vicinity of the support plate 94 will be described as an example. The connectors 97, the washer 95, the central shaft 911, the connection shafts 912, and the guide plate 944 are attached to the support plate 94. For example, the connectors 97 are screwed together with the support plate 94. The washer 95 is adhered to the support plate 94 using an adhesive. The central shaft 911 is formed integrally with the support plate 94. The connection shafts 912 and the guide plate 944 are respectively attached to the support plate 94 using screws.

In this state, the cap 93 is mounted to the support plate 94, from above, such that the central shaft 911 and the connection shafts 912 are inserted, from below, into the opening 931 and the opening 932 in order. In this way, the support plate 94 is disposed inside the cap 93. Hereinafter, a unit in which the connectors 97, the washer 95, the central shaft 911, the connection shafts 912, and the guide plate 944 are attached to the support plate 94 will be referred to as a "support plate unit."

The cabinet 91 is attached to the support plate unit. In this way, the central shaft 911 fits into a hole of a fixed plate inside the cabinet 91. The connection shafts 912 are attached by screws to the fixed plate inside the cabinet 91. The rotation shaft 961 is inserted into the opening 948 from below toward the upward direction, and is further inserted into the central shaft 911. The rotation shaft 961 is press fitted to a bearing inside the cabinet 91. As described above, the assembly of the mount mechanism 9 is complete.

<Tank Replacement>

Hereinafter, a method of replacing the server tank 6W will be described as an example. Note that the method of replacing the server tanks 6M, 6C, 6Y, 6K, and 6CS is the same as the method of replacing the server tank 6W. As shown in FIG. 2, the user moves the movable plate 35 from the closed position (refer to the main unit 3A) to the open position (refer to the sub-unit 3B). In the state in which the movable plate 35 is positioned at the open position (refer to the sub-unit 3B), the movable plate 35 is positioned further to the rear than the opening 62, and the opening 62 is open upward.

The user loosens the cap 93 from the protrusion 61. In the state in which the movable plate 35 is positioned at the open position (refer to the sub-unit 3B), the user holds the handle 92 and pulls the mount mechanism 9W out from the server tank 6W via the opening 62.

The mount mechanism 9W is configured by the cabinet 91, the handle 92, the cap 93, the support plate 94, the washer 95, the tube 8, and the agitation mechanism 96 being integrated with each other. Thus, the user can remove the cabinet 91, the handle 92, the cap 93, the support plate 94, the washer 95, the tube 8, and the agitation mechanism 96 from the server tank 6 simply by removing the mount mechanism 9W from the server tank 6. In other words, the user does not need to individually remove each of the cabinet 91, the handle 92, the cap 93, the support plate 94, the washer 95, the tube 8, and the agitation mechanism 96 from the server tank 6.

Note that, when the movable plate 35 is positioned at the closed position (refer to the main unit 3A), the movable plate 35 is positioned above the opening 62. In this state, a distance in the up-down direction from the opening 62 to the movable plate 35 is smaller than a length in the up-down direction of the mount mechanism 9W, such as a length from the upper end of the cabinet 91 to the propeller 962, for example. As a result, when the movable plate 35 is at the closed position (refer to the main unit 3A), even if the user tries to pull the mount mechanism 9W from inside the server tank 6W, the mount mechanism 9W collides with the movable plate 35. Thus, when the movable plate 35 is at the closed position (refer to the main unit 3A), it is difficult for the user to remove the mount mechanism 9W from the server tank 6W.

After removing the mount mechanism 9W from inside of the server tank 6W, the user hooks the engagement hook 913 shown in FIG. 4 onto the engagement shaft 392. In this way, the support portion 39 supports the mount mechanism 9W. In this case, the lower end of the guide plate 944 is positioned directly above the receptacle 362. Thus, the receptacle 362 can receive the white ink dripping from the guide plate 944.

Hereinafter, a region through which the movable plate 35 passes when moving from the open position (refer to the sub-unit 3B) to the closed position (refer to the main unit 3A) will be referred to as a "movement path of the movable plate 35." In a state in which the support portion 39 supports the mount mechanism 9W, a portion of the mount mechanism 9W is positioned on the movement path of the movable plate 35. Thus, in the state in which the support portion 39 supports the mount mechanism 9W, if the movable plate 35 attempts to move from the open position (refer to the sub-unit 3B) to the closed position (refer to the main unit 3A), the movable plate 35 collides with the mount mechanism 9W. As a result, the mount mechanism 9W suppresses the movable plate 35 from moving from the open position (refer to the sub-unit 3B) to the closed position (refer to the main unit 3A) during the replacement of the server tank 6W.

In the state in which the support portion 39 supports the mount mechanism 9W, the user replaces the pre-replacement server tank 6W with the server tank 6W to be used as the replacement. The server tank 6W to be used as the replacement is the server tank 6W storing the sufficient white ink, for example. For example, the user moves the pre-replacement server tank 6W from the placement plate 73 to another location. The user places the server tank 6W to be used as the replacement on the placement plate 73, with an orientation such that, when seen from above, the opening 62 is disposed at the rear corner of the placement plate 73. Note that the pre-replacement server tank 6W may be refilled with the white ink via the opening 62, without replacing the pre-replacement server tank 6W with the server tank 6W to be used as the replacement.

The user holds the handle 92, and removes the engagement hook 913 from the engagement shaft 392. The user inserts the guide plate 944 into the server tank 6W from the opening 62. The user tightens the cap 93 on the protrusion 61. In this way, the mount mechanism 9W is mounted to the server tank 6W.

The outer diameter of the washer 95 is larger than the inner diameter of the protrusion 61. The inner diameter of the washer 95 is smaller than the outer diameter of the protrusion 61. The outer diameter of the support plate 94 is larger than the inner diameter of the protrusion 61. Thus, when the cap 93 is tightened onto the protrusion 61, the support plate 94 is pressed by the cap 93 against opening edges of the protrusion 61, via the washer 95. In this way, the support plate 94 is fixed to the server tank 6W. The support plate 94 is fixed to the cabinet 91 via the central shaft 911 and the plurality of connection shafts 912, and thus, the position of the rotation shaft 961 is fixed with respect to the server tank 6W.

In the state in which the mount mechanism 9W is mounted to the server tank 6W, the upper end of the mount mechanism 9W is positioned lower than the stoppers 322. In other words, all of the mount mechanism 9W is positioned outside the movement path of the movable plate 35. Thus, the user can move the movable plate 35 from the open position (refer to the sub-unit 3B) to the closed position (refer to the main unit 3A). The tank replacement is completed as described above.

<Flow Path Configuration of Liquid Supply System 100>

Figure 9:
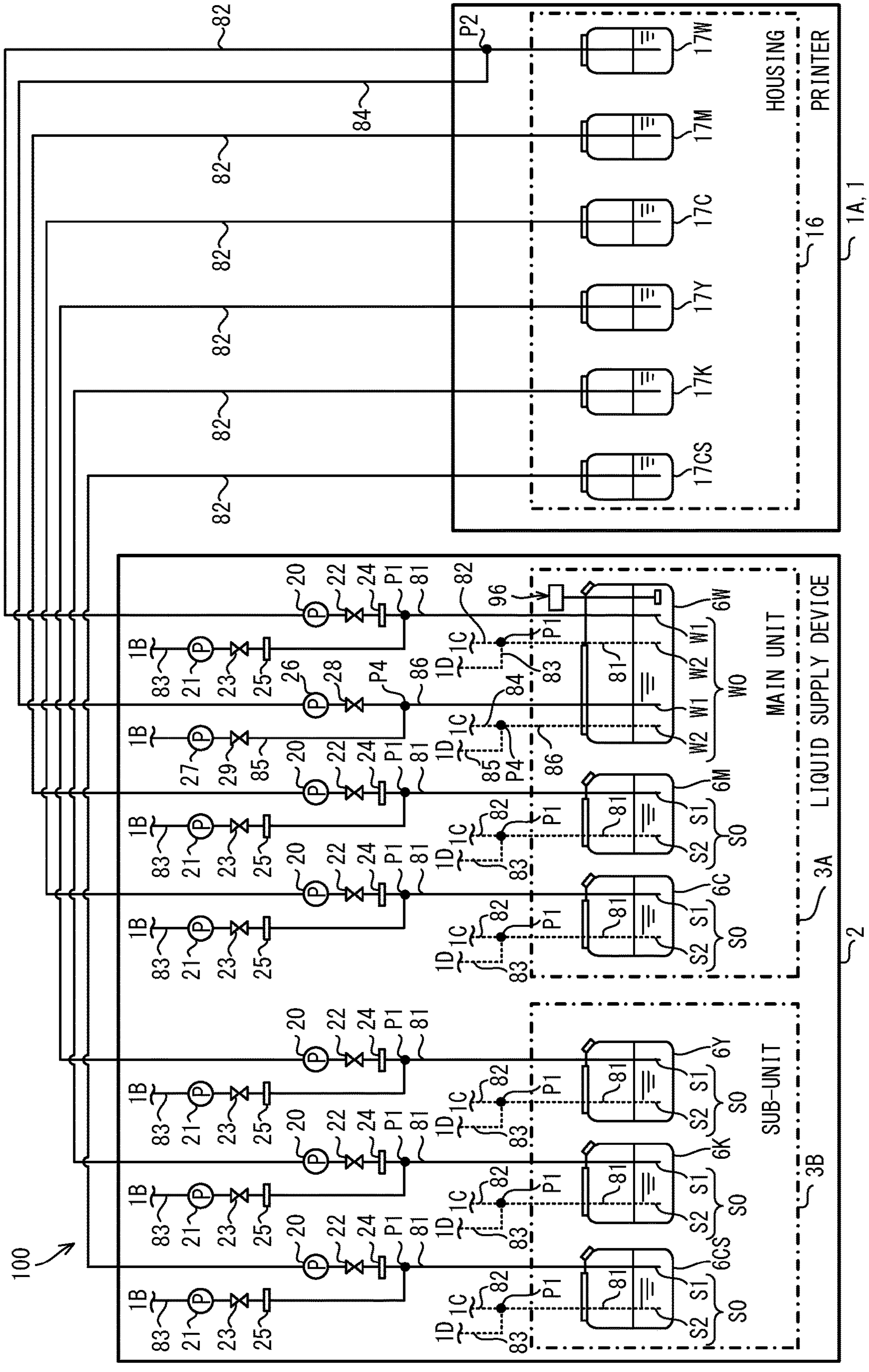
FIG. 9 is a flow path configuration diagram between the liquid supply device and a printer, in the liquid supply system.

"1B," "1C," and "1D" shown in FIG. 9 respectively indicate the "printer 1," the "printer 1C," and the "printer 1D" as connection destinations from the liquid supply device 2. In the present embodiment, "one of the tubes 8 is connected to the server tank 6 or the printer 1" includes a case in which one of the tubes 8 is directly connected to the server tank 6 or the printer 1, or a case in which one of the tubes 8 is connected to the server tank 6 or the printer 1 via another of the tubes 8 or another member. "One of the tubes 8 is connected to the server tank 6 or the printer 1" refers to a state in which the liquid can pass through the one of the tubes 8, and can flow to the server tank 6 or the printer 1 directly or via the other tube 8 or the other member.

As shown in FIG. 9, the flow path configuration of the liquid supply system 100 includes a white flow path W0 and color/pretreatment agent flow paths S0, as the flow paths between the liquid supply device 2 and the printers 1A, 1B, 1C, and 1D. The white flow path W0 differs from the color/pretreatment agent flow paths S0 in the presence or absence of tubes 84, 85, and 86 to be described later. Thus, hereinafter, the white flow path W0 will be described, and, of the configuration of the color/pretreatment agent flow paths S0, the configuration that is the same as that of the white flow path W0 will be assigned the same reference signs as the white flow path W0 and the description thereof will be omitted or simplified.

Figure 10:
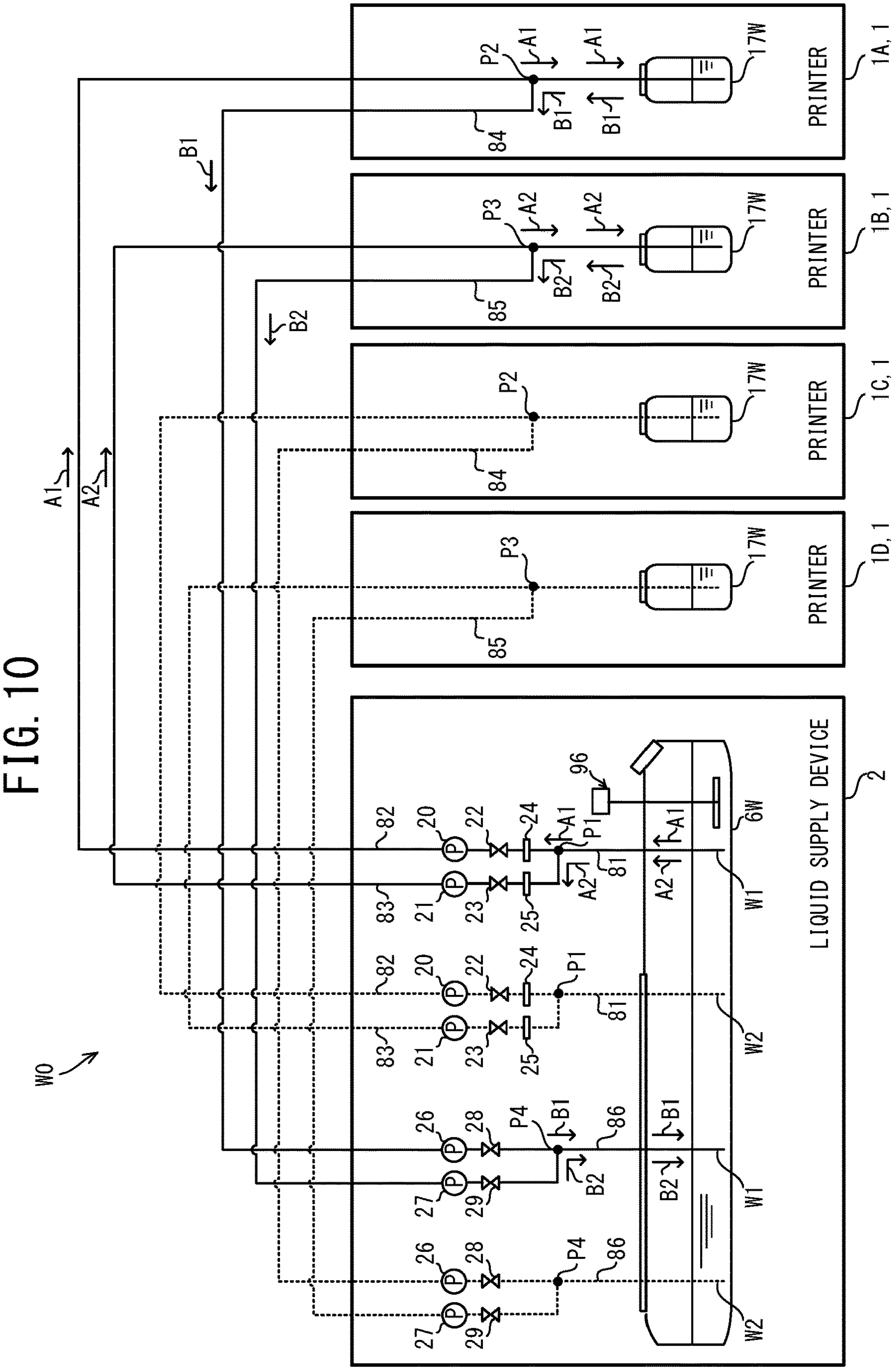
FIG. 10 is a flow path configuration diagram of a white flow path.

The white flow path W0 includes a first white flow path W1 and a second white flow path W2. Note that FIG. 9 and FIG. 10 show the first white flow path W1 using solid lines and show the second white flow path W2 using dotted lines. The first white flow path W1 connects the server tank 6W and the respective main tanks 17W of the printers 1A and 1B to each other. The second white flow path W2 connects the server tank 6W and the respective main tanks 17W of the printers 1C and 1D to each other.

As shown in FIG. 10, the first white flow path W1 and the second white flow path W2 differ from each other in whether the connection destination from the liquid supply device 2 is one of the printer 1A and 1B, or the printer 1C and 1D. Thus, hereinafter, the first white flow path W1 will be described and, for the second white flow path W2, the same reference signs will be assigned as for the first white flow path W1 and the description thereof will be omitted or simplified.

The first white flow path W1 is configured by the tubes 81, tubes 82 and 83, and the tubes 84, 85, and 86 as the tubes 8. The tube 81 is connected to the server tank 6W. The tube 81 extends from inside the server tank 6W to a point P1, via one of the plurality of connectors 97 shown in FIG. 7 and FIG. 8. The tube 81 is connected to the tube 82 and the tube 83 at the point P1.

The tube 82 extends from the point P1 toward the printer 1A via a point P2. The tube 82 is connected to the main tank 17W of the printer 1A. The tube 83 extends from the point P1 toward the printer 1B via a point P3. The tube 83 is connected to the main tank 17W of the printer 1B.

The tube 84 is connected to the tube 82 at the point P2. The tube 84 extends from the point P2 to a point P4, and is connected to the tube 86 at the point P4. The tube 85 is connected to the tube 83 at the point P3. The tube 85 extends from the point P3 to the point P4, and is connected to the tube 86 at the point P4. The tube 86 extends from the point P4 toward the server tank 6W, and is connected to the server tank 6W. The tube 86 extends to inside the server tank 6W, via one of the plurality of connectors 97 shown in FIG. 7 and FIG. 8.

Hereinafter, the flow path from the server tank 6W to the main tank 17W of the printer 1A via the tube 81 and the tube 82, and the flow path from the server tank 6W to the main tank 17W of the printer 1B via the tube 81 and the tube 83 will be respectively referred to as a "supply flow path." The side of the server tank 6W in the supply flow path will be referred to as "upstream in the supply flow path," and the side of the main tank 17W of the printer 1A or the printer 1B will be referred to as "downstream in the supply flow path." For example, at a halfway point in the supply flow path, the side of the server tank 6W is upstream in the supply flow path and the side of the main tank 17W of the printer 1A or the printer 1B is downstream in the supply flow path.

The flow path from the main tank 17W of the printer 1A to the server tank 6W via the tube 84 and the tube 86, and the flow path from the main tank 17W of the printer 1B to the server tank 6W via the tube 85 and the tube 86 will be respectively referred to as a "circulation flow path." The side of the main tank 17W of the printer 1A or the printer 1B in the circulation flow path will be referred to as "upstream in the circulation flow path," and the side of the server tank 6W will be referred to as "downstream in the circulation flow path." For example, at a halfway point in the circulation flow path, the side of the main tank 17W of the printer 1A or the printer 1B is upstream in the circulation flow path and the side of the server tank 6W is downstream in the circulation flow path.

A supply pump 20, a supply valve 22, and a filter 24 are provided in the tube 82. A supply pump 21, a supply valve 23, and a filter 25 are provided in the tube 83. The supply pump 20 is positioned further upstream in the supply flow path than the point P2. The supply pump 21 is positioned further upstream in the supply flow path than the point P3.

As a result of being respectively driven by pump motors 201 and 211 shown in FIG. 12, the supply pumps 20 and 21 suck up the white ink from the server tank 6W via the tube 81. As a result of being driven by the pump motor 201 shown in FIG. 12, the supply pump 20 sends the sucked up white ink toward the main tank 17W of the printer 1A, via the tube 82. As a result of being driven by the pump motor 211 shown in FIG. 12, the supply pump 21 sends the sucked up white ink toward the main tank 17W of the printer 1, via the tube 83.

Hereinafter, a state in which a valve is closed will be referred to as a "closed state," and a state in which valve is open will be referred to as an "open state." In the closed state, the valve causes the flow path to be in a blocked state. In the open state, the valve causes the flow path to be in a communicated state.

The supply valve 22 is positioned further upstream in the supply flow path than the supply pump 20. The supply valve 23 is positioned further upstream in the supply flow path than the supply pump 21. The supply valves 22 and 23 switch between the closed state and the open state as a result of being driven by solenoids 221 and 231 shown in FIG. 12, respectively. In the closed state, the supply valve 22 causes the tube 82 to be in the blocked state, and in the open state, causes the tube 82 to be in the communicated state. In the closed state, the supply valve 23 causes the tube 83 to be in the blocked state, and in the open state, causes the tube 83 to be in the communicated state.

The filter 24 is positioned further upstream in the supply flow path than the supply valve 22. The filter 25 is positioned further upstream in the supply flow path than the supply valve 23. The filters 24 and 25 are respectively configured by a non-woven fabric, a woven fabric, a resin film, or a porous metal piece, for example, and filter the liquid. In the white flow path W0, the filters 24 and 25 respectively filter the white ink.

A circulation pump 26 and a circulation valve 28 are provided in the tube 84. A circulation pump 27 and a circulation valve 29 are provided in the tube 85. As a result of being driven by a pump motor 261 shown in FIG. 12, the circulation pump 26 sucks up the white ink from the main tank 17W of the printer 1A, via a portion of the tube 82 further downstream in the supply flow path than the point P2. As a result of being driven by a pump motor 271 shown in FIG. 12, the circulation pump 27 sucks up the white ink from the main tank 17W of the printer 1*i*, via a portion of the tube 83 further downstream in the supply flow path than the point P3. As a result of being respectively driven by the pump motors 261 and 271 shown in FIG. 12, the circulation pumps 26 and 27 send the sucked up white ink toward server tank 6W, via the tube 86.

The circulation valve 28 is positioned further downstream in the supply flow path than the circulation pump 26. The circulation valve 29 is positioned further downstream in the circulation flow path than the circulation pump 27. The circulation valves 28 and 29 switch between the closed state and the open state as a result of being driven by solenoids 281 and 291 shown in FIG. 12, respectively. In the closed state, the circulation valve 28 causes the tube 84 to be in the blocked state, and in the open state, causes the tube 84 to be in the communicated state. In the closed state, the circulation valve 29 causes the tube 85 to be in the blocked state, and in the open state, causes the tube 85 to be in the communicated state.

As shown in FIG. 9, the color/pretreatment agent flow path S0 includes a first color/pretreatment agent flow path S1 and a second color/pretreatment agent flow path S2. Note that FIG. 9 shows the first color/pretreatment agent flow path S1 using solid lines and shows the second color/pretreatment agent flow path S2 using dotted lines. The first color/pretreatment agent flow path S1 corresponds to the first white flow path W1. The second color/pretreatment agent flow path S2 corresponds to the second white flow path W2.

The first color/pretreatment agent flow path S1 connects the server tank 6M and the respective main tanks 17M of the printers 1A and 1B to each other, connects the server tank 6C and the respective main tanks 17C of the printers 1A and 1B to each other, connects the server tank 6Y and the respective main tanks 17Y of the printers 1A and 1B to each other, connects the server tank 6K and the respective main tanks 17K of the printers 1A and 1B to each other, or connects the server tank 6CS and the respective main tanks 17CS of the printers 1A and 1B to each other. The first color/pretreatment agent flow path S1 is configured by the tubes 81, 82, and 83. In other words, the first color/pretreatment agent flow path S1 differs from the first white flow path W1 in not being provided with the tubes 84, 85, and 86.

The second color/pretreatment agent flow path S2 connects the server tank 6M and the respective main tanks 17M of the printers 1C and 1D to each other, connects the server tank 6C and the respective main tanks 17C of the printers 1C and 1D to each other, connects the server tank 6Y and the respective main tanks 17Y of the printers 1C and 1D to each other, connects the server tank 6K and the respective main tanks 17K of the printers 1C and 1D to each other, or connects the server tank 6CS and the respective main tanks 17CS of the printers 1C and 1D to each other.

The second color/pretreatment agent flow path S2 is configured by the tubes 81, 82, and 83. In other words, the second color/pretreatment agent flow path S2 differs from the second white flow path W2 in not being provided with the tubes 84, 85, and 86. The first color/pretreatment agent flow path S1 and the second color/pretreatment agent flow path S2 differ from each other in whether the connection destination from the liquid supply device 2 is one of the printer 1A and 1B, or the printer 1C and 1D.

In the above-described configuration, by causing one or both of the supply valves 22 and 23 to be in the open state and driving, of the supply pump 20 and the supply pump 21, the supply pump corresponding to the valve[s] in the open state, the liquid supply system 100 supplies the liquid from the liquid supply device 2 toward the printer 1 via the tube 8.

Hereinafter, an operation in which the liquid supply system 100 supplies the liquid from the liquid supply device 2 toward the printer 1 via the tube 8 will be referred to as an "inter supply device-printer supply operation." In the inter supply device-printer supply operation of the present embodiment, the liquid supply system 100 can supply the liquid from the plurality of server tanks 6 of the liquid supply device 2 to each of the plurality of main tanks 17 of the plurality of printers 1, via the tubes 8, in parallel or to one of the plurality of printers 1 at a time. In other words, in each of the supply flow paths to the plurality of printers 1, the plurality of server tanks 6 are positioned further upstream than each of the plurality of printers 1.

In a state in which one or both of the circulation valve 28 and the circulation valve 29 are in the open state, of the circulation pump 26 and the circulation pump 27, the liquid supply system 100 drives the supply pump corresponding to the valve[s] in the open state, and thus returns the liquid from the printer 1 toward the liquid supply device 2, via the tube 8.

Hereinafter, an operation in which the liquid supply system 100 returns the liquid from the printer 1 toward the liquid supply device 2 via the tube 8 will be referred to as an "inter supply device-printer return operation." In the inter supply device-printer return operation of the present embodiment, the liquid supply system 100 can return the liquid from the plurality of main tanks 17 of each of the plurality of printers 1 to the plurality of server tanks 6 of the liquid supply device 2, via the tubes 8, in parallel or from one of the plurality of printers 1 at a time.

By performing one of the inter supply device-printer supply operation or the inter supply device-printer return operation while the other operation is in progress, the liquid supply system 100 can circulate the liquid via the tubes 8 between the server tanks 6 of the liquid supply device 2 and the respective main tanks 17 of the plurality of printers 1, or can circulate the liquid from the server tanks 6 of the liquid supply device 2, via the tubes 8, further upstream in the supply flow path than the respective main tanks 17 of the plurality of printers 1. Alternatively, by performing one of the inter supply device-printer supply operation or the inter supply device-printer return operation after the other operation has been performed, the liquid supply system 100 can circulate the liquid between the server tanks 6 of the liquid supply device 2 and the respective main tanks 17 of the plurality of printers 1, via the tubes 8.

Hereinafter, an operation in which the liquid supply system 100 circulates the liquid between the liquid supply device 2 and the printer 1 via the tube 8 will be referred to as an "inter supply device-printer circulation operation." For example, the liquid supply system 100 may perform the inter supply device-printer supply operation between the server tank 6 and the main tank 17 of the printer 1A, and may perform the inter supply device-printer return operation between the server tank 6 and the main tank 17 of the printer 1B.

As an example of a flow of the liquid when the inter supply device-printer supply operation has been performed, a flow of the white ink from the liquid supply device 2 toward the printers 1A and 1B in the first white flow path W1 will be described. As shown in FIG. 10, when the white ink is supplied from the server tank 6W to the main tank 17W of the printer 1A, the white ink flows from the server tank 6W toward the main tank 17W of the printer 1A via the tube 81 and the tube 82 (refer to arrows A1). When the white ink is supplied from the server tank 6W to the main tank 17W of the printer 1, the white ink flows from the server tank 6W toward the main tank 17W of the printer 1B via the tube 81 and the tube 83 (refer to arrows A2).

As an example of a flow of the liquid when the inter supply device-printer return operation has been performed, a flow of the white ink from the printers 1A and 1B toward the liquid supply device 2 in the first white flow path W1 will be described. As shown in FIG. 10, when the white ink is returned to the server tank 6W from the main tank 17W of the printer 1A, the white ink flows from the main tank 17W of the printer 1A toward the server tank 6W via the tube 82, the point P2, the tube 84, and the tube 86 (refer to arrows B1). When the white ink is returned to the server tank 6W from the main tank 17W of the printer 1B, the white ink flows from the main tank 17W of the printer 1B toward the server tank 6W via the tube 83, the point P3, the tube 85, and the tube 86 (refer to arrows B2).

Both when the white ink is supplied from the server tank 6W to the main tank 17W of the printer 1A, and when the white ink is returned to the server tank 6W from the main tank 17W of the printer 1A, the white ink flows through a portion of the tube 82 further downstream in the supply flow path than the point P2. Both when the white ink is supplied from the server tank 6W to the main tank 17W of the printer 1, and when the white ink is returned to the server tank 6W from the main tank 17W of the printer 1B, the white ink flows through a portion of the tube 83 further downstream in the supply flow path than the point P3.

A case will be described in which the inter supply device-printer supply operation and the inter supply device-printer return operation are simultaneously performed in the first white flow path W1, between the server tank 6W and the main tank 17W of the printer 1A. In this case, the white ink flows from the server tank 6W toward the main tank 17W of the printer 1A via the tube 81 and the tube 82. While flowing from the server tank 6W toward the main tank 17W of the printer 1A, at the point P2, the white ink flows from the tube 82 into the tube 84. The white ink flows from the tube 84 toward the server tank 6W via the tube 86. Note that, during the performing of the inter supply device-printer supply operation and the inter supply device-printer return operation, some of the white ink may flow from the point P2 toward the main tank 17W of the printer 1A, or may flow from the main tank 17W of the printer 1A toward the point P2.

The liquid supply system 100 performs the inter supply device-printer circulation operation in the white flow path W0, for example. In this way, the liquid supply system 100 suppresses the white ink from settling inside the server tank 6W and in the first white flow path W1, or in the server tank 6W, in the second white flow path W2, and in the respective main tanks 17W of the printers 1A and 1B. For example, in the white flow path W0, when the liquid circulates via the tubes 8 between the server tank 6W of the liquid supply device 2 and the respective main tanks 17W of the plurality of printers 1A, 1B, 1C, and 1D, the liquid supply system 100 also suppresses the white ink from settling inside the respective main tanks 17W of the printers 1A, 1B, 1C, and 1D.

<Electrical Configuration of Printer 1>

Figure 11:
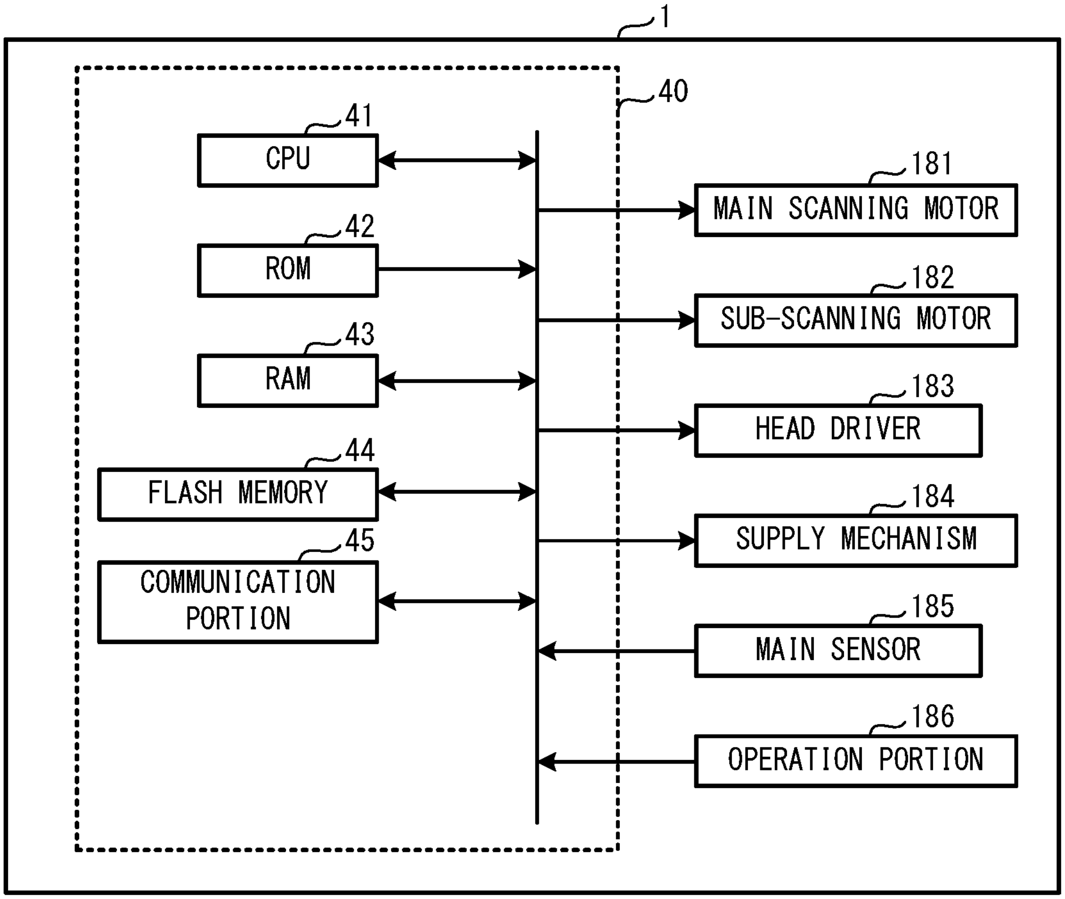
FIG. 11 is a block diagram showing an electrical configuration of a printer.

As shown in FIG. 11, the printer 1 is provided with a control device 40. The control device 40 is fixed to the frame body 10 and is provided with a CPU 41, a ROM 42, a RAM 43, a flash memory 44, and a communication portion 45. The CPU 41 controls the printer 1, and functions as a processor. The CPU 41 controls the pretreatment processing and the print processing, for example. The CPU 41 is electrically connected to the ROM 42, the RAM 43, the flash memory 44, and the communication portion 45.

The ROM 42 stores a control program for the CPU 41 to control operations of the printer 1, information necessary for the CPU 41 when executing various programs, and the like. The RAM 43 temporarily stores various data and the like used by the control program. The flash memory 44 is non-volatile, and stores calibration data of main sensors 185 to be described later, and the like. The communication portion 45 is a controller for communicating, in a wired or wireless manner with an external device. The CPU 41 communicates with the liquid supply device 2, for example, using the communication portion 45.

The main scanning motor 181, the sub-scanning motor 182, the head driver 183, the supply mechanism 184, the plurality of main sensors 185, and an operation portion 186 are electrically connected to the CPU 41. The main scanning motor 181, the sub-scanning motor 182, the head driver 183, and the supply mechanism 184 are driven by control of the CPU 41.

The plurality of main sensors 185 are respectively provided in the plurality of main tanks 17 shown in FIG. 1. The plurality of main sensors 185 are pressure sensors, for example. Each of the plurality of main sensors 185 detects a main remaining amount by detecting a pressure inside each of the main tanks 17. The main remaining amount is a remaining amount of the liquid inside the main tank 17. A signal indicating the main remaining amount detected by the main sensor 185 is output to the CPU 41.

The operation portion 186 is a touch panel display or the like, displays various information, and outputs information to the CPU 41 in accordance with an operation by the user. By operating the operation portion 186, the user can input, to the printer 1, a print command for starting printing by the printer 1 and the like.

<Electrical Configuration of Liquid Supply Device 2>

As shown in FIG. 12, a control device 50 is provided with a CPU 51, a ROM 52, a RAM 53, a flash memory 54, and a communication portion 55. The CPU 51 controls the liquid supply device 2, and functions as a processor. The CPU 51 is electrically connected to the ROM 52, the RAM 53, the flash memory 54, and the communication portion 55.

The ROM 52 stores a control program for the CPU 51 to control operations of the liquid supply device 2, information necessary for the CPU 51 when executing various programs, and the like. The RAM 53 temporarily stores various data and the like used by the control program. The flash memory 54 is non-volatile, and stores calibration data of the server sensors 71, and the like. The communication portion 55 is a controller for communicating, in a wired or wireless manner with an external device. The CPU 51 communicates with each of the printers 1A, 1B, 1C, and 1D, for example, via the communication portion 55.

The agitation motor 963, the pump motors 201, 211, 261, and 271, the solenoids 221, 231, 281, and 291, the plurality of open/closed sensors 38, the plurality of server sensors 71, the display 56, the operation portion 57, the warning light 58, and a speaker 59 are electrically connected to the CPU 51.

The agitation motor 963, the pump motors 201, 211, 261, and 271, the solenoids 221, 231, 281, and 291, the display 56, the warning light 58, and the speaker 59 are driven by control of the CPU 51.

The plurality of open/closed sensors 38 respectively detect the movable plate 35, in the main unit 3A and the sub-unit 3B, when the movable plate 35 is positioned at the open position shown in FIG. 2 (refer to the main unit 3A shown in FIG. 2). When the open/closed sensor 38 detects the movable plate 35, a signal indicating that the movable plate 35 is positioned at the open position is output to the CPU 51.

The plurality of server sensors 71 respectively detect the server remaining amounts, using as a reference, for example, the weight of the empty server tank 6 to which the mount mechanism 9 (refer to FIG. 3) is mounted, by detecting the weights of the server tanks 6 (refer to FIG. 3) placed on the plurality of server sensors 71. A signal indicating the server remaining amount detected by the server sensor 71 is output to the CPU 51. Note that the weight of each of the server tanks 6 placed on the plurality of server sensors 71 refers to the total weight of the server tank 6, the liquid inside the server tank 6, and the mount mechanism 9 mounted to the server tank 6.

<Main Processing>

Figure 13:
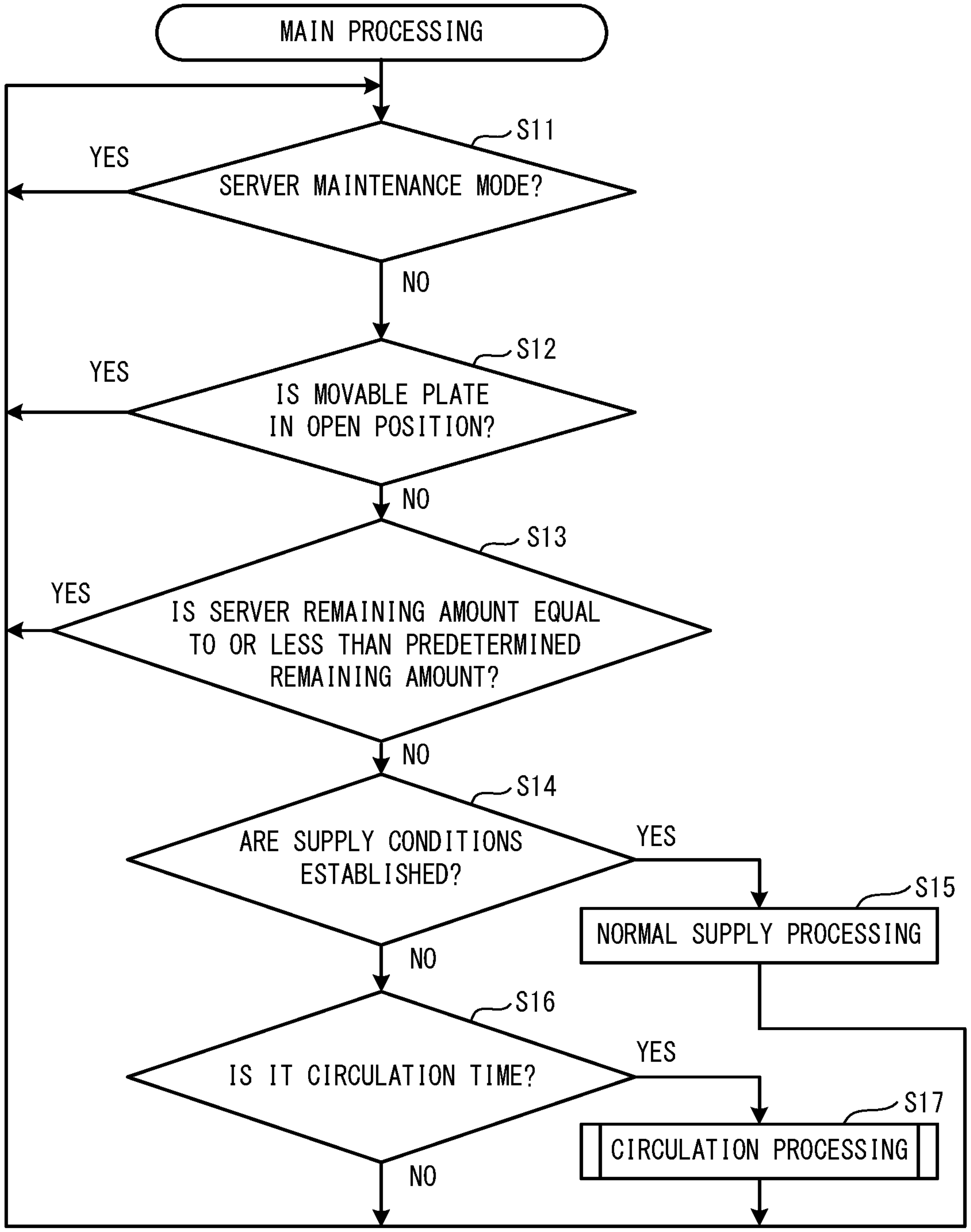
FIG. 13 is a flowchart of main processing.

When a power supply to the liquid supply device 2 is switched on, for example, by reading out and operating the control program from the ROM 52, the CPU 51 performs main processing shown in FIG. 13. In the main processing, the CPU 51 performs control relating to the inter supply device-printer supply operation, and the inter supply device-printer circulation operation. Hereinafter, at the start of the main processing, it is assumed that the supply valves 22 and 23, and the circulation valves 28 and 29 are all in the closed state.

As shown in FIG. 13, when the main processing is started, the CPU 51 refers to the RAM 53 and determines whether or not the liquid supply device 2 is in a server maintenance mode (step S11). For example, in the RAM 53, one of the server maintenance mode or a server normal mode is stored.

The server maintenance mode is a mode for performing maintenance of the liquid supply device 2. The maintenance of the liquid supply device 2 is replacement of the server tank 6, replacement of the tubes 8, and the like. In the server maintenance mode, the performing of the inter supply device-printer supply operation and the performing of the inter supply device-printer circulation operation are both prohibited. The server normal mode is a mode in which the performing of the inter supply device-printer supply operation and the performing of the inter supply device-printer circulation operation are both possible.

For example, when the user operates the operation portion 57 shown in FIG. 12 and sets the mode of the liquid supply device 2 to the server maintenance mode, the CPU 51 stores the server maintenance mode in the RAM 53. For example, when the user operates the operation portion 57 shown in FIG. 12 and cancels the setting of the server maintenance mode, the CPU 51 stores the server normal mode in the RAM 53.

When the liquid supply device 2 is in the server normal mode (no at step S11), on the basis of the signal from the open/closed sensor 38 shown in FIG. 2, the CPU 51 determines whether or not the movable plate 35 shown in FIG. 2 is positioned at the open position (refer to the sub-unit 3B shown in FIG. 2) (step S12).

When the movable plate 35 shown in FIG. 2 is not positioned at the open position (refer to the sub-unit 3B shown in FIG. 2) (no at step S12), on the basis of the signal from the server sensor 71 (refer to FIG. 12) of the server tank 6W, the CPU 51 determines whether or not the server remaining amount of the server tank 6W shown in FIG. 10 is equal to or lower than a predetermined remaining amount (step S13). The predetermined remaining amount is not limited to a particular amount, and is greater than zero liters, and less than the maximum capacity of the white ink that can be stored by the server tank 6W, for example. The predetermined remaining amount is stored in advance in the flash memory 54, for example.

When the liquid supply device 2 is in the server maintenance mode (yes at step S11), and when the movable plate 35 shown in FIG. 2 is positioned at the open position (refer to the sub-unit 3B shown in FIG. 2) (yes at step S12) or when the server remaining amount of the server tank 6W shown in FIG. 10 is equal to or less than the predetermined remaining amount (yes at step S13), the CPU 51 returns the processing to the processing at step S11.

When the server remaining amount of the server tank 6W shown in FIG. 10 is greater than the predetermined remaining amount (no at step S13), for each of the main tanks 17 of each of the printers 1 shown in FIG. 9, the CPU 51 determines whether or not supply conditions for performing the inter supply device-printer supply operation are established (step S14). For example, the CPU 51 determines the establishment of the supply conditions on the basis of a supply request, a supply command, the main remaining amount, and the like.

A case will be described in which the CPU 51 determines the establishment of the supply conditions on the basis of the supply request. In this case, when the CPU 51 acquires the supply request from the printer 1 for performing the inter supply device-printer supply operation, the CPU 51 determines that the supply conditions are established.

For example, in the printer 1, the CPU 41 may transmit the supply request to the liquid supply device 2 when the main remaining amount of one of the plurality of main tanks 17 has become equal to or less than a first predetermined remaining amount. In this case, the first predetermined remaining amount is stored in advance in the flash memory 44, for example. In the printer 1, the CPU 41 may transmit the supply request to the liquid supply device 2 when a decrease amount of the main remaining amount of one of the plurality of main tanks 17 has become equal to or greater than a predetermined decrease amount. In this case, the predetermined decrease amount is stored in advance in the flash memory 44, for example. In the printer 1, the CPU 41 may transmit the supply request to the liquid supply device 2 when the user operates the operation portion 186 shown in FIG. 11 and inputs, to the printer 1, the supply command for performing the inter supply device-printer supply operation.

A case will be described in which the CPU 51 determines the establishment of the supply conditions on the basis of the supply command. In this case, in the liquid supply device 2, the user operates the operation portion 57 shown in FIG. 12, and inputs the supply command to the liquid supply device 2. When the CPU 51 acquires the supply command via the operation portion 57 shown in FIG. 12, the CPU 51 determines that the supply conditions are established.

A case will be described in which the CPU 51 determines the establishment of the supply conditions on the basis of the main remaining amount. In this case, in the printer 1, the CPU 41 may sequentially transmit the main remaining amount to the liquid supply device 2 on the basis of the signal from the main sensor 185 shown in FIG. 11. The CPU 51 may be electrically connected to the main sensor 185 shown in FIG. 11. In this case, the CPU 51 may acquire the main remaining amount on the basis of the signal from the main sensor 185 shown in FIG. 11.

The CPU 51 may determine that the supply conditions are established when the main remaining amount acquired from the printer 1 or the main sensor 185 has become equal to or less than the first predetermined remaining amount. In this case, the first predetermined remaining amount is stored in advance in the flash memory 54, for example. The CPU 51 may determine that the supply conditions are established when, on the basis of the main remaining amount acquired from the printer 1 or the main sensor 185, the decrease amount of the main remaining amount has become equal to or greater than the predetermined decrease amount. In this case, the predetermined decrease amount is stored in advance in the flash memory 54, for example.

When the supply conditions are established for any one of each of the main tanks 17 of each of the printers 1 (yes at step S14), the CPU 51 performs normal supply processing (step S15). In the normal supply processing, the CPU 51 controls the inter supply device-printer supply operation for the flow path corresponding to the main tank 17 for which the supply conditions are established. When the normal supply processing ends, the CPU 51 returns the processing to the processing at step S11.

For example, the CPU 51 ends the normal supply processing on the basis of a supply stop request, a supply stop command, the main remaining amount, and the like. A case will be described in which the CPU 51 ends the normal supply processing on the basis of the supply stop request. In this case, when the CPU 51 acquires the supply stop request from the printer 1 for stopping the inter supply device-printer supply operation, the CPU 51 ends the normal supply processing.

For example, in the printer 1, the CPU 41 may transmit the supply stop request to the liquid supply device 2 when the main remaining amount of one of the plurality of main tanks 17 has become equal to or greater than a second predetermined remaining amount. In this case, the second predetermined remaining amount is stored in advance in the flash memory 44, for example. The second predetermined remaining amount is equal to or greater than the first predetermined remaining amount, for example.

In the printer 1, the CPU 41 may transmit the supply stop request to the liquid supply device 2 when an increase amount of the main remaining amount of one of the plurality of main tanks 17 has become equal to or greater than a predetermined increase amount. In this case, the predetermined increase amount is stored in advance in the flash memory 44, for example. The predetermined increase amount is equal to or greater than the predetermined decrease amount, for example.

In the printer 1, the CPU 41 may transmit the supply stop request to the liquid supply device 2 when the user operates the operation portion 186 shown in FIG. 11 and inputs, to the printer 1, the supply stop command for stopping the inter supply device-printer supply operation.

A case will be described in which the CPU 51 ends the normal supply processing on the basis of the supply stop command. In this case, in the liquid supply device 2, the user operates the operation portion 57 shown in FIG. 12 and inputs the supply stop command to the liquid supply device 2. When the CPU 51 acquires the supply stop command via the operation portion 57, the CPU 51 ends the normal supply processing.

A case will be described in which the CPU 51 ends the normal supply processing on the basis of the main remaining amount. In this case, in the printer 1, the CPU 41 may sequentially transmit the main remaining amount to the liquid supply device 2 on the basis of the signal from the main sensor 185 shown in FIG. 11. The CPU 51 may be electrically connected to the main sensor 185 shown in FIG. 11. In this case, the CPU 51 may acquire the main remaining amount on the basis of the signal from the main sensor 185 shown in FIG. 11.

The CPU 51 may end the normal supply processing when the main remaining amount acquired from the printer 1 or the main sensor 185 has become equal to or greater than the second predetermined remaining amount. In this case, the second predetermined remaining amount is stored in advance in the flash memory 54, for example.

The CPU 51 may end the normal supply processing when, on the basis of the main remaining amount acquired from the printer 1 or the main sensor 185, the increase amount of the main remaining amount has become equal to or greater than the predetermined increase amount. In this case, the predetermined increase amount is stored in advance in the flash memory 54, for example.

As an example of the inter supply device-printer supply operation, a case will be described, with reference to FIG. 10, in which the liquid supply device 2 supplies the white ink from the server tank 6W to the main tank 17W of the printer 1A. When the supply conditions are established for the main tank 17W of the printer 1A, the CPU 51 starts the normal supply processing. In this case, the CPU 51 performs control to supply the white ink from the server tank 6W to the main tank 17W of the printer 1A.

For example, the CPU 51 controls the solenoid 221 and causes the supply valve 22 to be in the open state. In this state, the CPU 51 controls the pump motor 201 and drives the supply pump 20. In this way, the white ink is supplied from the server tank 6W to the main tank 17W of the printer 1A via the tubes 81 and 82 (refer to the arrows A1).

When the normal supply processing ends, the CPU 51 stops the driving of the pump motor 201 and stops the driving of the supply pump 20. The CPU 51 controls the solenoid 221 and causes the supply valve 22 to be in the closed state. In this way, the inter supply device-printer supply operation of the white ink from the server tank 6W to the main tank 17W of the printer 1A is stopped.

As shown in FIG. 13, when the supply conditions are also not established for any of each of the main tanks 17 of each of the printers 1, (no at step S14), the CPU 51 determines whether or not a current time is a circulation time (step S16). The circulation time is a time at which circulation processing is regularly performed, and is stored in advance in the flash memory 54, for example. The user operates the operation portion 57 shown in FIG. 12, and sets the circulation time in the liquid supply device 2. For example, the circulation time is 9:00 am, 11:00 am, 1:00 pm, 3:00 pm, and 5:00 pm.

In the processing at step S16, for example, the CPU 51 acquires the current time from a real time clock (RTC) (not shown in the drawings). The RTC is connected to the CPU 51 and counts the current time as an internal clock of the liquid supply device 2. The RTC may be connected to the CPU 41. In this case, the CPU 51 may acquire the current time from the printer 1.

When the current time is not the circulation time (no at step S16), the CPU 51 returns the processing to the processing at step S11. When the current time is the circulation time (yes at step S16), the CPU 51 performs the circulation processing (step S17). In this way, the CPU 51 regularly performs the circulation processing. "Regularly" refers to performing an operation at a decided time, for example (at the circulation time in the present embodiment). In other words, for example, a time period between the first circulation processing and the second circulation processing, and a time period between the second circulation processing and the third circulation processing may be mutually different time periods. In the circulation processing, the CPU 51 controls the inter supply device-printer circulation operation. The CPU 51 returns the processing to the processing at step S11.

<Circulation Processing>

Hereinafter, at the start of the circulation processing, it is assumed that, in each of the first white flow path W1 and the second white flow path W2, the supply valves 22 and 23, and the circulation valves 28 and 29 are all in the closed state.

Figure 14:
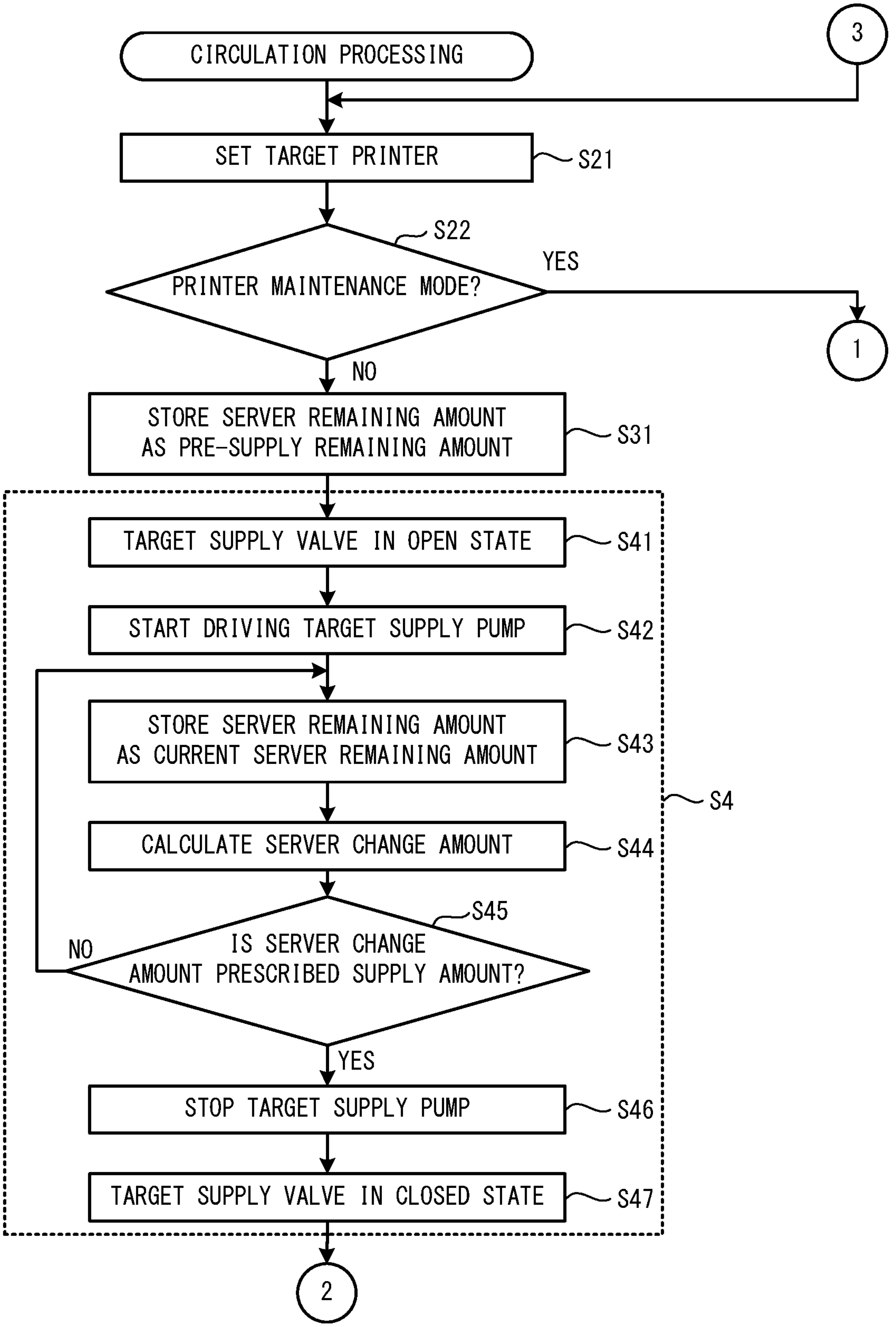
FIG. 14 is a flowchart of circulation processing.

As shown in FIG. 14, when the circulation processing is started, the CPU 51 sets, in the RAM 53, one of the plurality of printers 1 as a target printer (step S21). The target printer is the printer 1 for which the inter supply device-printer circulation operation is to be controlled. For example, each of the printers 1A, 1B, 1C, and 1D are stored in advance in the flash memory 54 in association with a printer No. 1, 2, 3, and 4. The target printer No. is stored in the RAM 53.

An initial value of the target printer No. is "1." The target printer No. is incremented each time processing at step S53 to be described later is performed. In the processing at step S21, the CPU 51 refers to the RAM 53, and identifies the target printer No. The CPU 51 refers to the flash memory 54, and sets, as the target printer, the printer 1 corresponding to the identified printer No.

The CPU 51 determines whether or not the target printer is in a printer maintenance mode to be described later (step S22). In the processing at step S22, the CPU 51 requests mode information from the target printer. The mode information indicates in which mode the target printer is, of the printer maintenance mode and a printer normal mode to be described later. In the target printer, when the CPU 41 receives the request for the mode information from the liquid supply device 2, the CPU 41 transmits the mode information to the liquid supply device 2. In this way, the CPU 51 acquires the mode information from the target printer. On the basis of the acquired mode information, the CPU 51 identifies which of the modes the target printer is in, of the printer maintenance mode and the printer normal mode.

For example, in each of the plurality of printers 1, one of the printer normal mode or the printer maintenance mode is stored in the RAM 43. For example, when the user operates the operation portion 186 shown in FIG. 11 and sets the printer maintenance mode, the CPU 41 stores the printer maintenance mode in the RAM 43. For example, when the user operates the operation portion 186 shown in FIG. 11 and cancels the printer maintenance mode, the CPU 41 stores the printer normal mode in the RAM 43.

The printer normal mode is a mode in which the performing of the inter supply device-printer circulation operation is possible, and is, for example, a mode in which the printing by the printer 1 can be performed. In the printer normal mode, the performing of the inter supply device-printer circulation operation is allowed.

The printer maintenance mode is a mode for performing maintenance of the printer 1. The maintenance of the printer 1 is replacement of the main tank 17, agitation processing inside the main tank 17, the circulation processing inside the printer 1, and the like. For example, in the agitation processing inside the main tank 17, the printer 1 agitates the ink or the pretreatment agent inside the main tank 17, by operating an agitation mechanism (not shown in the drawings) provided inside the main tank 17. In the circulation processing in the printer 1, the printer 1 controls the supply mechanism 184, and circulates the ink or the pretreatment agent between the main tank 17 and the head 14. In the printer maintenance mode, the inter supply device-printer circulation operation is prohibited.

Figure 15:
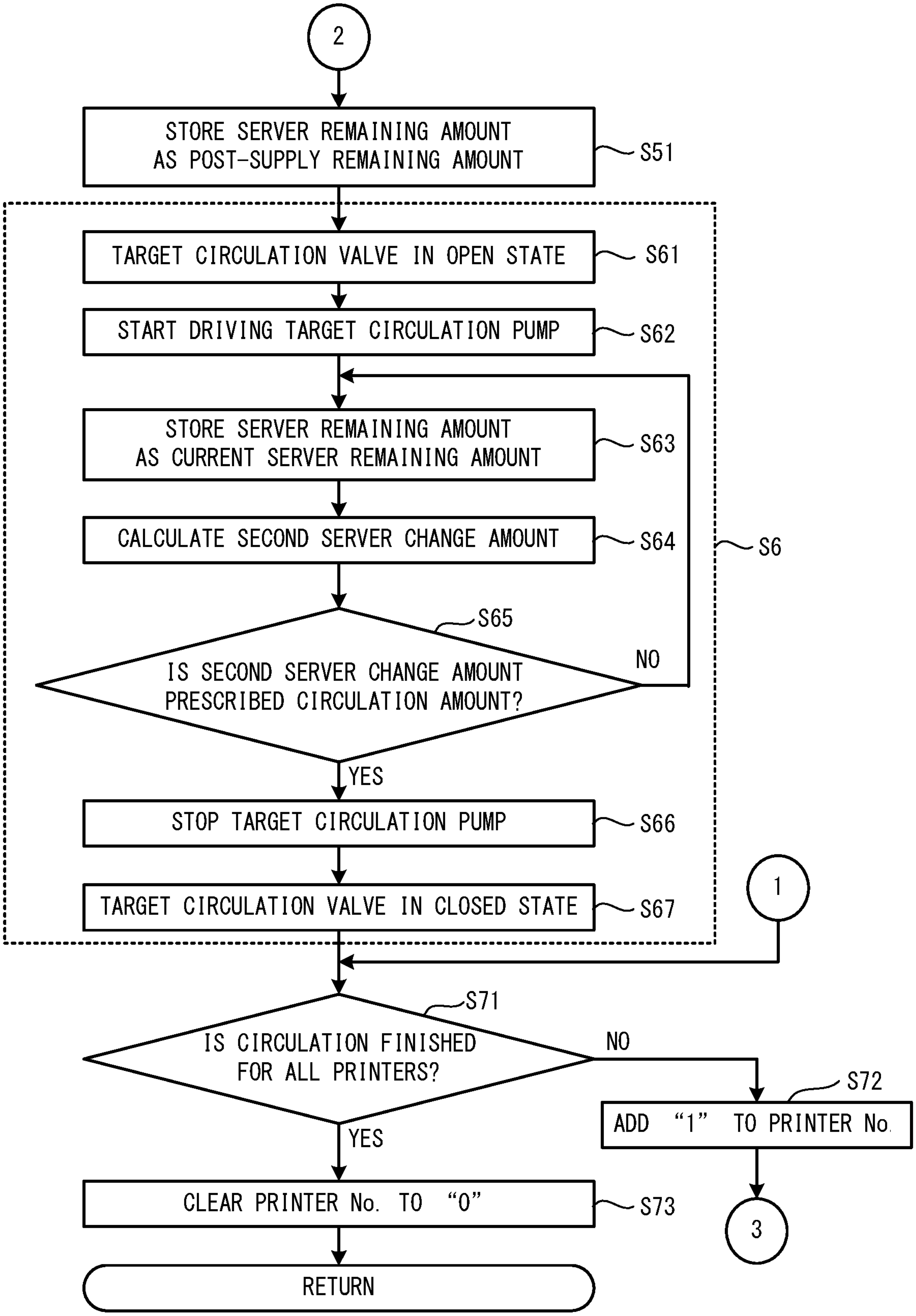
FIG. 15 is a flowchart of the circulation processing.

When the target printer is in the printer maintenance mode (yes at step S22), the CPU 51 shifts the processing to processing at step S71 shown in FIG. 15. When the target printer is in the printer normal mode (no at step S22), the CPU 51 acquires the server remaining amount of the server tank 6W from the server sensor 71 (refer to FIG. 12) of the server tank 6W, and stores the acquired server remaining amount of the server tank 6W in the RAM 53 as a pre-supply remaining amount (step S31). The pre-supply remaining amount is the server remaining amount of the server tank 6W before the start of circulation-time supply processing (step S4) to be described later, in the circulation processing.

The CPU 51 performs processing at step S41 to step S47, as the circulation-time supply processing (step S4). The circulation-time supply processing is, collectively, the processing at step S41 to step S47. In the circulation-time supply processing, the CPU 51 controls the inter supply device-printer supply operation. Hereinafter, in each of the first white flow path W1 and the second white flow path W2, the supply pump, of the supply pumps 20 and 21, corresponding to the target printer will be referred to as a "target supply pump." In each of the first white flow path W1 and the second white flow path W2, the supply valve, of the supply valves 22 and 23, corresponding to the target printer will be referred to as a "target supply valve." In each of the first white flow path W1 and the second white flow path W2, the circulation pump, of the circulation pumps 26 and 27, corresponding to the target printer will be referred to as a "target circulation pump." In each of the first white flow path W1 and the second white flow path W2, the circulation valve, of the circulation valves 28 and 29, corresponding to the target printer will be referred to as a "target circulation valve."

When the target printer is the printer 1A, the target supply pump, the target supply valve, the target circulation pump, and the target circulation valve are, respectively, the supply pump 20, the supply valve 22, the circulation pump 26, and the circulation valve 28 of the first white flow path W1. When the target printer is the printer 1*i*, the target supply pump, the target supply valve, the target circulation pump, and the target circulation valve are, respectively, the supply pump 21, the supply valve 23, the circulation pump 27, and the circulation valve 29 of the first white flow path W1. When the target printer is the printer 1C, the target supply pump, the target supply valve, the target circulation pump, and the target circulation valve are, respectively, the supply pump 20, the supply valve 22, the circulation pump 26, and the circulation valve 28 of the second white flow path W2. When the target printer is the printer 1D, the target supply pump, the target supply valve, the target circulation pump, and the target circulation valve are, respectively, the supply pump 21, the supply valve 23, the circulation pump 27, and the circulation valve 29 of the second white flow path W2.

When the circulation-time supply processing is started, the CPU 51 controls the solenoid corresponding to the target supply valve, of the solenoids 221 and 231 shown in FIG. 12, and causes the target supply valve to be in the open state (step S41). In this state, the CPU 51 controls the pump motor corresponding to the target supply pump, of the pump motors 201 and 211 shown in FIG. 12, and starts the driving of the target supply pump (step S42). By the processing at step S42, the white ink is supplied from the server tank 6W to the main tank 17W of the target printer. The arrows A1 shown in FIG. 10 indicate the flow of the white ink when the target printer is the printer 1A and the processing at step S42 is performed. The arrows A2 shown in FIG. 10 indicate the flow of the white ink when the target printer is the printer 1B and the processing at step S42 is performed. The CPU 51 performs the following processing at step S43, step S44, and step S45 while driving the target supply pump.

The CPU 51 acquires the server remaining amount of the server tank 6W from the server sensor 71 (refer to FIG. 12) of the server tank 6W, and stores the acquired server remaining amount of the server tank 6W in the RAM 53 as a current server remaining amount (step S43). The CPU 51 calculates a first server change amount, using the pre-supply remaining amount stored by the processing at step S31 and the current server remaining amount stored by the processing at step S43 (step S44).

The first server change amount indicates a change amount of the server remaining amount of the server tank 6W from a time point of the processing at step S31 to a time point of the processing at step S44. The first server change amount indicates the amount of the white ink supplied from the server tank 6W to the main tank 17W of the target printer in the circulation-time supply processing, at the time point of the processing at step S44.

The CPU 51 determines whether or not the first server change amount calculated by the processing at step S44 has reached a prescribed supply amount (step S45). The prescribed supply amount is greater than zero liters, and is smaller than the maximum amount of white ink that can be stored in the main tank 17W, for example. The prescribed supply amount may be stored in advance in the flash memory 54, for example. For example, the CPU 51 may acquire the main remaining amount of the main tank 17W from the target printer before the start of the circulation-time supply processing, and may decide the prescribed supply amount on the basis of the acquired main remaining amount.

When the first server change amount is smaller than the prescribed supply amount (no at step S45), the CPU 51 returns the processing to the processing at step S43. When the first server change amount has reached the prescribed supply amount (yes at step S45), the CPU 51 controls the pump motor, of the pump motors 201 and 211 shown in FIG. 12, corresponding to the target supply pump, and stops the driving of the target supply pump (step S46). The CPU 51 controls the solenoid, of the solenoids 221 and 231 shown in FIG. 12, corresponding to the target supply valve, and causes the target supply valve to be in the closed state (step S47). In this way, the CPU 51 ends the circulation-time supply processing (step S4).

As shown in FIG. 15, the CPU 51 acquires the server remaining amount of the server tank 6W from the server sensor 71 (refer to FIG. 12) of the server tank 6W, and stores the acquired server remaining amount of the server tank 6W in the RAM 53 as a post-supply remaining amount (step S51). The post-supply remaining amount is the server remaining amount of the server tank 6W before the start of return processing (step S6) to be described later. The CPU 51 performs processing from step S61 to step S67 as the return processing (step S6). The return processing is, collectively, the processing at step S61 to step S67. In the return processing, the CPU 51 controls the inter supply device-printer return operation.

When the return processing is started, the CPU 51 controls the solenoid, of the solenoids 281 and 291 shown in FIG. 12, corresponding to the target circulation valve, and causes the target circulation valve to be in the open state (step S61). In this state, the CPU 51 controls the pump motor, of the pump motors 261 and 271 shown in FIG. 12, corresponding to the target circulation pump, and starts the driving of the target circulation pump (step S62). By the processing at step S62, the white ink is returned from the main tank 17W of the target printer to the server tank 6W. The arrows B1 shown in FIG. 10 indicate the flow of the white ink when the target printer is the printer 1A and the processing at step S62 is performed. The arrows B2 shown in FIG. 10 indicate the flow of the white ink when the target printer is the printer 1B and the processing at step S62 is performed. The CPU 51 performs the following processing at step S63, step S64, and step S65 while driving the target circulation pump.

The CPU 51 acquires the server remaining amount of the server tank 6W from the server sensor 71 (refer to FIG. 12) of the server tank 6W, and stores the acquired server remaining amount of the server tank 6W in the RAM 53 as the current server remaining amount (step S63). The CPU 51 calculates a second server change amount, using the post-supply remaining amount stored by the processing at step S51 and the current server remaining amount stored by the processing at step S63 (step S64).

The second server change amount indicates the change amount of the server remaining amount of the server tank 6W from a time point of the processing at step S51 to a time point of the processing at step S64. The second server change amount indicates the amount of the white ink returned from the main tank 17W of the target printer to the server tank 6W in the return processing, at the time point of the processing at step S64.

The CPU 51 determines whether or not the second server change amount calculated by the processing at step S64 has reached a prescribed circulation amount (step S65). The prescribed circulation amount is greater than zero liters, and less than the maximum capacity of the white ink that can be stored by the main tank 17W, for example. The prescribed circulation amount may be stored in advance in the flash memory 54, for example. For example, the CPU 51 may acquire the main remaining amount of the main tank 17W from the target printer before the start of the circulation-time supply processing, and may decide the prescribed circulation amount on the basis of the acquired main remaining amount. In the present embodiment, the prescribed circulation amount is the same amount as the prescribed supply amount.

When the second server change amount is smaller than the prescribed circulation amount (no at step S65), the CPU 51 returns the processing to the processing at step S63. When the second server change amount has reached the prescribed circulation amount (yes at step S65), the CPU 51 controls the pump motor, of the pump motors 261 and 271 shown in FIG. 12, corresponding to the target circulation pump, and stops the driving of the target circulation pump (step S66). The CPU 51 controls the solenoid, of the solenoids 281 and 291 shown in FIG. 12, corresponding to the target circulation valve, and causes the target circulation valve to be in the closed state (step S67). In this way, the CPU 51 ends the return processing (step S6).

According to the above-described circulation-time supply processing and return processing, the CPU 51 controls the target supply pump, the target supply valve, the target circulation pump, and the target circulation valve such that, in the circulation processing, the server remaining amount of the server tank 6W is within the predetermined range, using the server remaining amount of the server tank 6W before the start of the circulation-time supply processing as a reference. In other words, by the circulation-time supply processing, the server remaining amount of the server tank 6W decreases by the prescribed supply amount only. By the return processing, the server remaining amount of the server tank 6W increases by the prescribed circulation amount only. Since the prescribed circulation amount is the same as the prescribed supply amount, the server remaining amount of the server tank 6W after the return processing is the same as the server remaining amount of the server tank 6W before the circulation-time supply processing.

The CPU 51 determines whether or not the circulation-time supply processing and the return processing have been performed for all of the plurality of printers 1A, 1B, 1C, and 1D, excluding the printer 1 that is in the printer maintenance mode (step S71). For example, the CPU 51 refers to the RAM 53 and if the printer No. is “1,” “2,” or “3,” the CPU 51 determines that there is the printer 1, of the plurality of printers 1A, 1B, 1C, and 1D excluding the printer 1 that is in the printer maintenance mode, for which the circulation-time supply processing and the return processing have not been performed (no at step S71). In this case, in the RAM 53, the CPU 51 adds “1” to the printer No. (step S72). The CPU 51 returns the processing to the processing at step S21 shown in FIG. 14.

When the printer No. is “4,” the CPU 51 determines that the circulation-time supply processing and the return processing have been performed for all of the plurality of printers 1A, 1B, 1C, and 1D excluding the printer 1 that is in the printer maintenance mode (yes at step S71). In this case, the CPU 51 clears the printer No. in the RAM 53 to “1” (step S73). The CPU 51 returns the processing to the main processing shown in FIG. 13.

Effects of Embodiment

The liquid supply system 100 supplies the white ink to the respective main tanks 17W of the printers 1A, 1B, 1C, and 1D. The liquid supply system 100 is provided with the tubes 82, 83, 84, and 85, the supply pumps 20 and 21, the supply valves 22 and 23, the circulation pumps 26 and 27, the circulation valves 28 and 29, and the CPU 51. The tubes 82, 83, 84, and 85 are connected to the server tank 6W. The server tank 6W is provided further upstream than the respective main tanks 17W of the printers 1A, 1B, 1C, and 1D in the white flow path W0. The white ink is stored in the server tank 6W. For example, in the first white flow path W1, the white ink flows inside the tubes 82 and 84 between the server tank 6W and the main tank 17W of the printer 1A. For example, the supply pump 20 and the supply valve 22 are respectively provided in the tube 82 in the first white flow path W1. For example, the circulation pump 26 and the circulation valve 28 are respectively provided in the tube 84 in the first white flow path W1. Each of the supply pumps 20 and 21, and the circulation pumps 26 and 27 is in a liquid delivery state as a result of being driven, and in a stopped state as a result of the driving being stopped. Each of the supply valves 22 and 23, and the circulation valves 28 and 29 is in the liquid delivery state as a result of being in the open state, and in the stopped state as a result of being in the closed state. For example, in the first white flow path W1, by driving the supply pump 20 when the supply valve 22 is in the open state, the white ink is supplied from the server tank 6W toward the main tank 17W of the printer 1A via the tube 82. For example, in the first white flow path W1, by driving the circulation pump 26 when the circulation valve 28 is in the open state, the white ink is returned from the main tank 17W of the printer 1A toward the server tank 6W via the tube 84. For example, in the first white flow path W1, by causing the supply valve 22 to be in the closed state and stopping the driving of the supply pump 20, the supply of the white ink from the server tank 6W toward the main tank 17W of the printer 1A via the tube 82 is stopped. For example, in the first white flow path W1, by causing the circulation valve 28 to be in the closed state and stopping the driving of the circulation pump 26, the return of the white ink from the main tank 17W of the printer 1A toward the server tank 6W via the tube 84 is stopped. The CPU 51 performs the circulation processing. The circulation processing includes the circulation-time supply processing and the return processing. In the circulation-time supply processing, by causing the target supply valve to be in the open state and driving the target supply pump, the CPU 51 supplies the white ink from the server tank 6W toward the main tank 17W of the target printer via the corresponding tube, of the tubes 82 and 83. In the return processing, by causing the target circulation valve to be in the open state and driving the target circulation pump, the CPU 51 returns the white ink from the main tank 17W of the target printer toward the server tank 6W via the corresponding tube, of the tubes 84 and 85.

According to the above, by the circulation processing, the liquid supply system 100 circulates the white ink via the corresponding tube, of the tubes 82, 83, 84, and 85, between the server tank 6W and the respective main tanks 17W of the printers 1A, 1B, 1C, and 1D. Thus, the liquid supply system 100 can suppress the state of the white ink inside the server tank 6W or inside the tubes 82, 83, 84, and 85 from becoming non-uniform. Furthermore, the liquid supply system 100 can also suppress the state of the white ink inside the respective main tanks 17W of the printers 1A, 1B, 1C, and 1D from becoming non-uniform. As a result, the liquid supply system 100 can suppress a deterioration in print quality resulting from the state of the white ink becoming non-uniform. Note that the "state of the white ink" refers, for example, to a concentration distribution of colored components, such as titanium oxide and the like, in the white ink.

Furthermore, the tube 82 and the tube 84 are provided separately from each other and the tube 83 and the tube 85 are provided separately from each other. Thus, even if an abnormality occurs in the tubes 84 and 85, for example, the liquid supply system 100 can supply the white ink from the server tank 6W toward the respective main tanks 17W of the printers 1A, 1B, 1C, and 1D via the tubes 82 and 83.

Furthermore, even if the length of the tube 8 is relatively long, the thickness of the tube 8 is relatively narrow, the material of the tube 8 is a material in which pressure loss is relatively large, or a height difference of the paths of the tubes 8 is relatively large, when the liquid delivery is performed between the server tank 6W and the respective main tanks 17W of the printers 1A, 1B, 1C, and 1D using only a liquid head difference, there is a possibility that the white ink may not flow easily. In the present embodiment, the liquid delivery is performed between the server tank 6W and the respective main tanks 17W of the printers 1A, 1B, 1C, and 1D using the supply pumps 20 and 21, and the circulation pumps 26 and 27. Thus, for example, compared to a case in which the liquid delivery is performed between the server tank 6W and the respective main tanks 17W of the printers 1A, 1B, 1C, and 1D using only the liquid head difference, the liquid head difference between the server tank 6W and the respective main tanks 17W of the printers 1A, 1B, 1C, and 1D is less likely to have an impact on the liquid delivery. As a result, the liquid supply system 100 can suppress a limitation on an arrangement position the server tank 6W with respect to each of the printers 1A, 1B, 1C, and 1D. The liquid supply system 100 can suppress limitations on the length, the thickness, the material, or the path of the tube 8.

Furthermore, the liquid supply system 100 can reliably block the flow of the liquid inside the tubes 82 and 83, by causing the supply valves 22 and 23 to be in the closed state. The liquid supply system 100 can reliably block the flow of the liquid inside the tubes 84 and 85, by causing the circulation valves 28 and 29 to be in the closed state.

In the circulation processing, the CPU 51 controls the target supply pump, the target supply valve, the target circulation pump, and the target circulation valve such that the server remaining amount of the server tank 6W is within the predetermined range.

According to the above, the liquid supply system 100 can suppress the server remaining amount of the server tank 6W from being outside the predetermined range in the circulation processing. For example, the predetermined range is set to a range in which the server remaining amount of the server tank 6W is not excessive or insufficient. In this case, the liquid supply system 100 can suppress the server remaining amount of the server tank 6W from becoming excessive or insufficient in the circulation processing.

The server sensor 71 of the server tank 6W detects the server remaining amount of the server tank 6W. The CPU 51 controls the target supply pump, the target supply valve, the target circulation pump, and the target circulation valve such that, in the circulation processing, the server remaining amount of the server tank 6W indicated by the signal from the server sensor 71 of the server tank 6W is within the predetermined range, on the basis of the server remaining amount of the server tank 6W before the start of the circulation processing.

According to the above, the change amount of the server remaining amount of the server tank 6W before and after the circulation processing is within the predetermined range, on the basis of the server remaining amount of the server tank 6W before the start of the circulation processing. Thus, the liquid supply system 100 can suppress the change amount of the server remaining amount of the server tank 6W between before and after the circulation processing. As a result, the liquid supply system 100 can further suppress the server remaining amount of the server tank 6W in the circulation processing from becoming excessive or insufficient.

In the liquid supply system 100, in the return processing, after the CPU 51 causes the target circulation valve to be in the open state and drives the target circulation pump, when the change amount of the server remaining amount of the server tank 6W indicated by the server sensor 71 of the server tank 6W has become the predetermined change amount, the CPU 51 causes the target circulation valve to be in the closed state and stops the driving of the target circulation pump.

According to the above, the liquid supply system 100 can suppress the amount of white ink flowing from the respective main tanks 17W of the printers 1A, 1B, 1C, and 1D to the server tank 6W via the tube 84 or the tube 85 from fluctuating each time the return processing is performed. Furthermore, the liquid supply system 100 can suppress amounts of the white ink flowing from the respective main tanks 17W of the printers 1A, 1B, 1C, and 1D to the server tank 6W via the tube 84 or the tube 85 from fluctuating compared to each other. As a result, the liquid supply system 100 can suppress a limitation on the arrangement position of the server tank 6W with respect to each of the printers 1A, 1B, 1C, and 1D. The liquid supply system 100 can suppress the limitations on the length, the thickness, the material, or the path of the tube 8.

The CPU 51 performs the circulation processing on a regular basis.

According to the above, since the white ink is circulated on the regular basis between the server tank 6W and the respective main tanks 17W of the printers 1A, 1B, 1C, and 1D, the liquid supply system 100 can further suppress the state of the white ink inside the server tank 6W and inside the tubes 82, 83, 84, and 85 from becoming non-uniform. Furthermore, the liquid supply system 100 can also further suppress the state of the white ink inside the respective main tanks 17W of the printers 1A, 1B, 1C, and 1D from becoming non-uniform.

In the present embodiment, the circulation processing in which the one of the printers 1A, 1B, 1C, or 1D is the target printer will be referred to as "first circulation processing." The circulation processing in which another one of the printers 1A, 1, 1C, or 1D is the target printer will be referred to as "second circulation processing." The CPU 51 prohibits the performing of one of the first circulation processing or the second circulation processing while the other of the first circulation processing and the second circulation processing is being performed.

According to the above, the first circulation processing and the second circulation processing are not performed in parallel, and thus, the liquid supply system 100 can suppress a control load relating to the circulation processing. For example, in the circulation processing, when the CPU 51 controls the inter supply device-printer circulation operation on the basis of the server remaining amount of the server tank 6W, the CPU 51 can accurately calculate each of the change amount of the server remaining amount of the server tank 6W using the first circulation processing, and the change amount of the server remaining amount of the server tank 6W using the second circulation processing. As a result, in the circulation processing, the liquid supply system 100 can accurately control a liquid delivery amount between the server tank 6W and the respective main tanks 17W of the printers 1A, 1B, 1C, and 1D.

Modified Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. The modified examples to be described below may be combined as appropriate, insofar as no contradictions arise. The liquid supply device 2 may change each of the white flow path W0 and the color/pretreatment agent flow paths S0 as appropriate. Hereinafter, an example will be described of a modified mode of the first white flow path W1. The changes to the first white flow path W1 may also be applied to the second white flow path W2. The changes to the first white flow path W1 and the second white flow path W2 may also be applied to the first color/pretreatment agent flow path S1 and the second color/pretreatment agent flow path S2, respectively.

Hereinafter, as modified examples of the white flow path W0, a white flow path W10 shown in FIG. 16, a white flow path W20 shown in FIG. 17, and a white flow path W30 shown in FIG. 18 will be described. In each of the white flow paths W10, W20, and W30, the same reference signs will be assigned to members having the same function as that of the above-described embodiment, and points that differ from the white flow path W0 will be mainly described.

Figure 16:
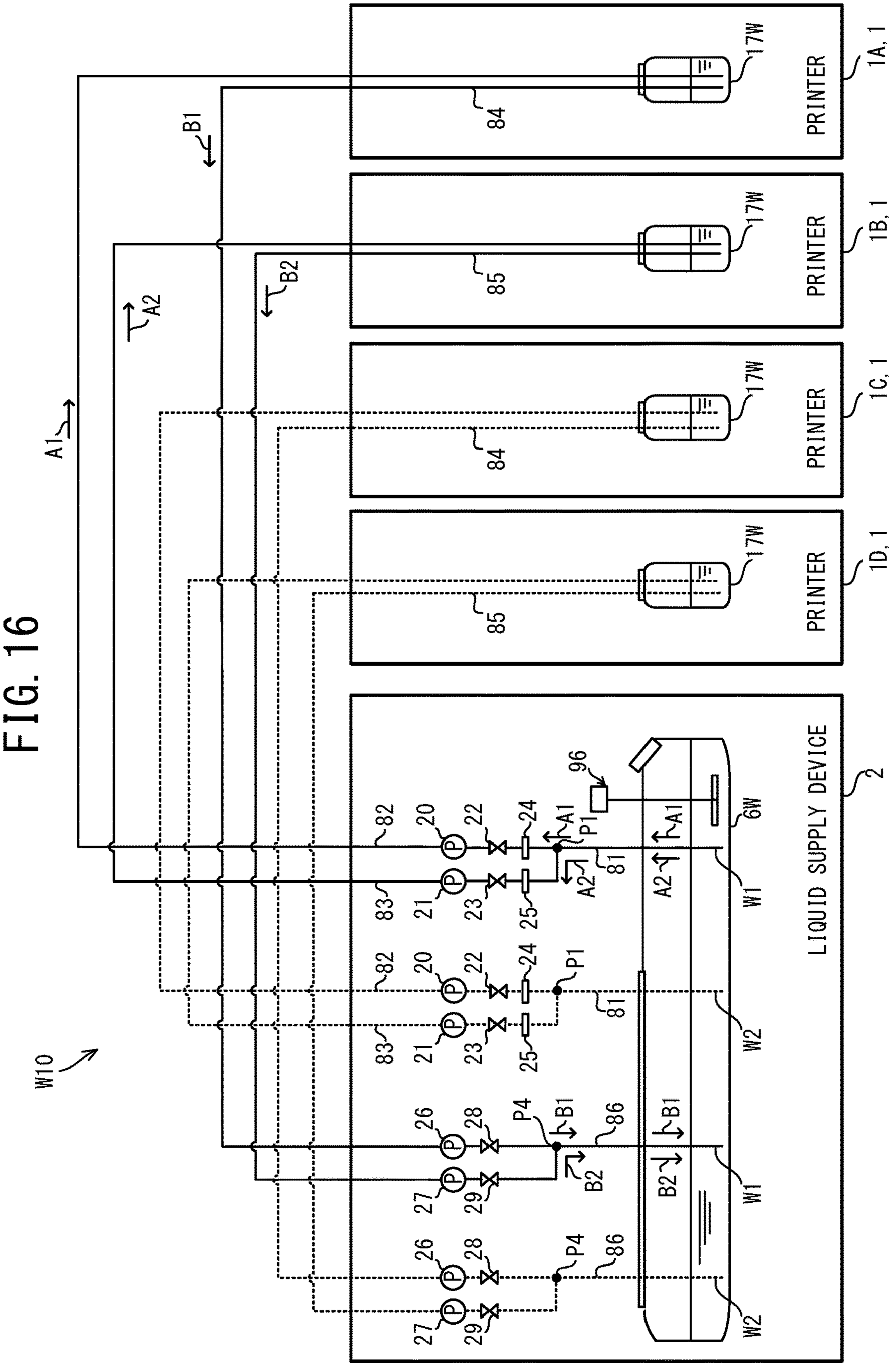
FIG. 16 is a flow path configuration diagram of a white flow path.

As shown in FIG. 16, in the white flow path W10, in the first white flow path W1, for example, the tubes 84 and 85 need not necessarily be respectively joined to the tubes 82 and 83 at the points P2 and P3. Each of the tubes 84 and 85 may extend from the point P4 to the respective main tanks 17W of the printers 1A and 1B, and may be connected to the respective main tanks 17W of the printers 1A and 1B. In this case, in the circulation processing, the CPU 51 may perform one of the circulation-time supply processing or the return processing while the other of the circulation-time supply processing and the return processing is being performed. In the circulation processing, when the one of the circulation-time supply processing or the return processing is performed while the other of the circulation-time supply processing and the return processing is being performed, the CPU 51 may set one or a plurality of the plurality of printers 1 as the target printer and may perform the circulation-time supply processing and the return processing. Alternatively, the CPU 51 may set one or a plurality of the plurality of printers 1 as the target printer and perform the circulation-time supply processing, and may set another one or another plurality of the plurality of printers 1 as the target printer and perform the return processing.

Figure 17:
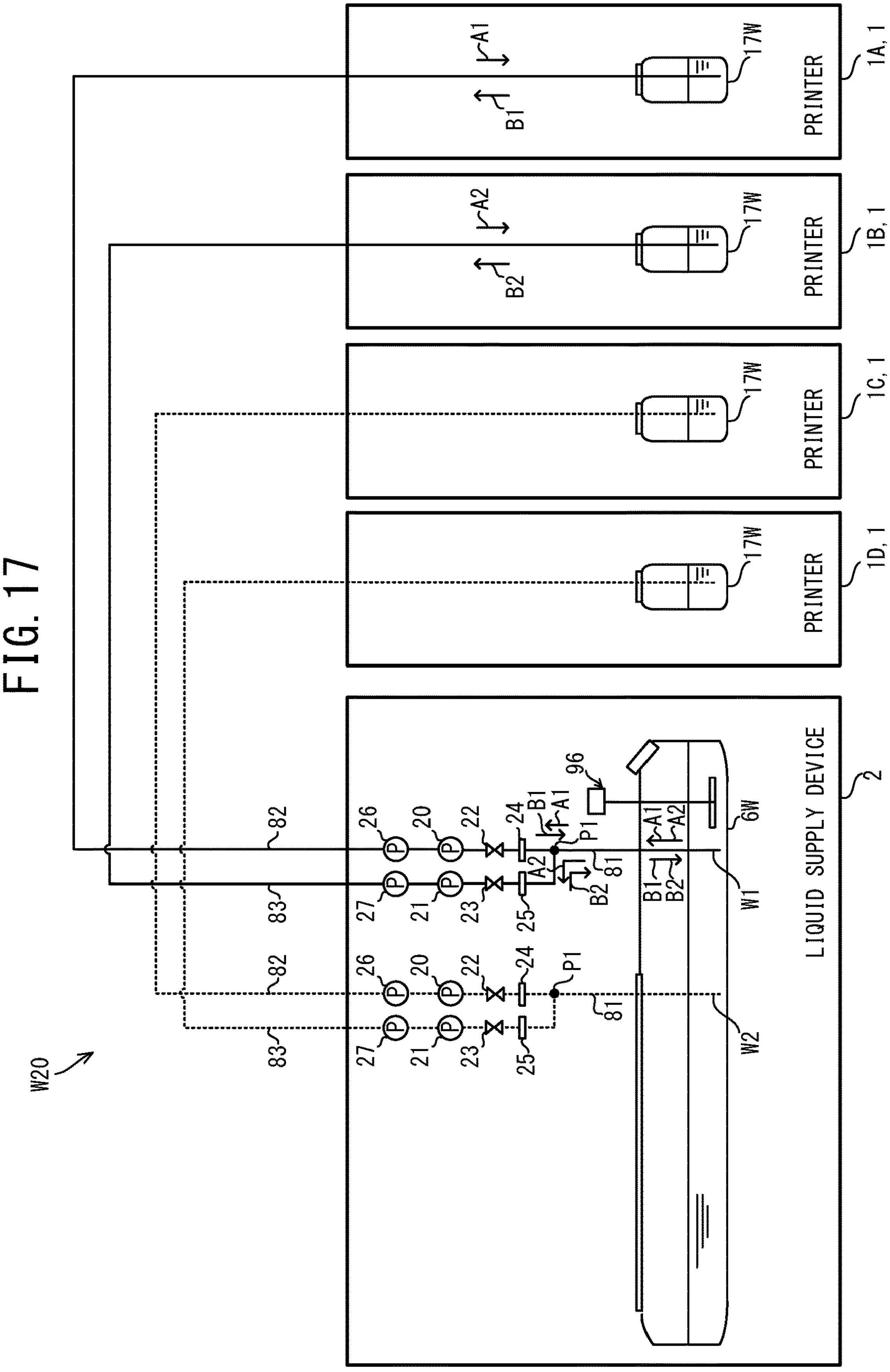
FIG. 17 is a flow path configuration diagram of a white flow path.

As shown in FIG. 17, in the white flow path W20, the first white flow path W1 may be provided, for example, with the tubes 81, 82, and 83, and need not necessarily be provided with the tubes 84, 85, and 86. In this case, the circulation pumps 26 and 27 may be provided in the tubes 82 and 83, respectively. The circulation pumps 26 and 27 may be provided further downstream in the supply flow path than the supply pumps 20 and 21, respectively, or may be provided further upstream in the supply flow path than the supply pumps 20 and 21. The circulation pumps 26 and 27 may be provided further upstream in the supply flow path than the supply valves 22 and 23, respectively, or may be provided further upstream in the supply flow path than the filters 24 and 25, respectively.

According to the above-described configuration, in the first white flow path W1, by the driving of the pump motors 261 and 271, the circulation pumps 26 and 27 respectively suck up the white ink from the main tanks 17W of the printers 1A and 1B via the tubes 82 and 83 (refer to the arrows B1 and B2). By the driving of the pump motors 261 and 271, the circulation pumps 26 and 27 respectively send the sucked up white ink toward the server tank 6W via the tube 81 (refer to the arrows B1 and B2).

Figure 18:
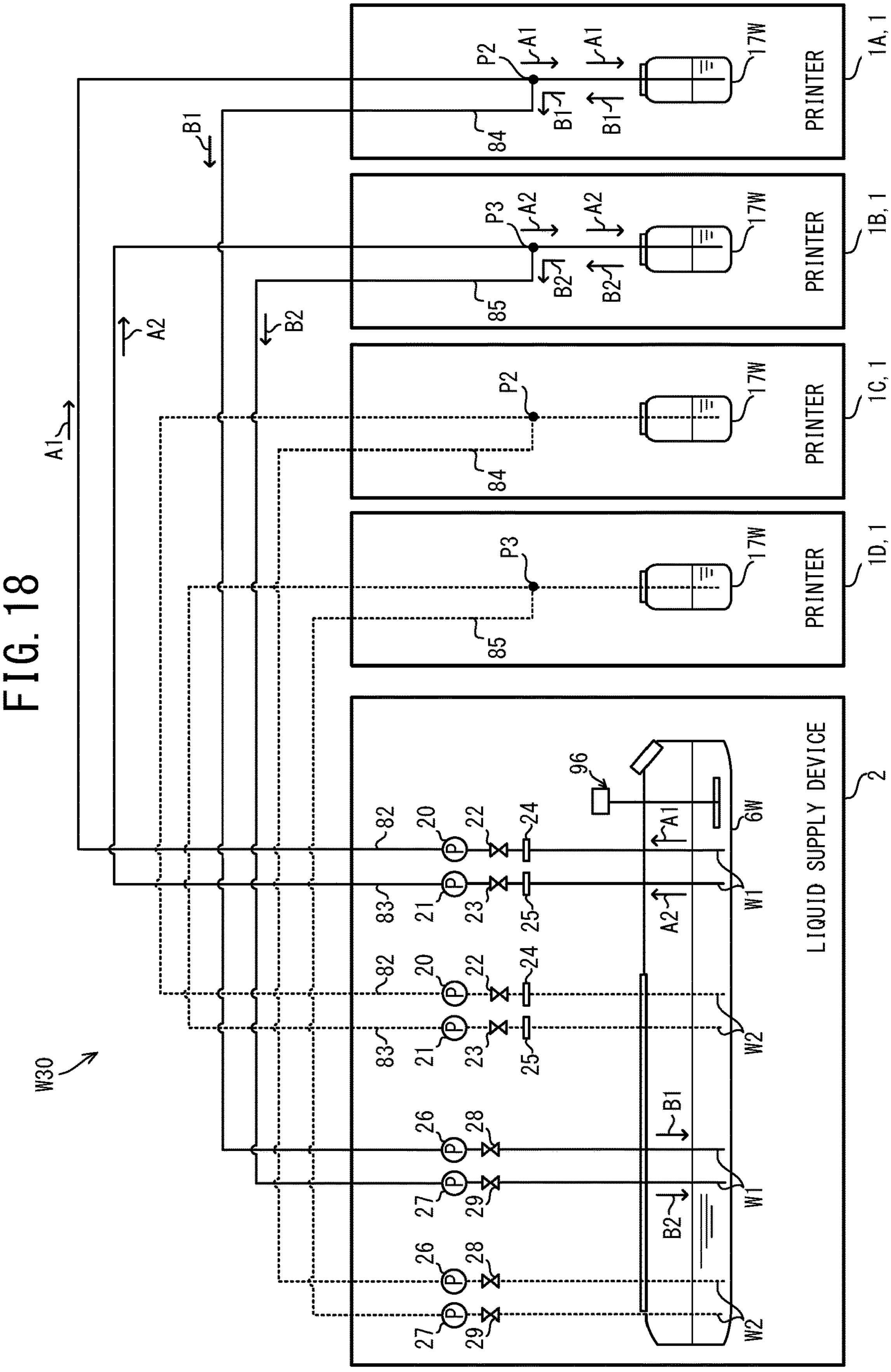
FIG. 18 is a flow path configuration diagram of a white flow path.

As shown in FIG. 18, in the white flow path W30, in the first white flow path W1, for example, the tubes 82 and 83 need not necessarily be respectively connected to the tube 81 at the point P1. Each of the tubes 82 and 83 may extend from the respective main tanks 17W of the printers 1A and 1B to the server tank 6W, and may be connected to the server tank 6W.

For example, in the first white flow path W1, the tubes 84 and 85 need not necessarily be respectively connected to the tube 86 at the point P4. The tubes 84 and 85 may extend from the point P2 and P3, respectively, to the server tank 6W, and may be connected to the server tank 6W.

Although not shown in the drawings, in addition to being connected to the tube 82 and the tube 83 of the first white flow path W1 at the point P1 of the first white flow path W1, the tube 81 of the first white flow path W1 may also be connected to one or both of the tube 81 and the tube 82 of the second white flow path W2. In addition to the tube 84 and the tube 85 of the first white flow path W1, one or both of the tube 84 and the tube 85 of the second white flow path W2 may also be connected to the tube 86 of the first white flow path W1 at the point P4 of the first white flow path W1. In the first white flow path W1, the tube 81 may extend directly to the server tank 6W from the point P1, without passing through the connector 97.

For example, in the first white flow path W1, the liquid supply device 2 may omit one or both of the supply pumps 20 and 21. For example, when both the supply pumps 20 and 21 are omitted, the CPU 51 controls one or both of the supply valves 22 and 23 to be in the open state and the closed state. In this way, the CPU 51 may control the supply of the white ink to the respective main tanks 17W of the printers 1A, 1B, 1C, and 1D from the server tank 6W using the liquid head difference between the respective main tanks 17W of the printers 1A and 1B and the server tank 6W.

For example, in the first white flow path W1, the liquid supply device 2 may omit one or both of the circulation pumps 26 and 27. For example, when both the circulation pumps 26 and 27 are omitted, the CPU 51 controls one or both of the circulation valves 28 and 29 to be in the open state and the closed state. In this way, the CPU 51 may control the return of the white ink from the respective main tanks 17W of the printers 1A and 1B to the server tank 6W using the liquid head difference between the respective main tanks 17W of the printers 1A and 1B and the server tank 6W.

For example, in the first white flow path W1, the liquid supply device 2 may omit one or both of the supply valves 22 and 23. In the first white flow path W1, the liquid supply device 2 may omit one or both of the circulation valves 28 and 29. In the first white flow path W1, the liquid supply device 2 may omit one or both of the filters 24 and 25.

In the tube 82, for example, the liquid supply device 2 may change an upstream or downstream positional relationship in the supply flow path of the supply pump 20, the supply valve 22, and the filter 24, as appropriate. Similarly, in the tube 83, for example, the liquid supply device 2 may change an upstream or downstream positional relationship in the supply flow path of the supply pump 21, the supply valve 23, and the filter 25, as appropriate.

In the tube 84, for example, the liquid supply device 2 may change an upstream or downstream positional relationship in the circulation flow path of the circulation pump 26 and the circulation valve 28, as appropriate. Similarly, in the tube 85, for example, the liquid supply device 2 may change an upstream or downstream positional relationship in the circulation flow path of the circulation pump 27 and the circulation valve 29, as appropriate.

The single printer 1 may be connected to the single liquid supply device 2 using the tubes 8. The liquid supply device 2 may be provided with only the single server tank 6, such as the server tank 6W, for example.

In a similar manner to the first white flow path W1 and the second white flow path W2, the first color/pretreatment agent flow path S1 and the second color/pretreatment agent flow path S2 may be respectively provided with the tubes 84, 85, and 86, and with the circulation pumps 26 and 27, and the circulation valves 28 and 29. In this case, in a similar manner to the white flow path W0, the CPU 51 may control the inter supply device-printer circulation operation in the circulation processing for the color/pretreatment agent flow path S0.

In this case, the liquid supply device 2 can suppress the state of the white ink, the color inks, or the pretreatment agent from becoming non-uniform inside the server tanks 6W, 6M, 6C, 6Y, 6K, and 6CS, inside the respective tubes 81, 82, 83, 84, 85, and 86 of the white flow path W0 and the color/pretreatment agent flow paths S0, or inside the respective main tanks 17W, 17M, 17C, 17Y, 17K, and 17CS of the printers 1A, 1B, 1C, and 1D. Thus, the liquid supply device 2 can suppress the print quality from deteriorating as a result of the state of the white ink, the color inks, or the pretreatment agent becoming non-uniform. Note that "the state of the pretreatment agent" refers, for example, to a concentration distribution of the cationic polymer, the multivalent metal salts and the like, in the pretreatment agent. The "state of the color ink" refers to a concentration distribution of colored components in the color ink, for example.

The liquid supply device 2 may supply the ink or the pretreatment agent from the server tank 6W to the head 14 without passing through the main tank 17. The printer 1 may apply the pretreatment agent to the print medium using a mechanism other than the head 14. For example, in place of the head 14, the printer 1 may be provided with a spray for spraying the pretreatment agent. In this case, the printer 1 may supply the pretreatment agent from the main tank 17 to the spray.

As the liquid, the liquid supply system 100 may supply a post-treatment agent, for example, from the liquid supply device 2 to each of the plurality of printers 1. The post-treatment agent is an aqueous solution containing a resin emulsion, for example, or an aqueous solution containing a crosslinking agent. The post-treatment agent is, for example, a coating material, and is applied onto the print image after the printing on the print medium. The post-treatment agent protects the print image, or improves glossiness of the print image.

In this case, the post-treatment agent may be stored, for example, in the server tank 6W. The tube 82 may be connected to the main tank 17W of the printer 1A. The tube 83 may be connected to the main tank 17W of the printer 1B. In this way, the post-treatment agent is supplied from the server tank 6W to the main tank 17W of the printer 1A via the tubes 81 and 82. The post-treatment agent is supplied from the server tank 6W to the main tank 17W of the printer 1B via the tubes 81 and 83. The printer 1 supplies the post-treatment agent from the main tank 17W to the head 14, of the plurality of heads 14, for ejecting the post-treatment agent via a sub-pouch, or without passing through the sub-pouch. In place of the head 14, the printer 1 may supply the post-treatment agent to a spray or the like.

As a result of the CPU 51 performing the circulation processing, the post-treatment agent circulates between the server tank 6W and the main tank 17 of the printer 1A or the printer 1B via the tubes 81, 82, 84, and 86 or the tubes 81, 83, 85, and 86. Thus, the liquid supply device 2 can suppress a state of the post-treatment agent from becoming non-uniform inside the server tank 6W, inside the tubes 81, 82, 83, 84, 85, and 86, or inside the respective main tanks 17W of the printers 1A and 1B. As a result, the liquid supply device 2 can suppress a deterioration in the print quality caused by the state of the post-treatment agent becoming non-uniform. Note that "the state of the post-treatment agent" refers, for example, to a concentration distribution of a cationic polymer, multivalent metal salts and the like, in the post-treatment agent.

As the liquid, the liquid supply system 100 may supply a cleaning solution, for example, from the liquid supply device 2 to each of the plurality of printers 1. The cleaning solution is used to clean the nozzle surface of the head 14.

In this case, the cleaning solution may be stored in the server tank 6W, for example. The tube 82 may be connected to a cap 19 of the printer 1A. The tube 83 may be connected to the cap 19 of the printer 1B. In this way, the cleaning solution is supplied from the server tank 6W to the cap 19 of the printer 1A via the tubes 81 and 82. The cleaning solution is supplied from the server tank 6W to the cap 19 of the printer 1B via the tubes 81 and 83. In other words, the cleaning solution may be supplied to the cap 19 from the server tank 6W without passing through the main tank 17. Note that the cleaning solution may be supplied from the server tank 6W to the cap 19 via the main tank 17.

As a result of the cleaning solution being supplied to the cap 19 in a state in which the cap 19 is closely adhered to the nozzle surface of the head 14, the nozzle surface of the head 14 is cleaned. As a result of the CPU 51 performing the circulation processing, the cleaning solution circulates between the server tank 6W and the main tank 17 of the printer 1A or the printer 1B via the tubes 81, 82, 84, and 86 or the tubes 81, 83, 85, and 86. Thus, the liquid supply device 2 can suppress a state of the cleaning solution from becoming non-uniform inside the server tank 6W, inside the tubes 81, 82, 83, 84, 85, and 86, or inside the respective caps 19 of the printers 1A and 1B. As a result, the liquid supply device 2 can suppress a deterioration in cleaning effectiveness of the nozzle surface of the head 14 caused by the state of the cleaning solution becoming non-uniform. Note that "the state of the cleaning solution" refers, for example, to a concentration distribution of cleaning components in the cleaning solution.

As the liquid, the liquid supply system 100 may supply water, for example, from the liquid supply device 2 to each of the plurality of printers 1. The water may be used for humidifying an atmosphere inside the printer 1. In this case, the plurality of printers 1 may each be provided with a humidifier. The humidifier is provided inside the printer 1 and humidifies the atmosphere inside the printer 1.

The water may be stored in the server tank 6W, for example. The tube 82 may be connected to the humidifier of the printer 1A. The tube 83 may be connected to the humidifier of the printer 1B. In this way, the water is supplied from the server tank 6W to the humidifier of the printer 1A via the tubes 81 and 82. The water is supplied from the server tank 6W to the humidifier of the printer 1B via the tubes 81 and 83. In other words, the water is supplied from the server tank 6W to the humidifier without passing through the main tank 17. Note that the water may be supplied to the humidifier from the server tank 6W via the main tank 17.

As a result of the CPU 51 performing the circulation processing, the water circulates between the server tank 6W and the humidifier of the printer 1A or the printer 1B via the tubes 81, 82, 84, and 86 or the tubes 81, 83, 85, and 86. Thus, the liquid supply device 2 can suppress a state of the water from becoming non-uniform inside the server tank 6W, inside the tubes 81, 82, 83, 84, 85, and 86, or inside the respective humidifiers of the printers 1A and 1B. As a result, the liquid supply device 2 can suppress a deterioration in humidification capacity by the humidifier caused by the state of the water becoming non-uniform. Note that "the state of the water" refers, for example, to a temperature distribution of the water.

The configuration of the printer 1 is not limited to that of the above-described embodiment. For example, in the above-described embodiment, the printer 1 may be a type different from the inkjet printer, and may be a laser printer, a tape printer, or the like. The plurality of heads 14 are not limited to the inkjet heads, and may be thermal heads, or the like. For example, the printer 1 need not necessarily use ink as the liquid, and it is sufficient that the printer 1 be provided with the humidifier. In this case, the liquid supply system 100 supplies the water from the liquid supply device 2 to the humidifier of the printer 1. Some or all of the plurality of heads 14 may be a line head. A number of the heads 14 may be one.

The server sensor 71 may be an optical sensor or an electrode-type level sensor. In this case, the server sensor 71 may detect the server remaining amount by detecting a height of the liquid surface inside the server tank 6. The server sensor 71 may be a pressure sensor. In this case, the server sensor 71 may detect the server remaining amount by detecting the pressure inside the server tank 6.

The main sensor 185 may be a weight sensor. In this case, the main sensor 185 may detect the main remaining amount by detecting the weight of the main remaining amount. The main sensor 185 may be an optical sensor or an electrode-type level sensor. In this case the main sensor 185 may detect the main remaining amount by detecting a height of the liquid surface inside the main tank 17.

The liquid supply device 2 may change the configuration of the placement base 30 as appropriate. For example, of the bottom plate 31, the pair of pillars 32, the top plate 33, the fixed plate 34, and the movable plate 35, the placement base 30 may be provided with only the bottom plate 31. The liquid supply device 2 may omit the placement base 30. In this case, the server tank 6 may be placed on the ground.

The control box 5 may be provided in the sub-unit 3B, in place of the main unit 3A, or in addition to the main unit 3A. The control box 5 may be provided in different positions in the main unit 3A and the sub-unit 3B.

The liquid supply device 2 may change a shape of the server tank 6 as appropriate. For example, the server tank 6 may have a bottomed circular cylindrical shape. The opening 62 may be provided in a side surface or the bottom surface of the server tank 6. Each of the cabinet 91, the handle 92, the cap 93, the support plate 94, the washer 95, the tube 8, and the agitation mechanism 96 may be provided separately from the mount mechanism 9. For example, when the agitation mechanism 96 is provided separately from the mount mechanism 9W, a plurality of the openings 62 may be provided in the server tank 6 as the openings 62 for mounting the tubes 81 and 82, and the opening 62 for mounting the agitation mechanism 96.

For example, the mount mechanism 9 may be fixed to the server tank 6, and may be non-removable or difficult to remove. In this case, it is sufficient that the opening 62 for replenishing the liquid be provided in the server tank 6.

The movable plate 35 may move between the closed position and the open position by moving in the front-rear direction or the left-right direction, for example. The open/closed sensor 38 may detect whether or not the movable plate 35 is positioned at the closed position. The open/closed sensor 38 may detect whether the movable plate 35 is positioned at either one of the closed position or the open position. The open/closed sensor 38 may be an optical sensor, for example. The liquid supply device 2 may be provided with a motor for moving the movable plate 35 between the closed position and the open position. The motor may be provided with an encoder as the open/closed sensor 38. In this case, the encoder detects whether the movable plate 35 is positioned at either of the closed position or the open position on the basis of a rotation position of the motor.

The CPU 41 may perform the main processing. The CPU 51 may perform a part of the main processing, and the CPU 41 may perform another part of the main processing. For example, in the main processing, the CPU 41 may perform the processing at step S14 and step S16, and the CPU 51 may perform the other processing. In this case, for example, when the current time at step S16 is the circulation time, the CPU 41 transmits the circulation command to the liquid supply device 2 for performing the circulation processing. When the CPU 51 receives the circulation command, the CPU 51 performs the circulation processing. In this case, in the circulation processing, the CPU 51 may omit the processing at step S21, step S22, step S71, step S72, and step S73. A CPU of an external device may perform the main processing. The external device is a device other than the printer 1 and the liquid supply device 2, and is a personal computer (PC), a smartphone, or the like.

In place of the circulation time, an interval time period between the plurality of circulation processing may be stored in the flash memory 54. In this case, the CPU 51 counts the time in the RAM 53, and in the processing at step S16, may determine whether or not the interval time period has elapsed. The CPU 51 may perform the circulation processing when the interval time period has elapsed. For example, when the interval time period is one hour, the CPU 51 performs the circulation processing every hour. In this way, the CPU 51 may perform the circulation processing on the regular basis.

In the main processing, the CPU 51 may perform the circulation processing on a non-regular basis. In other words, the CPU 51 need not necessarily perform the circulation processing at a fixed time. For example, the CPU 51 may determine whether or not to perform the circulation processing on the basis of the server remaining amount of the server tank 6W and the main remaining amount of the main tank 17W. The CPU 51 may perform the circulation processing when the user operates the operation portion 57 and inputs the circulation command to the liquid supply device 2. The CPU 41 may transmit the circulation command to the liquid supply device 2 when the user operates the operation portion 186 and input the circulation command to the printer 1. The CPU 51 may perform the circulation processing when the CPU 51 receives the circulation command from the printer 1.

Furthermore, an optical sensor may be provided at the server tank 6W. The optical sensor irradiates light toward the liquid surface of the white ink from above, with respect to the white ink in the server tank 6W. In this way, the optical sensor detects the light transmittance or the optical reflectance of the white ink inside the server tank 6W. The light transmittance or the optical reflectance of the white ink corresponds to an extent of settling of the white ink. For example, when the white ink has settled, the light transmittance of the white ink is lower than when the white ink has not settled. On the basis of a signal from the optical sensor, when the light transmittance or the optical reflectance has reached a predetermined light transmittance or optical reflectance, the CPU 51 may perform the circulation processing.

Furthermore, a concentration sensor may be provided in the server tank 6W. The concentration sensor detects a concentration of the white ink in the vicinity of the bottom surface inside the server tank 6W, for example. On the basis of a signal from the concentration sensor, when the concentration of the white ink in the vicinity of the bottom surface of the server tank 6W has reached a predetermined concentration, the CPU 51 may perform the circulation processing.

Furthermore, a temperature sensor may be provided in the server tank 6W. The temperature sensor detects the temperature of the white ink in the vicinity of the bottom surface of the server tank 6W, for example. On the basis of a signal from the temperature sensor, when the temperature of the white ink in the vicinity of the bottom surface of the server tank 6W has reached a predetermined temperature, the CPU 51 may perform the circulation processing.

In the circulation processing, the CPU 51 may perform the return processing (step S6) before the circulation-time supply processing (step S4). In the circulation processing, the CPU 51 may repeatedly perform a set of the circulation-time supply processing and the return processing. In the main processing, the CPU 51 may omit the processing at step S11, step S12, and step S13. For example, the CPU 51 may perform the normal supply processing or the circulation processing regardless of whether or not the server remaining amount of the server tank 6W is equal to or less than the predetermined remaining amount.

The prescribed circulation amount may be greater than or less than the prescribed supply amount. In the return processing, in place of the processing at step S64 and step S65, the CPU 51 may determine whether or not the server remaining amount of the server tank 6W has become within a predetermined range. When the server remaining amount of the server tank 6W has become within the predetermined range, the CPU 51 may stop the driving of the target circulation pump and cause the target circulation valve to be in the closed state (step S66, step S67). The predetermined range is stored in advance in the flash memory 54, for example. The predetermined range may be a range using, as a reference, the server remaining amount of the server tank 6W before the start of the supply processing, for example. The predetermined range may be a range taking, as a reference, a maximum capacity of the white ink that can be stored by the server tank 6W, for example.

In the circulation processing, the CPU 51 may determine whether or not the main remaining amount of the main tank 17W of the target printer has become within a predetermined range, on the basis of the signal from the main sensor 185 of the main tank 17W of the target printer. When the main remaining amount of the main tank 17W of the target printer has become within the predetermined range, the CPU 51 may stop the driving of the target circulation pump and cause the target circulation valve to be in the closed state (step S66, step S67). The predetermined range may be a range using, as a reference, the main remaining amount of the main tank 17W of the target printer before the start of the supply processing, for example. The predetermined range may be a range taking, as a reference, a maximum capacity of the white ink that can be stored by the main tank 17W of the target printer, for example.

In the processing at step S31, the CPU 51 may acquire the main remaining amount of the main tank 17W from the main sensor 185 of the main tank 17W of the target printer, and may store the acquired main remaining amount of the main tank 17W in the RAM 53 as the pre-supply remaining amount. In this case, the pre-supply remaining amount is the main remaining amount of the main tank 17W of the target printer before the start of the circulation-time supply processing (step S4) in the circulation processing.

When the main remaining amount of the main tank 17W is stored as the pre-supply remaining amount, in the processing at step S43, the CPU 51 acquires the main remaining amount of the main tank 17W from the main sensor 185 of the main tank 17W of the target printer, and stores the acquired main remaining amount of the main tank 17W in the RAM 53 as a current main remaining amount. In the processing at step S44, the CPU 51 calculates a first main change amount using a difference between the pre-supply remaining amount stored by the processing at step S31 and the current main remaining amount stored in the processing at step S43.

The first main change amount indicates the change amount of the main remaining amount of the main tank 17W of the target printer from a time point of the processing at step S31 to a time point of the processing at step S44. The first main change amount indicates an amount of the white ink supplied from the server tank 6W to the main tank 17W of the target printer at the time point of the processing at step S44, in the circulation-time supply processing. The CPU 51 determines whether or not the first main change amount calculated by the processing at step S44 has reached the prescribed supply amount (step S45).

In the processing at step S51, the CPU 51 may acquire the main remaining amount of the main tank 17W from the main sensor 185 of the main tank 17W of the target printer, and may store the acquired main remaining amount of the main tank 17W in the RAM 53 as the post-supply remaining amount. In this case, the post-supply remaining amount is the main remaining amount of the main tank 17W of the target printer before the start of the return processing (step S6) in the circulation processing.

When the main remaining amount of the main tank 17W is stored as the post-supply remaining amount, in the processing at step S63, the CPU 51 acquires the main remaining amount of the main tank 17W from the main sensor 185 of the main tank 17W of the target printer, and stores the acquired main remaining amount of the main tank 17W in the RAM 53 as the current main remaining amount. In the processing at step S64, the CPU 51 calculates a second main change amount using a difference between the post-supply remaining amount stored by the processing at step S51 and the current main remaining amount stored in the processing at step S63.

The second main change amount indicates the change amount of the main remaining amount of the main tank 17W of the target printer from a time point of the processing at step S51 to a time point of the processing at step S64. The second main change amount indicates an amount of the white ink returned from the main tank 17W of the target printer to the server tank 6W at the time point of the processing at step S64, in the return processing. The CPU 51 determines whether or not the second main change amount calculated by the processing at step S64 has reached the prescribed circulation amount (step S65).

In the circulation-time supply processing, in the processing at step S42, the CPU 51 may stop the driving of the target supply pump when, after starting the driving of the target supply pump, an integrated number of a number of rotations of the target supply pump has reached a first predetermined number of rotations. In this case, the first predetermined number of rotations is stored in advance in the flash memory 54, for example. For example, encoders may be provided in the pump motors 201 and 211, and the CPU 51 may identify the integrated number of the number of rotations of the target supply pump on the basis of a signal from the encoder. Note that the CPU 51 may perform time control of the target supply pump.

In the return processing, in the processing at step S62, the CPU 51 may stop the driving of the target circulation pump when, after starting the driving of the target circulation pump, an integrated number of a number of rotations of the target circulation pump has reached a second predetermined number of rotations. In this case, the second predetermined number of rotations is stored in advance in the flash memory 54, for example. The second predetermined number of rotations may be greater than or less than the first predetermined number of rotations. The second predetermined number of rotations may be the same as the first predetermined number of rotations. For example, encoders may be provided in the pump motors 261 and 271, and the CPU 51 may identify the integrated number of the number of rotations of the target circulation pump on the basis of a signal from the encoder. Note that the CPU 51 may perform time control of the target circulation pump.

The number of rotations of the target supply pump roughly corresponds to the amount of white ink supplied from the server tank 6W to the main tank 17W of the target printer in the circulation-time supply processing. The number of rotations of the target circulation pump roughly corresponds to the amount of white ink returned from the main tank 17W of the target printer to the server tank 6W in the return processing. Thus, the liquid supply system 100 can suppress the amount of white ink flowing between each of the printers 1A, 1B, 1C, and 1D and the server tank 6W via the tubes 8 from fluctuating each time the circulation-time supply processing and the return processing are performed.

While performing one of the first circulation processing or the second circulation processing, the CPU 51 may perform the other of the first circulation processing and the second circulation processing. For example, the CPU 51 may set the plurality of printers 1 as the target printers in the processing at step S21. For example, in the processing at step S21, the CPU 51 may set the printer 1A and the printer 1B as the target printers, may set the printer 1A and the printer 1C as the target printers, or may set all of the printers 1A, 1B, 1C, and 1D as the target printers. According to the above, the liquid supply system 100 can shorten a time period for performing the circulation processing.

In the circulation processing (step S17), before performing the circulation-time supply processing (step S4), the CPU 51 may determine whether or not the target printer is in a print mode. For example, in each of the plurality of printers 1, the print mode is stored in the RAM 43 during the printing by each of the printers 1. When the target printer is not in the print mode, the CPU 51 may shift the processing to the processing at step S22 or step S31. When the target printer is in the print mode, the CPU 51 may shift the processing to the processing at step S71. In other words, when the target printer is in the print mode, the CPU 51 may prohibit the performing of the inter supply device-printer circulation operation.

In place of the CPU 41 or 51, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42 or 52, the flash memory 44 or 54, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or 52 or the flash memory 44 or 54. In this case, the control program may be stored in a non-transitory storage medium, such as an HDD provided in the server.

What is claimed is:

1. A liquid supply system configured to supply a liquid to a plurality of printers, the liquid supply system comprising:

a plurality of tubes configuring a supply flow path of the liquid to the plurality of printers, the plurality of tubes being connected to a tank configured to store the liquid, the tank being positioned outside the plurality of printers and provided further upstream than the plurality of printers in the supply flow path, and the liquid flowing through the plurality of tubes between the tank and the plurality of printers;

a liquid delivery mechanism being a mechanism provided in the plurality of tubes, and configured to switch between a liquid delivery state of the liquid flowing between the tank and the plurality of printers via the plurality of tubes, and a stopped state of stopping the liquid from flowing between the tank and the plurality of printers via the plurality of tubes;

a processor; and a memory storing computer-readable instructions that, when executed by the processor, cause the processor to perform a process comprising:

circulation processing including supply processing of supplying the liquid from the tank toward the plurality of printers via the plurality of tubes, by controlling the liquid delivery mechanism to be in the liquid delivery state, and return processing of returning the liquid from the plurality of printers toward the tank via the plurality of tubes, by controlling the liquid delivery mechanism to be in the liquid delivery state.

2. The liquid supply system according to claim 1, wherein the plurality of tubes includes supply tubes configured to supply the liquid from the tank toward the plurality of printers, and circulation tubes configured to return the liquid from the plurality of printers toward the tank, the liquid delivery mechanism includes a supply mechanism being the liquid delivery mechanism provided in the supply tubes, and configured to switch between a supply state that is the liquid delivery state of supplying the liquid from the tank toward the plurality of printers via the supply tubes, and a supply stopped state that is the stopped state of stopping the liquid from being supplied from the tank toward the plurality of printers via the supply tubes, and a circulation mechanism being the liquid delivery mechanism provided in the circulation tubes, and configured to switch between a circulation state that is the liquid delivery state of returning the liquid from the plurality of printers toward the tank via the circulation tubes, and a circulation stopped state that is the stopped state of stopping the liquid from being returned from the plurality of printers toward the tank via the circulation tubes, and the computer-readable instructions stored in the memory further cause the processor to perform processes comprising:

in the supply processing, supplying the liquid from the tank toward the plurality of printers via the supply tubes by controlling the supply mechanism to be in the supply state; and in the return processing, returning the liquid from the plurality of printers toward the tank via the circulation tubes by controlling the circulation mechanism to be in the circulation state.

3. The liquid supply system according to claim 2, wherein the supply mechanism includes a supply pump, the supply pump being in the supply state as a result of being driven and being in the supply stopped state as a result of being stopped, the circulation mechanism includes a circulation pump, the circulation pump being in the circulation state as a result of being driven and being in the circulation stopped state as a result of being stopped, the computer-readable instructions stored in the memory further cause the processor to perform processes comprising:

in the supply processing, controlling the supply pump to be in the supply state by driving the supply pump; and in the return processing, controlling the circulation pump to be in the circulation state by driving the circulation pump.

4. The liquid supply system according to claim 2, wherein the supply mechanism includes a supply valve, the supply valve being in the supply state as a result of being in an open state and being in the supply stopped state as a result of being in a closed state, the circulation mechanism includes a circulation valve, the circulation valve being in the circulation state as a result of being in the open state and being in the circulation stopped state as a result of being in the closed state, and the computer-readable instructions stored in the memory further cause the processor to perform processes comprising:

in the supply processing, controlling the supply valve to be in the supply state by causing the supply valve to be in the open state; and in the return processing, controlling the circulation valve to be in the circulation state by causing the circulation valve to be in the open state.

5. The liquid supply system according to claim 1, wherein the computer-readable instructions stored in the memory further cause the processor to perform a process comprising:

in the circulation processing, controlling the liquid delivery mechanism between the liquid delivery state and the stopped state to cause a remaining amount of the liquid inside the tank or inside the plurality of printers to be within a predetermined range.

6. The liquid supply system according to claim 5, wherein the computer-readable instructions stored in the memory further cause the processor to perform a process comprising:

in the circulation processing, controlling the liquid delivery mechanism between the liquid delivery state and the stopped state to cause the remaining amount to be within the predetermined range, the remaining amount being indicated by a signal from a sensor configured to detect the remaining amount of the liquid inside the tank or inside the plurality of printers, and the predetermined range being based on the remaining amount before a start of the supply processing.

7. The liquid supply system according to claim 6, wherein the computer-readable instructions stored in the memory further cause the processor to perform a process comprising:

in the return processing, controlling the liquid delivery mechanism from the liquid delivery state to the stopped state when, after controlling the liquid delivery mechanism to be in the liquid delivery state, a change amount of the remaining amount indicated by the signal from the sensor becomes a predetermined change amount.

8. The liquid supply system according to claim 1, wherein the liquid delivery mechanism includes a pump, the pump being in the liquid delivery state as a result of being driven and being in the stopped state as a result of being stopped, and the computer-readable instructions stored in the memory further cause the processor to perform a process comprising:

in the return processing, controlling the pump from the liquid delivery state to the stopped state when, after controlling the pump to be in the liquid delivery state, an integrated number of a number of rotations of the pump becomes a predetermined number of rotations.

9. The liquid supply system according to claim 1, wherein the computer-readable instructions stored in the memory further cause the processor to perform the circulation processing on a regular basis.

10. A liquid supply system configured to supply a liquid to a plurality of printers, the liquid supply system comprising:

a plurality of tubes configuring a supply flow path of the liquid to the plurality of printers, the plurality of tubes being connected to a tank configured to store the liquid, the tank being provided further upstream than the plurality of printers in the supply flow path, and the liquid flowing through the plurality of tubes between the tank and the plurality of printers;

a liquid delivery mechanism being a mechanism provided in the plurality of tubes, and configured to switch between a liquid delivery state of the liquid flowing between the tank and the plurality of printers via the plurality of tubes, and a stopped state of stopping the liquid from flowing between the tank and the plurality of printers via the plurality of tubes;

a processor; and a memory storing computer-readable instructions that, when executed by the processor, cause the processor to perform a process comprising:

circulation processing including supply processing of supplying the liquid from the tank toward the plurality of printers via the plurality of tubes, by controlling the liquid delivery mechanism to be in the liquid delivery state, and return processing of returning the liquid from the plurality of printers toward the tank via the plurality of tubes, by controlling the liquid delivery mechanism to be in the liquid delivery state, wherein the plurality of printers include a first printer and a second printer, the plurality of tubes includes one or a plurality of first tubes connected to the tank, the liquid flowing through the one or plurality of first tubes between the tank and the first printer, and one or a plurality of second tubes connected to the tank, the liquid flowing through the one or plurality of second tubes between the tank and the second printer, the liquid delivery mechanism includes a first liquid delivery mechanism being the liquid delivery mechanism provided in the one or plurality of first tubes, and configured to switch between a first liquid delivery state that is the liquid delivery state of the liquid flowing between the tank and the first printer via the one or plurality of first tubes, and a first stopped state that is the stopped state of stopping the liquid from flowing between the tank and the first printer via the one or plurality of first tubes, and a second liquid delivery mechanism being the liquid delivery mechanism provided in the one or plurality of second tubes, and configured to switch between a second liquid delivery state that is the liquid delivery state of the liquid flowing between the tank and the second printer via the one or plurality of second tubes, and a second stopped state that is the stopped state of stopping the liquid from flowing between the tank and the second printer via the one or plurality of second tubes, and the computer-readable instructions stored in the memory further cause the processor to perform processes comprising:

first circulation processing being the circulation processing of, in the supply processing, supplying the liquid from the tank toward the first printer via the one or plurality of first tubes by controlling the first liquid delivery mechanism to be in the first liquid delivery state, and, in the return processing, returning the liquid from the first printer toward the tank via the one or plurality of first tubes by controlling the first liquid delivery mechanism to be in the liquid delivery state; and second circulation processing being the circulation processing of, in the supply processing, supplying the liquid from the tank toward the second printer via the one or plurality of second tubes by controlling the second liquid delivery mechanism to be in the second liquid delivery state, and, in the return processing, returning the liquid from the second printer toward the tank via the one or plurality of second tubes by controlling the second liquid delivery mechanism to be in the second liquid delivery state, and during a performing of one of the first circulation processing or the second circulation processing, prohibiting a performing of the other of the first circulation processing and the second circulation processing.

11. A liquid supply system configured to supply a liquid to a plurality of printers, the liquid supply system comprising:

one or a plurality of tubes configuring a supply flow path of the liquid to the plurality of printers, the plurality of tubes being connected to a tank configured to store the liquid, the tank being provided further upstream than the plurality of printers in the supply flow path, and the liquid flowing through the plurality of tubes between the tank and the plurality of printers;

a liquid delivery mechanism being a mechanism provided in the plurality of tubes, and configured to switch between a liquid delivery state of the liquid flowing between the tank and the plurality of printers via the plurality of tubes, and a stopped state of stopping the liquid from flowing between the tank and the plurality of printers via the plurality of tubes;

a processor; and a memory storing computer-readable instructions that, when executed by the processor, cause the processor to perform a process comprising:

circulation processing including supply processing of supplying the liquid from the tank toward the plurality of printers via the plurality of tubes, by controlling the liquid delivery mechanism to be in the liquid delivery state, and return processing of returning the liquid from the plurality of printers toward the tank via the plurality of tubes, by controlling the liquid delivery mechanism to be in the liquid delivery state, wherein the plurality of printers include a first printer and a second printer, the plurality of tubes include one or a plurality of first tubes connected to the tank, the liquid flowing through the one or plurality of first tubes between the tank and the first printer, and one or a plurality of second tubes connected to the tank, the liquid flowing through the one or plurality of second tubes between the tank and the second printer, the liquid delivery mechanism includes a first liquid delivery mechanism being the liquid delivery mechanism provided in the one or plurality of first tubes, and configured to switch between a first liquid delivery state that is the liquid delivery state of the liquid flowing between the tank and the first printer via the one or plurality of first tubes, and a first stopped state that is the stopped state of stopping the liquid from flowing between the tank and the first printer via the one or plurality of first tubes, and a second liquid delivery mechanism being the liquid delivery mechanism provided in the one or plurality of second tubes, and configured to switch between a second liquid delivery state that is the liquid delivery state of the liquid flowing between the tank and the second printer via the one or plurality of second tubes, and a second stopped state that is the stopped state of stopping the liquid from flowing between the tank and the second printer via the one or plurality of second tubes, the computer-readable instructions stored in the memory further cause the processor to perform processes comprising:

first circulation processing being the circulation processing of, in the supply processing, supplying the liquid from the tank toward the first printer via the one or plurality of first tubes by controlling the first liquid delivery mechanism to be in the first liquid delivery state, and, in the return processing, returning the liquid from the first printer toward the tank via the one or plurality of first tubes by controlling the first liquid delivery mechanism to be in the liquid delivery state; and second circulation processing being the circulation processing of, in the supply processing, supplying the liquid from the tank toward the second printer via the one or plurality of second tubes by controlling the second liquid delivery mechanism to be in the second liquid delivery state, and, in the return processing, returning the liquid from the second printer toward the tank via the one or plurality of second tubes by controlling the second liquid delivery mechanism to be in the second liquid delivery state, and during a performing of one of the first circulation processing or the second circulation processing, performing the other of the first circulation processing and the second circulation processing.

12. A control method by a liquid supply system configured to supply a liquid to a plurality of printers, the liquid supply system including a plurality of tubes configuring a supply flow path of the liquid to the plurality of printers, the plurality of tubes being connected to a tank configured to store the liquid, the tank being positioned outside the plurality of printers and provided further upstream than the plurality of printers in the supply flow path, and the liquid flowing through the plurality of tubes between the tank and the plurality of printers, and a liquid delivery mechanism being a mechanism provided in the plurality of tubes, and configured to switch between a liquid delivery state of the liquid flowing between the tank and the plurality of printers via the plurality of tubes, and a stopped state of stopping the liquid from flowing between the tank and the plurality of printers via the plurality of tubes, the control method comprising:

circulation processing including supply processing of supplying the liquid from the tank toward the plurality of printers via the plurality of tubes, by controlling the liquid delivery mechanism to be in the liquid delivery state, and return processing of returning the liquid from the plurality of printers toward the tank via the plurality of tubes, by controlling the liquid delivery mechanism to be in the liquid delivery state.

13. A non-transitory computer-readable medium storing computer-readable instructions executed by a computer of a liquid supply system configured to supply a liquid to a plurality of printers, the liquid supply system including a plurality of tubes configuring a supply flow path of the liquid to the plurality of printers, the plurality of tubes being connected to a tank configured to store the liquid, the tank being positioned outside the plurality of printers and provided further upstream than the plurality of printers in the supply flow path, and the liquid flowing through the plurality of tubes between the tank and the plurality of printers, and a liquid delivery mechanism being a mechanism provided in the plurality of tubes, and configured to switch between a liquid delivery state of the liquid flowing between the tank and the plurality of printers via the plurality of tubes, and a stopped state of stopping the liquid from flowing between the tank and the plurality of printers via the plurality of tubes, the instructions, when executed by the computer, causing the computer to perform a process comprising:

circulation processing including supply processing of supplying the liquid from the tank toward the plurality of printers via the plurality of tubes, by controlling the liquid delivery mechanism to be in the liquid delivery state, and return processing of returning the liquid from the plurality of printers toward the tank via the plurality of tubes, by controlling the liquid delivery mechanism to be in the liquid delivery state.

14. A liquid supply device configured to supply a liquid to a plurality of printers, the liquid supply device comprising:

a plurality of tubes configuring a supply flow path of the liquid to the plurality of printers, the plurality of tubes being connected to a tank configured to store the liquid, the tank being positioned outside the plurality of printers and provided further upstream than the plurality of printers in the supply flow path, and the liquid flowing through the plurality of tubes between the tank and the plurality of printers;

a liquid delivery mechanism being a mechanism provided in the plurality of tubes, and configured to switch between a liquid delivery state of the liquid flowing between the tank and the plurality of printers via the plurality of tubes, and a stopped state of stopping the liquid from flowing between the tank and the plurality of printers via the plurality of tubes; and a processor; and a memory storing computer-readable instructions that, when executed by the processor, cause the processor to perform a process comprising:

circulation processing including supply processing of supplying the liquid from the tank toward the plurality of printers via the plurality of tubes, by controlling the liquid delivery mechanism to be in the liquid delivery state, and return processing of returning the liquid from the plurality of printers toward the tank via the plurality of tubes, by controlling the liquid delivery mechanism to be in the liquid delivery state.

* * * * *